United States Patent
Zhao et al.

(10) Patent No.: US 12,231,196 B2
(45) Date of Patent: Feb. 18, 2025

(54) ELECTRONIC DEVICE, METHOD FOR WIRELESS COMMUNICATION SYSTEM, AND STORAGE MEDIUM

(71) Applicant: Sony Group Corporation, Tokyo (JP)

(72) Inventors: Peiyao Zhao, Beijing (CN); Zhaocheng Wang, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/438,532

(22) Filed: Feb. 12, 2024

(65) Prior Publication Data

US 2024/0275439 A1    Aug. 15, 2024

Related U.S. Application Data

(63) Continuation of application No. 17/287,133, filed as application No. PCT/CN2019/119812 on Nov. 21, 2019, now Pat. No. 11,936,446.

(30) Foreign Application Priority Data

Nov. 27, 2018 (CN) .......................... 201811424550.0

(51) Int. Cl.
*H04B 7/02* (2018.01)
*H04B 7/0456* (2017.01)

(52) U.S. Cl.
CPC ................................. *H04B 7/0456* (2013.01)

(58) Field of Classification Search
CPC .. H04B 7/0456; H04B 7/0417; H04B 7/0628; H04B 7/0413; H04B 7/0626; H04L 1/00; H04L 25/03898
USPC .......................................................... 375/267
See application file for complete search history.

(56) References Cited

U.S. PATENT DOCUMENTS

| 9,281,880 B2 * | 3/2016 | Ruiz Delgado ...... H04B 7/0456 |
| 9,491,654 B2 | 11/2016 | Ko et al. |
| 2008/0181285 A1 | 7/2008 | Hwang et al. |

(Continued)

FOREIGN PATENT DOCUMENTS

| CN | 103312445 A | 9/2013 |
| CN | 103733554 A | 4/2014 |

(Continued)

OTHER PUBLICATIONS

International Search Report and Written Opinion mailed on Jan. 21, 2020, received for PCT Application PCT/CN2019/119812, filed on Nov. 21, 2019, 9 pages.

*Primary Examiner* — Helene E Tayong
(74) *Attorney, Agent, or Firm* — XSENSUS LLP

(57) ABSTRACT

An electronic device on a control device side for a wireless communication system, includes: a processing circuit configured to group a plurality of terminal devices of the wireless communication system into one linear precoding terminal device group and one or more nonlinear precoding terminal device groups based on respective nonlinear precoding capabilities and channel state information of the plurality of terminal devices; and notify each terminal device whether nonlinear precoding or linear precoding is to be employed in communication for the terminal device by means of a nonlinear precoding indicator based on the grouping.

14 Claims, 20 Drawing Sheets

(56) References Cited

U.S. PATENT DOCUMENTS

2014/0050277 A1* 2/2014 Wu .................. H04B 7/0639
                                              375/267
2014/0146904 A1   5/2014 Onodera et al.
2015/0270884 A1   9/2015 Tomeba et al.
2016/0049997 A1   2/2016 Onodera et al.

FOREIGN PATENT DOCUMENTS

| CN | 107113025 A    | 8/2017 |
| CN | 107659348 A    | 2/2018 |
| CN | 108173585 A    | 6/2018 |
| CN | 108418614 A    | 8/2018 |
| WO | 2013/040089 A2 | 3/2013 |
| WO | 2018/122855 A1 | 7/2018 |

* cited by examiner

ELECTRONIC DEVICE, METHOD FOR WIRELESS COMMUNICATION SYSTEM, AND STORAGE MEDIUM

CROSS-REFERENCE TO RELATED APPLICATIONS

The present application is a continuation of U.S. application Ser. No. 17/287,133, filed Sep. 15, 2021, which is based on PCT filing PCT/CN2019/119812, filed Nov. 21, 2019, which claims the benefit of Chinese Patent Application No. 201811424550.0, filed on Nov. 27, 2018, the entire contents of each are incorporated herein by reference.

FIELD OF THE INVENTION

The present disclosure generally relates to a wireless communication system, and more particularly to a communication technology having improved precoding.

BACKGROUND

With the development and widespread application of mobile Internet technology, wireless communication has unprecedentedly met people's voice and data communication needs. With increase of the used frequency bands (such as 26 GHz, 60 GHz or higher frequency bands), wireless channels will definitely suffer greater negative effects such as path loss, atmospheric absorption loss and the like compared with lower frequency bands (such as 2 GHz). In order to provide higher communication quality and capacity, a wireless communication system uses various technologies at different levels.

In recent years, Massive Multi-Input Multi-Output (MIMO) technology and millimeter wave technology are considered to be parts of key technologies of 5G in the future, and have attracted extensive attention in the academics and industry. Multi-user MIMO technology is used in a communication system such that the system capacity can be significantly improved by spatial multiplexing. In a multi-user MIMO system, the base station is equipped with an antenna array for communicating with a plurality of terminal devices (users), and cancels interference between different terminal devices by precoding techniques. Precoding techniques generally include linear precoding techniques and nonlinear precoding techniques.

Linear precoding algorithm, such as matched filter (MF), zero-forcing (ZF), minimum mean square error (MMSE), is widely applied in existing systems due to low computational complexity.

However, under high load scenarios, the channels of adjacent terminal devices may have strong correlation, which causes the performance of the linear precoding algorithm is severely degraded. In 5G NR, both the base station side and the terminal device side use directional beams to overcome the large path attenuation in the frequency band of 6 GHz or above, and for reducing hardware complexity, the beams are usually produced in a manner of analog beamforming, that is, radio frequency links are connected to antenna units via phase shifters, and the beams are generated by adjusting the phases of the phase shifters, so that multi-user MIMO models are slightly different. Specifically, the equivalent channels after the analog beamforming are deemed as a multi-user MIMO channel matrix, and the precoding operation is performed based on the matrix accordingly. Since a beam has a certain width, when the terminal devices are located close to each other, beams for different terminal devices are overlapped thereamong, causing inter-terminal-device interferences. Strong inter-terminal-device interferences will cause the performance of the linear precoding algorithm to be seriously deteriorated.

Depending on a dirty paper coding (DPC) theory, in a case that interferences are known, a nonlinear precoding technique can achieve maximum system performance by pre-canceling interferences. As a kind of nonlinear precoding technology, Tomlinson-Haashim Precoding (THP) is more suitable for an actual system due to its relatively small computational complexity. THP can significantly improve system performance under strong channel correlation compared to linear precoding techniques. However, since THP introduces a modulus operation to limit magnitudes of the transmitted signals, the receiving end needs to perform a modulus operation to restore the original signals, and thus allows a conventional terminal device which only support the linear precoding cannot perform the non-linear precoding.

Therefore, there is a need for improved precoding techniques to achieve better communication.

DISCLOSURE OF THE INVENTION

The present disclosure proposes a scheme of combining linear precoding and non-linear precoding for communication, wherein for a terminal device, an appropriate precoding mode can be adapted adaptively, whereby a corresponding precoding matrix can be appropriately determined.

Furthermore, the inventors have also found that the non-linear precoding, such as THP, is more sensitive to the accuracy of channel state information, and instantaneous channel state information (instantaneous CSI) should be estimated frequently, so that the overhead for channel estimation is high when the nonlinear precoding is applied in communication. Therefore, the present disclosure also proposes an improved two-stage channel state estimation scheme to effectively reduce the overhead of channel estimation for the nonlinear precoding.

In view of the above, the present disclosure provides an electronic device and method for a wireless communication system, and a storage medium.

One aspect of the present disclosure relates to an electronic device on a control device side for a wireless communication system, comprising: a processing circuit configured to: group a plurality of terminal devices of the wireless communication system into one linear precoding terminal device group and one or more nonlinear precoding terminal device groups based on respective nonlinear precoding capabilities and channel state information of the plurality of terminal devices; and notify each terminal device whether nonlinear precoding or linear precoding is to be employed in communication for the terminal device by means of a nonlinear precoding indicator based on the grouping.

Another aspect of the present disclosure relates to a method for a control device side for a wireless communication system, comprising: grouping a plurality of terminal devices of the wireless communication system into one linear precoding terminal device group and one or more nonlinear precoding terminal device groups based on respective nonlinear precoding capabilities and channel state information of the plurality of terminal devices; and notifying each terminal device whether nonlinear precoding or linear precoding is to be employed in communication for the terminal device by means of a nonlinear precoding indicator based on the grouping.

Another aspect of the present disclosure relates to an electronic device on a terminal device side for a wireless communication system, comprising: a processing circuit configured to: transmit information on nonlinear precoding capability of the terminal device and channel state information to a control device of the wireless communication system; and receive from the control device a nonlinear precoding indicator indicating whether nonlinear precoding or linear precoding is employed in communication for the terminal device; wherein the terminal device is assigned to one linear precoding terminal device group or one of one or more nonlinear precoding terminal device groups based on the nonlinear precoding capability and channel state information of the terminal device.

Another aspect of the present disclosure relates to a method for a terminal device side for a wireless communication system, comprising: transmitting information on nonlinear precoding capability of the terminal device and channel state information to a control device of the wireless communication system; and receiving from the control device a nonlinear precoding indicator indicating whether nonlinear precoding or linear precoding is employed in communication for the terminal device; wherein the terminal device is assigned to one linear precoding terminal device group or one of one or more nonlinear precoding terminal device groups based on the nonlinear precoding capability and channel state information of the terminal device.

Another aspect of the present disclosure relates to a method on control device side of a wireless communication system, wherein the wireless communication system comprises the control device, and a plurality of terminal devices which are grouped into one linear precoding terminal device group and one or more nonlinear precoding terminal device groups, the method comprising: acquiring long-term channel state information (long-term CSI); and estimating, based on the long-term channel state information, instantaneous channel state information and/or interference channel for the one or more non-linear precoding terminal device groups.

Yet another aspect of the present disclosure relates to a computer-readable storage medium storing executable instructions thereon, and the executable instructions, when executed, cause implementation of methods as mentioned above.

Yet another aspect of the present disclosure relates to a device comprising a processor, and a storage device storing executable instructions thereon, wherein the executable instructions, when executed, can implement the methods as mentioned above.

DESCRIPTION OF THE DRAWINGS

A better understanding of the present disclosure may be obtained when considering following detailed description of embodiments in conjunction with the accompanying drawings. The same or similar reference numerals are used in the drawings to indicate the same or similar components. Figures are included in the present specification together with the following detailed description and form a part of the specification, for illustrating the embodiments of the present disclosure and explaining the principles and advantages of the present disclosure. Wherein.

Figure 1:
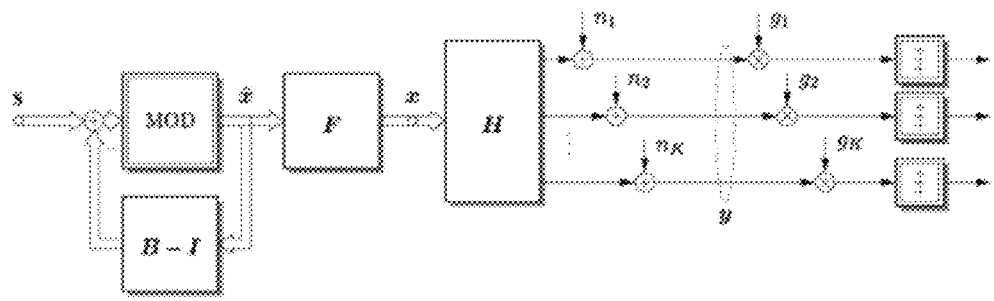
FIG. 1 schematically shows a system model of THP.

Although the embodiments described in this disclosure may be susceptible to various modifications and alternative forms, specific embodiments thereof are shown by way of example in the drawings and are described in detail herein. It should be understood, however, that the drawings and detailed description thereof are not intended to limit the embodiments to the particular forms disclosed, but on the contrary, the intention is to cover all modifications, equivalents, and alternatives falling within the spirit and scope of the claims.

DETAILED DESCRIPTION OF PREFERRED EMBODIMENTS

Representative applications of various aspects of the device and method according to the present disclosure are described below. These examples are described only to enrich the context and to help to understand the described embodiments. Therefore, it is clear to those skilled in the art that the embodiments described below can be implemented without some or all of the specific details. In other cases, well-known process steps have not been described in detail in order to avoid unnecessarily obscuring the described embodiments. Other applications are possible, and the solutions of the present disclosure are not limited to these examples.

Typically, a wireless communication system includes at least a base station (BS) and a user equipment (UE), and the base station can provide communication services for one or more UEs.

In this disclosure, the term "base station" has the full breadth of its usual meaning and includes at least a wireless communication station that is used as a part of a wireless communication system or a radio system to facilitate communication. As an example, the base station may be, for example, an eNB in a 4G communication standard, a gNB in a 5G communication standard, a remote radio head, a wireless access point, a UAV control tower, or a communication apparatus performing similar functions. The term "user equipment" or "UE" has the full breadth of its usual meaning and includes at least terminal device that is used as part of a wireless communication system or a radio system to facilitate communication. As an example, the UE may be a terminal device such as a mobile phone, a laptop computer, a tablet computer, a vehicle on-board communication apparatus, or the like, or an element thereof.

In the present disclosure, the term "control device side" has the full breadth of its usual meanings, and generally indicate a side in a communication system having a functionality of controlling transmission. Depending on the deployment of controlling functionalities in the communication system, such as centralized/distributed controlling, the "control device side" can indicate "base station" or "user equipment" side of the communication system. Similarly, the term "terminal device side" has the full breadth of its usual meanings and may accordingly indicate the "user equipment" in a communication system.

In the present disclosure, "base station" and "control device" can be used interchangeably, or "control device" can be implemented as part of "base station". The application examples of the base station/control device will be described in detail below with reference to the base station as an example. "Terminal device" and "User Equipment" (hereinafter can be simply referred to as "user") can be used interchangeably, or "terminal device" can be implemented as part of "user equipment". The application examples of the terminal device/UE will be described in detail below with reference to the user equipment as an example.

It should be noted that although the embodiments of the present disclosure are mainly described below based on a communication system including a base station and a user equipment, these descriptions can be correspondingly extended to a communication system including any other types of control device side and terminal device side. For example, for a case of downlink, the operation on the control device side may correspond to the operation of the base station, and the operation on the terminal device side may correspond to the operation of the user equipment.

The base station and the UE may have multiple antennas supporting MIMO technology. The use of MIMO technology enables the base station and the UE to use the spatial domain to support spatial multiplexing, beamforming, and transmission diversity. Spatial multiplexing can be used to transmit different data streams in the same frequency simultaneously. The data streams can be sent to a single UE to increase the data rate (can be classified as SU-MIMO technology) or to multiple UEs to increase the total system capacity (can be classified as MU-MIMO technology). This is done by spatially precoding each data stream (i.e., performing amplitude scaling and/or phase adjustment) and then transmitting each spatially precoded stream on downlinks (DL) from the base station to the UE via multiple transmission antennas. The spatially precoded data streams arrive at one or more UEs with different spatial signatures, which enables each UE to receive the data stream via its multiple antennas and restore one or more data streams destined for that UE. On uplinks (UL) from the UE to the base station, each UE transmits a spatially pre-coded data stream via its multiple antennas, which enables the base station to receive the data streams via its antennas and identify the source of each spatially pre-encoded data stream.

The linear precoding and nonlinear precoding techniques for the communication system will be described below.

In the following discussion, the linear precoding will be described by taking a zero-forcing (ZF) algorithm as an example, and the nonlinear precoding will be described by taking a THP algorithm as an example, and it is assumed that the base station transmit K data streams by M antenna ports and simultaneously serve K users, each user receives a data stream, and taking M=K as an example to describe, the case of m>K can be analogize. Herein, an antenna port can be a physical antenna (e.g., LTE low frequency band), or a logical antenna port, such as a port after the analog beamforming (such as NR performing the analog beamforming).

In the following description, unless otherwise indicated, the same symbols (including symbols in the mathematical formula, and reference numerals) will represent the same meaning, and the repeated explanation thereof will be omitted.

In the case of ZF, signals $y \in C^{K \times 1}$ (where C represents a complex space) received by K users can be represented as $$y = \frac{1}{\sqrt{r}} HFs + n,$$

Wherein, $H \in C^{K \times K}$ represents a channel matrix, $s \in C^{K \times 1}$ represents a modulated signal, $F \in C^{K \times K}$ represents a precoding matrix, r is a power normalization factor, whose value is the norm of Fs, that is, $r = \|Fs\|$, n is an additive noise vector. In the ZF algorithm, F is the pseudo-inverse of the channel matrix H, i.e., $F = H^\dagger = H^H(HH^H)^{-1}$, wherein "†" is a pseudo-inverse operator. When different users have strong channel correlation thereamong (in other words, when the interference between the users is strong), the norm of the precoding matrix F increases, resulting in increasement of the power normalization factors, which is equivalent to enlarging noise, causing system performance deterioration. Therefore, stronger inter-user interference will result in serious deterioration in the performance of the linear precoding algorithm.

FIG. 1 schematically shows a system model of THP. In the THP system model of FIG. 1, s represents a modulation signal, MOD represents a modulus operation, F is a feed-forward filter, B−I is a feedback filter, x̃ or x indicates output signal at this point, H represents a channel matrix, $n_1$ to $n_k$ presents corresponding additive noise vectors for the first to the kth users, $g_1$ to $g_k$ presents corresponding equalization coefficients for the first to the kth users.

Specifically, LU decomposition is performed on the channel matrix $H \in C^{K \times K}$ to obtain $H = RF^H = G^{-1}BF^H$, wherein R means a lower triangular matrix, F is a unitary matrix, $$G = \left\{ \frac{1}{[R]_{1,1}}, \ldots, \frac{1}{[R]_{K,K}} \right\}$$

is a diagonal matrix, and thus B is a lower triangular matrix with unitary diagonal elements, b represents elements in the lower triangular matrix. From the system model as shown FIG. 1, it can be obtained x̃ = s − (B−I)x̃ + d, in which d means an offset vector which causes the magnitude of each element in x̃ to be limited to $$\left( -\frac{\tau}{2}, \frac{\tau}{2} \right],$$

wherein τ means a modulus threshold. Note that a real part and an imaginary part of each element in the offset vector are integer multiples of T. From the above formula, it can be obtained x̃ = $B^{-1}$(s+d), and the following expression in the form of element:

$$\tilde{x}_k = s_k + d_k - \sum_{l=1}^{k-1} b_{kl} \tilde{x}_l$$

At the receiving end, the kth user uses a coefficient $g_k = [R]_{k,k}$ to balance and performs a modulus operation to remove offsets. The final received signal can be expressed as $$y' = Gy = GHF\tilde{x} + Gn = G(G^{-1}BF^H)F\tilde{x} + Gn = s + d + Gn$$

For the kth user, the equivalent reception signal to noise ratio is $SNR_k = [R]_{k,k}^2 / \sigma_n^2$.

For THP, since the modulus operation (MOD) is performed during precoding, the modulus operation is required to be performed on the corresponding terminal device side, so there may exist a terminal device that does not support the modulus operation, in other words, there may exist a terminal device that does not support the nonlinear precoding.

As explained above, the linear precoding and the nonlinear precoding have their respective advantages and limits. For example, in the 5G NR scene, when the distances between users are large, the separate beams are usually used, and the inter-user interference (IUI) is small, and thus the linear precoding can be utilized to obtain satisfactory performance, and when the distances between users are small, the beam overlapping would result in large inter-user interference, and it is required to utilize the nonlinear precoding to improve performance. On the other hand, THP requires the receiving end to perform the modulus operation, but some terminal devices may not support this operation, which would result in deterioration of communication performance.

In order to overcome the shortcomings in the prior art, the present disclosure proposes a transmission mechanism using an improved precoding technology. In particular, in the communication system of the present disclosure, a scheme of combining linear precoding and non-linear precoding is applied, wherein an appropriate precoding mode, that is, a linear precoding or a nonlinear precoding, can be adapted for a terminal device based on the performance of the terminal device adaptively, whereby a corresponding precoding matrix can be appropriately determined. Therefore, different precodings can be employed for different terminal devices for signal transmission, while the terminal devices can also receive signals accordingly, and thus the communication transmission performance is improved.

Embodiments of the present disclosure may have a variety of implementations, and can be applied to a variety of wireless communication systems, such as cellular communication systems, machine type communication (MTC) systems, self-organizing networks or cognitive radio systems (for example, IEEE P802.19.1a and Spectrum Access System (SAS)), etc.

According to one embodiment of the present disclosure, there proposes an electronic device for a control device side for a wireless communication system, comprising a processing circuit configured to group a plurality of terminal devices of the wireless communication system into one linear precoding terminal device group and one or more nonlinear precoding terminal device groups based on respective nonlinear precoding capabilities and channel state information of the plurality of terminal devices; and notify each terminal device whether nonlinear precoding or linear precoding is to be employed in communication for the terminal device by means of a nonlinear precoding indicator based on the grouping.

According to one embodiment of the present disclosure, there proposes a method for a control device side for a wireless communication system, comprising grouping a plurality of terminal devices of the wireless communication system into one linear precoding terminal device group and one or more nonlinear precoding terminal device groups based on respective nonlinear precoding capabilities and channel state information of the plurality of terminal devices; and notifying each terminal device whether nonlinear precoding or linear precoding is to be employed in communication for the terminal device by means of a nonlinear precoding indicator based on the grouping.

According to one embodiment of the present disclosure, there proposes an electronic device for a terminal device side for a wireless communication system, comprising a processing circuit configured to transmit information on nonlinear precoding capability and channel state information of the terminal device to a control device of the wireless communication system; and receive from the control device a nonlinear precoding indicator indicating whether nonlinear precoding or linear precoding is employed in communication for the terminal device; wherein the terminal device is assigned to one linear precoding terminal device group or one of one or more nonlinear precoding terminal device groups based on nonlinear precoding capability and channel state information of the terminal device.

According to an embodiment of the present disclosure, there proposes a method for a terminal device side for a wireless communication system, comprising transmitting information on nonlinear precoding capability and channel state information of the terminal device to a control device of the wireless communication system; and receiving from the control device a nonlinear precoding indicator indicating whether nonlinear precoding or linear precoding is employed in communication for the terminal device; wherein the terminal device is assigned to one linear precoding terminal device group or one of one or more nonlinear precoding terminal device groups based on nonlinear precoding capability and channel state information of the terminal device.

It should be noted that the above embodiments can also be implemented in combination with each other. The basic implementations of the embodiments of the present disclosure will be described in detail below with reference to the accompanying drawings. Note that these basic implementations can be equivalently applied to embodiments of the base station side/user device side, or other embodiments of the present disclosure.

Figure 2:
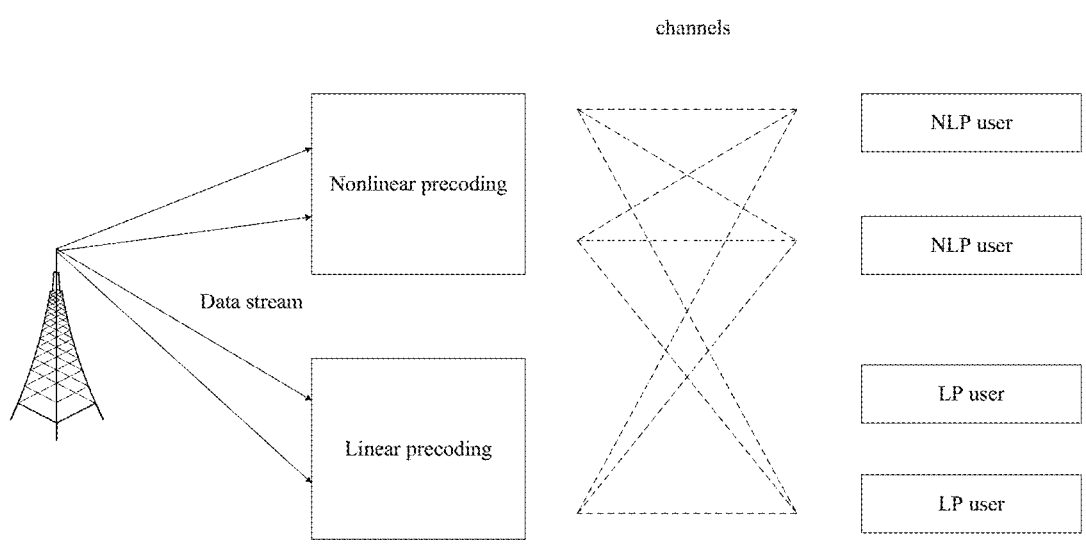
FIG. 2 schematically shows a communication system of the present disclosure which combines linear precoding and nonlinear precoding.

FIG. 2 schematically shows a communication system of the present disclosure combining the linear precoding and the nonlinear precoding. As shown in FIG. 2, in communication, the base station performs precoding by employing different precoding modes for different users. According to one embodiment of the present disclosure, the base station can group a plurality of terminal devices of the wireless communication system into one linear precoding terminal device group and one or more nonlinear precoding terminal device groups based on respective nonlinear precoding capabilities and channel state information of the plurality of terminal devices.

The nonlinear precoding capability of the terminal device can be presented in a variety of ways, so as to indicate whether the terminal device supports the nonlinear precoding, whereby the terminal device can be grouped. For example, in FIG. 2, terminal devices (i.e., an LP user) that do not have the nonlinear precoding capability can be grouped into a linear precoding terminal device group, and other terminal devices, that is, terminal devices (i.e. NLP users) that can support the nonlinear precoding, can be grouped into the same nonlinear precoding terminal device group. Although only two LP users and two NLP users are shown in FIG. 2, the number of users is not limited thereto, and the communication system according to the present disclosure may include more or fewer users.

Additionally, or alternatively, a plurality of terminal devices may also be grouped based on channel state information related to respective terminal devices. Preferably, the terminal devices that support nonlinear precoding can further be divided into one or more nonlinear precoding terminal device groups based on the channel state information. As an example, the channel state information can be interference information of terminal devices. The interference information can indicate interference between terminal devices, for example, can represent the extent of overlapping between beams for different terminal devices. According to an embodiment of the present disclosure, terminal devices with large inter-terminal-device interference can be grouped into the same nonlinear precoding terminal device group.

According to an embodiment of the present disclosure, a precoding matrix for communication for each terminal device group can be set based on the grouping of the plurality of terminal devices, thereby setting corresponding precoding matrices for communication for the grouped terminal device groups, and processing data stream by the set precoding matrices so as to optimize the communication from the base station to the terminal device. For example, in the communication system of FIG. 2, the base station may calculate precoding matrices for a linear precoding terminal device group composed of LP users and a nonlinear precoding terminal device group composed of NLP users, respectively.

According to an embodiment of the present disclosure, the base station may notify each terminal device whether nonlinear precoding or linear precoding is to be employed in communication for the terminal device by means of a nonlinear precoding indicator based on the grouping, and thus each terminal device can receive the communication in an appropriate mode based on the received indicator.

The communication system according to the present disclosure is briefly described above, and the configuration and operation of the control device side (base station) and the terminal device side (user equipment) in the communication system of the present disclosure will be described in detail.

Configuration and Operation of the Base Station According to the First Embodiment Next, a conceptual structure of an electronic device on the control device (base station) side according to an embodiment of the present disclosure will be described with reference to FIG. 3.

The control device can be implemented as a base station (BS), a small base station, a Node B, an e-NodeB (eNB), a g-NodeB (gNB), a relay, etc. in a cellular communication system, a terminal device in a MTC system, a sensor node in an ad-hoc network, a coexistence managers (CM), SAS, etc. in a cognitive radio system, and the like. For example, the control device may be implemented as any type of evoluted node B (eNB), such as a macro eNB (associated with a macro cell) and a small eNB (associated with a small cell). A small eNB may be a eNB covering a cell smaller than a macro cell, such as a micro eNB, a pico eNB, and a home (femto) eNB. Alternatively, the control device may be implemented as any other type of base station, for example, network node in the next generation network, such as an gNB, a NodeB, and a base transceiver station (BTS). The control device may include: a main body (also referred to as a base station device) configured to control wireless communication; and one or more remote wireless headend (RRH) located different from the main body. In addition, various types of terminals which will be described later can operate as the control device by temporarily or semi-persistently performing the base station function. It should be noted that the control device may be included in the base station as a component part of the base station, or may be a control device for controlling the base station which is separate from the base station.

Figure 3:
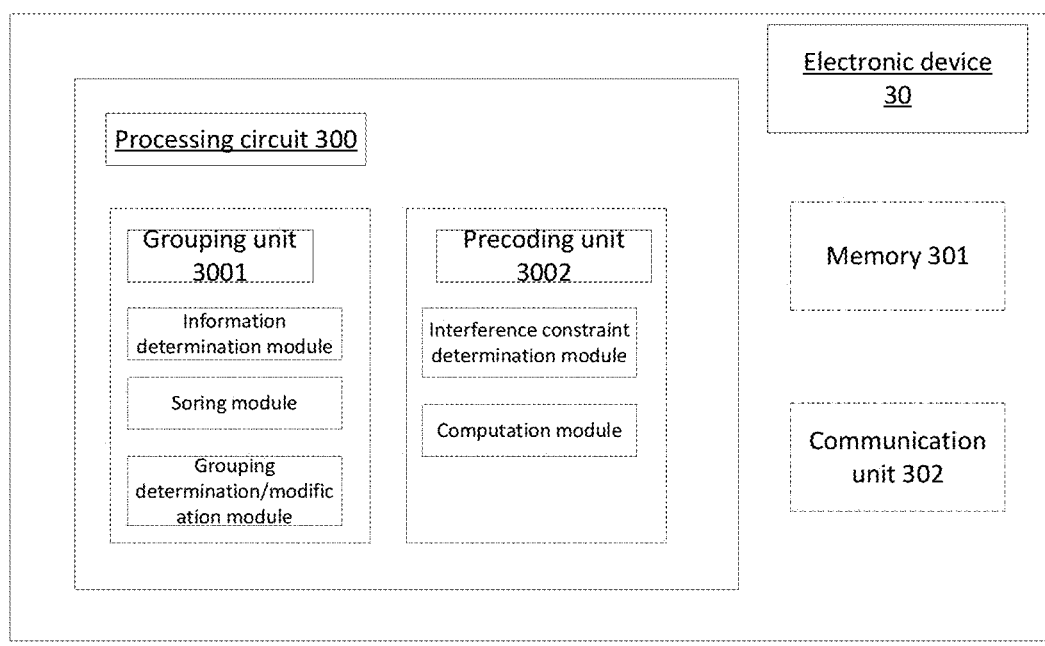
FIG. 3 schematically shows a conceptual configuration of an electronic device on control device side according to the first embodiment of the present disclosure.

As shown in FIG. 3, the electronic device 30 can include a processing circuit 300. The processing circuit 300 can be configured to group a plurality of terminal devices of the wireless communication system into one linear precoding terminal device group and one or more nonlinear precoding terminal device groups based on respective nonlinear precoding capabilities and channel state information of the plurality of terminal devices, and notify each terminal device whether nonlinear precoding or linear precoding is to be employed in communication for the terminal device by means of a nonlinear precoding indicator based on the grouping.

The processing circuit 300 may be in the form of a general-purpose processor, or may be a dedicated processing circuit, such as an ASIC. For example, the processing circuit 300 can be configured by a circuit (hardware) or a central processing device such as a central processing unit (CPU). In addition, the processing circuit 300 may carry a program (software) for operating the circuit (hardware) or the central processing device. The program can be stored in a memory (such as arranged in the memory 301) or an external storage medium connected from the outside, and downloaded via a network (such as the Internet).

According to some embodiments, the processing circuit of the electronic device can include various units to implement the embodiments according to the present disclosure. For example, the processing circuit of the electronic device can include various units to implement various operations performed on the control device side described herein.

In one embodiment, the processing circuit 300 can include a grouping unit 3001 that group a plurality of terminal devices of the wireless communication system based on respective nonlinear precoding capabilities and channel state information of the plurality of terminal devices. In implementations, the grouping unit can include various module/sub-units to implement various operations in the grouping operation described herein.

According to one embodiment, the grouping unit 3001 can include an information determination module which can be configured to determine the information required for grouping, such as information about nonlinear precoding capabilities of the terminal devices as well as channel state information. According to one embodiment, the information determination module can receive the information about nonlinear precoding capabilities from the terminal device and channel state information. According to another embodiment, the information determination module can determine the channel state information based on information related to channels between the control device and the terminal devices from the terminal device or other device. In one embodiment, the processing circuit 300 may further include a grouping determination module which can be configured to determine grouping of terminal devices based on the determined information required for grouping, such as the information about nonlinear precoding capabilities as well as channel state information.

According to one embodiment, the information about nonlinear precoding capability of a terminal device indicates whether the terminal device supports nonlinear precoding, and can be presented in a variety of ways. In some embodiments, the information about nonlinear precoding capability of the terminal device is represented by a nonlinear precoding capability indicator from the terminal device with a length of 1 bit, wherein the non-linear precoding indicator having a value of 1 indicates the terminal device supports the nonlinear precoding, and the non-linear precoding indicator having a value of 0 indicates the terminal device does not support the nonlinear precoding. In a specific embodiment, a parameter included in the UE Capability in the technical specification TS38.306 of the 5th generation communication protocol 3GPP New Radio is used to indicate whether the non-linear precoding is supported. For example, the terminal device can include the characteristic of supporting the nonlinear precoding in an information element of the UE Capability, such as FeatureSetDownLink Information Element (IE), as follows. When the network performs an inquiry for UE Capability, the terminal device generates and feedbacks the corresponding information element.

| FeatureSetDownLink information element |
| --- |
| -- ASN1START<br>-- TAG-FEATURESETDOWNLINK-START<br>FeatureSetDownLink ::=      SEQUENCE {<br>   ...<br>   Non-linear precoding           ENUMERATED (supported)<br>OPTIONAL,<br>   ...<br>}<br>-- TAG-FEATURESETDOWNLINK-STOP<br>-- ASN1STOP |

It should be understood that the way of indicating the information about non-linear precoding capability of the terminal device can be adaptively selected with respect to specific applications, but is not limited to the above situations, as long as different values can be used to indicate different precoding capabilities. As an example, the group determination module may group the terminal devices into a linear precoding device group and a nonlinear precoding device group according to the information about nonlinear precoding capability information of the terminal devices. In particular, the group determination module may classify the terminal devices among the plurality of terminal devices that do not support nonlinear precoding into the linear precoding terminal devices.

According to one embodiment, the channel state information may be an interference information indicating the inter-terminal-device interference. The interference information can indicate the interference between terminal devices, for example, may represent the extent of overlapping between beams for different terminal devices. As an example, the grouping module may further group the non-linear precoding device groups based on the channel state information, such as the interference information. According to one embodiment of the present disclosure, the terminal devices whose inter-terminal-device interference is large, such as, exceeds a predetermined threshold, can be classified into the same non-linear precoding terminal device group.

According to an embodiment of the present disclosure, in a case where the grouping configuration has been predetermined (for example, how many groups the terminal devices are divided into, how many terminal devices are included in each group), the group determination module can further modify the grouping of the terminal devices in accordance with the grouping configuration. According to one embodiment, the modification can be performed such that the number of terminal devices in the linear precoding terminal device group in the terminal device grouping after the modification is less than or equal to the number of terminal devices in the linear precoding terminal device group in the terminal device grouping before the modification. According to another embodiment, the modification can implement at least one of the following: select a terminal device in the linear precoding terminal device group that support the nonlinear precoding and is most interfered by other terminal devices in the group to add to a desired nonlinear precoding terminal device group from the linear precoding terminal device group; or select a terminal device in a non-linear precoding terminal device group that is least interfered by other terminal devices in the group to add to a desired other terminal device group from the non-linear precoding terminal device group.

According to one embodiment, the grouping unit 3001 may also include a sorting module, which can be configured to, for each nonlinear precoding group, sort the terminal devices included in the group. As an example, the terminal devices in a nonlinear precoding group can be randomly sorted. According to one embodiment, the terminal devices can be sorted based on a particular sort strategy and/or parameter. For example, it is possible to sort the terminal devices in a nonlinear precoding group based on noise conditions of respective terminal devices in the communication. Note that appropriate sorting of terminal devices can facilitate to improve the performance when calculating the precoding matrix.

Alternatively, the grouping unit 3001 can include more or fewer modules, for example, the information determination module may not be included in the processing circuit 300, and can transmit the required information to the processing circuit 300 after determining the information. Alternatively, such information can also be provided by the processing circuit 300 or even a circuit outside the electronic device 30.

The processing circuit 300 can also include a precoding unit 3002. The precoding unit 3002 can be configured to set a precoding matrix for communication for each terminal device group based on the grouping of the plurality of terminal devices, whereby the information to be transmitted may be precoded based on the set precoding matrix for communication. As an example, the information to be transmitted can be processed by linear precoding or non-linear precoding for communication. According to one embodiment, the precoding matrix used for the communication for each terminal device group can be set based on an inter-group interference constraint between the terminal device groups in the communication.

According to one embodiment, the precoding unit 3002 can include an interference constraint determination module which can be configured to specify the inter-group interference constraint for setting the precoding matrix, and a computing modules which can be configured to compute the precoding matrix used for the communication for each terminal device group based on the specification in the interference constraint.

According to one embodiment, the interference constraint determination module may specify at least one of the following groups: whether the inter-group interference by a non-linear precoding group to a linear precoding group is zero, whether the inter-group interference by a linear precoding group to a nonlinear precoding group is zero, and whether the inter-group interference by a non-linear precoding group to another nonlinear precoding group is zero. And the precoding matrix can be set based on the specified inter-group constraint. For example, in a case where the inter-group interference by one precoding group to another precoding group is set to zero, the precoding matrix for the one precoding group is orthogonal to a channel matrix for another precoding group. In a case where the inter-group interference is non-zero, the precoding matrix can be appropriately set, for example, be set such that the precoded equivalent channel matrix has a causal structure.

As an example, when the inter-group interference constraint specifies that the inter-group interference by each of the one or more nonlinear precoding terminal device groups to the linear precoding terminal device group in the communication is zero, the nonlinear precoding matrix for communication for each of the one or more nonlinear precoding terminal device groups is set to be orthogonal to a channel matrix for communication for the linear precoding terminal device group. As another example, when the inter-group interference constraint specifies that the inter-group interference by the linear precoding terminal device group to each of the one or more nonlinear precoding terminal device groups in the communication is zero, the linear precoding matrix for communication for the linear precoding terminal device group is set to be orthogonal to a channel matrix for communication for each of the one or more nonlinear precoding terminal device groups. As yet another example, when the inter-group interference constraint specifies that the inter-group interference among a plurality of nonlinear precoding terminal device groups is zero, the nonlinear precoding matrix for communication for one of the plurality of nonlinear precoding terminal device groups is set to be orthogonal to a channel matrix for communication for the others of the plurality of nonlinear precoding terminal device groups.

According to one embodiment, in a case where the inter-group interference is non-zero, the precoding matrix can be appropriately set to reduce interference. As an example, in a case where the inter-group interference constraint specifies that the inter-group interference among a plurality of non-linear precoding terminal device groups is non-zero, the precoding matrices used for the communication for the non-linear precoding terminal device groups are set so that there is a causal structure among the plurality of non-linear precoding terminal device groups, and the causal structure indicates that it is able to cancel the inter-group interference for a nonlinear precoding terminal device group by canceling the interference by one or more nonlinear precoding terminal device groups before the nonlinear precoding terminal device group to the nonlinear precoding terminal device group, in other words, the precoding matrices used for the communication for the non-linear precoding terminal device groups are set so that the precoded equivalent channel matrix has a casual structure, and it is able to cancel the inter-group interference for a nonlinear precoding terminal device group by canceling the interference by one or more nonlinear precoding terminal device groups before the nonlinear precoding terminal device group to the non-linear precoding terminal device group.

According to one embodiment, the setting of the precoding matrix for the nonlinear precoding terminal device group should also consider the characteristics of the nonlinear precoding terminal device group itself. As an example, the precoding matrix used for the communication for the non-linear precoding terminal device group can be set so that there is a causal structure among the plurality of terminal devices in the non-linear precoding terminal device group, and the causal structure indicates that it is able to cancel the inter-terminal-device interference for a terminal device by canceling the interference by one or more terminal devices before the terminal device to the terminal device, in other words, the precoding matrix used for the communication for the non-linear precoding terminal device group can be set so that the precoded equivalent channel matrix for the group has a casual structure, and it is able to cancel the inter-terminal-device interference for a terminal device by canceling the interference by one or more terminal devices before the terminal device to the terminal device.

According to some embodiments, for a non-linear precoding terminal device group, a Tomlinson-Harashima precoding (THP) algorithm can be utilized to cancel the following interferences in advance: interference between terminal devices in the non-linear precoding terminal device group, the inter-group interference by the linear precoding terminal device group to the nonlinear precoding terminal device group in a case where the inter-group interference by the linear precoding terminal device group to the nonlinear precoding terminal device group is non-zero, and the inter-group interference by another non-linear precoding terminal device group to the non-linear precoding terminal device group in a case where there are multiple non-linear precoding terminal device groups and the inter-group interference by another non-linear precoding terminal device group to the non-linear precoding terminal device group is non-zero.

According to one embodiment, the inter-group interference constraint can be pre-set, or can be dynamically set, such as dynamically set according to channel-related information of the terminal devices. The processing circuit can be further configured to determine, based on the channel status between the electronic device and the plurality of terminal devices, whether to set the inter-group interference constraint to specify that the inter-group interference by the linear precoding terminal device group to each non-linear precoding terminal device groups is zero. As an example, in a case that the channel status between the electronic device and each terminal device in the nonlinear precoding terminal device group has a fluctuation smaller than a predetermined threshold and/or a signal-to-noise ratio higher than a predetermined threshold in a predetermined period, the inter-group interference constraint can be set to specify that the inter-group interference by the linear precoding terminal device group to each non-linear precoding terminal device groups is zero.

Further, the processing circuit 300 may also include an interface circuit (not shown) for interface connection among respective units.

It should be noted that each of the above units/modules/sub-units only belongs to a logical module classified according to the specific function it implements, instead of limiting its specific implementation manner, for example, it can be implemented in software, hardware, or a combination of software and hardware. In an actual implementation, the foregoing units/modules/sub-units may be implemented as independent physical entities, or may be implemented by a single entity (for example, a processor (CPU or DSP, etc.), an integrated circuit, etc.). Furthermore, that the foregoing units/modules/sub-units are indicated by dotted lines in the figure indicates that the foregoing units/modules/sub-units may not actually exist, and the operation/functionality they achieve can be implemented by the processing circuit itself.

Furthermore, optionally, the electronic device 30 may further include a memory 301 and a communication unit 302 shown by dotted lines in the figure. In addition, the electronic device 30 may further include other components not shown, such as a radio frequency link, a baseband processing unit, a network interface, a processor, a controller, and the like. The processing circuit 300 may be associated with the memory 301 and/or the communication unit 302. For example, the processing circuit 300 may be directly or indirectly (for example, other components may be disposed therebetween) connected to the memory 301 for data access. Also for example, the processing circuit 300 may be directly or indirectly connected to the communication unit 302 to transmit radio signals via the communication unit 302 and receive radio signals via the communication unit 302.

The memory 301 may store various kinds of information generated by the processing circuit 300 (for example, information about composite data packet, information about the determined parameters, etc.), programs and data used for operation by the electronic device 30, data to be transmitted via the communication unit 302, and so on. The memory 301 is drawn with a dashed line because it can also be located inside the processing circuit 300 or even outside the electronic device 30. The memory 301 may be a volatile memory and/or a non-volatile memory, for example, the memory 301 may include, but not limited to, random access memory (RAM), dynamic random access memory (DRAM), static random access memory (SRAM), read-only memory (ROM), and flash memory.

The communication unit 302 may be configured to communicate with a terminal device under the control of the processing circuit 300. In one example, the communication unit 302 may be implemented as a transmitter or a transceiver, including communication components such as an antenna array and/or a radio frequency link, etc. In one implementation, the communication unit 302 may receive the nonlinear precoding capability indicator and channel state information of the terminal devices. In one implementation, the communication unit 102 may also transmit the precoded signals generated by the processing circuit 300 to the terminal devices.

In one implementation, the communication unit 302 can also notify the terminal device whether nonlinear precoding or linear precoding is to be employed in the present communication via a nonlinear precoding indicator. The nonlinear precoding indicator can be of a predetermined format, can have a predetermined length, and can indicate whether non-linear precoding or linear precoding is to be employed by using different values. Preferably, the non-linear precoding indicator has a length of 1 bit, and the non-linear precoding indicator having a value of 1 indicates non-linear precoding, and the non-linear precoding indicator having a value of 0 indicates linear precoding. It should be understood that the format, length, and value of the nonlinear precoding indicator can be adaptively set according to the specific application, not just limited to the above, as long as the different precoding modes can be indicated by using different values.

In one implementation, in a case where the nonlinear precoding is employed for the terminal device/terminal device group, the communication unit 302 can also transmit the terminal device a modulus information for the modulus operation at the terminal device side. According to one embodiment, the processing circuit can transmit a modulus threshold indicator to the terminal devices employing the nonlinear precoding by means of the communication unit, where the modulus threshold indicator indicates a modulus threshold when performing a modulus operation. As an example, the modulus threshold indicator is an n-bit indicator representing $2^n$ types of thresholds, where n is an integer greater than or equal to 1. It should be understood that the format, length, and value of the modulus threshold indicator can be adaptively set according to the specific application, not just limited to the above, as long as the indicator can be suitable for the set precoding mode.

Although it is shown in FIG. 3 that the processing circuit 300 is separated from the communication unit 302, the processing circuit 300 may also be implemented to include the communication unit 302. In addition, the processing circuit 300 may also be implemented to include one or more other components in the electronic device 30, or the processing circuit 300 may be implemented as the electronic device 30 itself. In an actual implementation, the processing circuit 300 may be implemented as a chip (such as an integrated circuit module including a single wafer), a hardware component, or a complete product.

The various operations implemented by the electronic device 30 will be described below with reference to FIGS. 4-10. First, a conceptual operation flow 400 of an electronic device (i.e., a base station) on the control device side according to the first embodiment of the present disclosure will be described with reference to FIG. 4

This operational flow 400 starts at S402. Subsequently, the base station receives the nonlinear precoding capabilities of the terminal devices at S404. As described above, the nonlinear precoding capabilities can serve as a basis for grouping the terminal devices. The nonlinear precoding capabilities can indicate whether the terminal devices support nonlinear precoding. For example, for the THP precoding technique, the nonlinear precoding capability can indicate whether the terminal device has the capability of mod operation for restoring the original signal. According to the first embodiment of the present disclosure, the terminal device may utilize a nonlinear precoding capability indicator to represent the nonlinear precoding capability of the terminal device, such as whether support the non-linear precoding or not. The manner of the base station receiving the nonlinear precoding ability of the terminal device is not limited thereto, and for example, the base station can be notified by only the terminal devices which do not support the nonlinear precoding, and the base station default that all other terminal devices support the nonlinear precoding. The setting of the non-linear precoding capability indicator is not limited to the above example, and for example, a nonlinear precoding capability indicator with more bits can be set as needed.

Subsequently, the base station receives the channel state information at S406. As explained above, the channel state information can be used as a basis for grouping terminal devices. In particular, the channel state information refers to downlink channel state information. The channel state information may indicate the interference information of the terminal device, which may be directly provided by the terminal device, or determined by the base station based on related information provided by the terminal device.

Next, in S408, the base station groups the terminal devices based on the received non-linear precoding capability and channel state information. According to the first embodiment of the present disclosure, based on the nonlinear precoding capability, the terminal devices among the plurality of terminal devices in the communication system that do not support non-linear precoding are grouped into the linear precoding terminal device group, and the terminal devices that do support non-linear precoding may be further grouped into one or more non-linear precoding terminal device groups based on the channel state information (for example, interference information of each terminal device). According to an implementation of the first embodiment, the grouping of terminal devices can be further modified, and the terminal devices in each group can be sorted appropriately. These will be described in detail below.

After determining the precoding terminal device groups, at S410, the base station may notify the terminal device whether nonlinear precoding or linear precoding is to be employed in communication for the terminal device by means of a nonlinear precoding indicator. For example, the base station may set the value of the non-linear precoding indicator to 1 or 0 so as to indicate whether the communication for the terminal device uses non-linear precoding or linear precoding. In an implementation of the first embodiment, the base station may only notify the terminal device that supports non-linear precoding whether non-linear precoding or linear precoding is to be employed in the present communication, and in this case, the linear precoding may be employed in the communication for the terminal devices that do not non-linear precoding by default.

At S412, the base station may set the precoding matrix for communication for each terminal device group based on the grouping result in S408. In the first embodiment, the precoding matrix can be set such that the inter-group interference for the linear precoding terminal device group is cancelled in advance, and the inter-group interference for the nonlinear precoding terminal device group can be cancelled in advance or can be cancelled by means of the corresponding algorithm. The specific setting method of the precoding matrix will be described in detail below.

After calculating the precoding matrix, the base station may precode the signals to be transmitted by using the corresponding precoding matrix, and transmit the precoded signal to the terminal device. The description will not be repeated here, and the conceptual operation flow 400 of the base station according to the first embodiment ends at S414.

The above-mentioned operation flow is merely illustrative of the operation of the base station according to the first embodiment of the present disclosure, and the illustrated operations may be performed in a different order or in parallel. For example, the base station may first receive/determine the channel state information, and then receive the nonlinear precoding capability information from the terminal device, or the channel state information and the nonlinear precoding capability information may be received by the base station at the same time. For another example, the step of transmitting the non-linear precoding indicator may be performed in parallel with the step of calculating the precoding matrix, or may be performed after the precoding matrix is calculated. It should be noted that, as the forgoing description for the electronic device 30, some steps in the above operation flow are not necessarily included in the method according to the first embodiment of the present disclosure. For example, step S412 may not be included in the method according to the first embodiment of the present disclosure, but may be executed by another operation after the method is executed.

In addition, the operations according to the embodiments of the present disclosure as described above may be implemented by the various units/modules according to the embodiments of the present disclosure as described above or other possible units/modules.

Hereinafter, an example of grouping of terminal devices by the grouping unit 3001 will be explained with reference to FIG. 5.

According to the first embodiment of the present disclosure, the base station groups a plurality of terminal devices of the wireless communication system into one linear precoding terminal device group and one or more nonlinear precoding terminal device groups based on respective nonlinear precoding capabilities and channel state information of the plurality of terminal devices.

Specifically, the base station groups the terminal devices that do not support non-linear precoding into a linear precoding terminal device group based on the information indicating the non-linear precoding capability, such as, the non-linear precoding capability indicator, received from the terminal devices. For example, among a plurality of terminal devices served by a base station, all terminal devices that do not support non-linear precoding can be uniformly divided into one linear precoding terminal device group.

Moreover, in order to prevent too many terminal devices in the same non-linear precoding terminal device group which may result in excessive computational complexity (for example, when calculating the precoding matrix), the base station can further group the terminal devices that support nonlinear precoding into one or more non-linear precoding terminal device groups based on the channel state information. In the LTE system, the channel state information may, for example, reflect the correlation between channels of different terminal devices. In the NR system, the channel state information may also be, for example, information related to beams after beamforming.

According to an embodiment, the channel state information may indicate interference information for the terminal device, for example, may indicate inter-terminal-device interference. According to an implementation of this embodiment, for terminal devices that support non-linear precoding, the base station can set a threshold for the inter-terminal-device interference, and the terminal devices with the inter-terminal-device interference whose size exceeds a predetermined threshold are grouped into the same nonlinear precoding terminal device group. The predetermined threshold can be set in various ways. For example, it can be set according to experience, or according to the application environment of the communication system, the communication technology used, and so on.

In an implementation of this embodiment, when the terminal devices are grouped based on the threshold, for a group, only one terminal device can be used as a reference for comparison of the inter-terminal-device interference. In other words, the terminal devices that divided into the same group each may have an inter-terminal-device interference with respect to the same terminal device in the group that exceeds a predetermined threshold, but the interferences between every two of all terminal devices in the group are not necessary above the threshold. In another implementation of this embodiment, when terminal devices are grouped based on a threshold, the terminal devices that divided into the same group each may have an inter-terminal-device interference with respect to any of the other terminal devices in the group that exceeds the threshold. The foregoing comparison manner for the inter-terminal-device interference is only exemplary, and other comparison manners can also be used, as long as it is ensured that when any two terminal devices are divided into different groups, the interference between the two terminal devices is less than the threshold.

Figure 5:
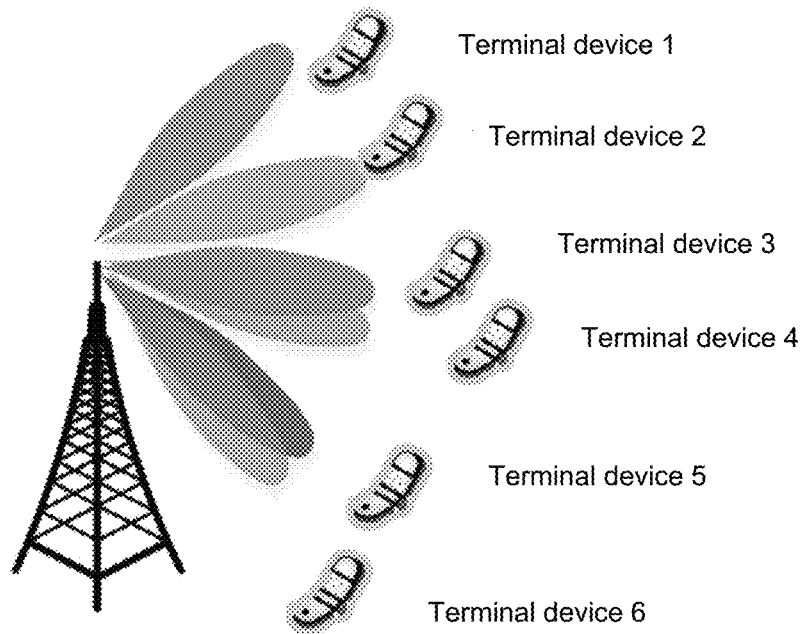
FIG. 5 schematically shows an example of grouping terminal devices in accordance with a first embodiment of the present disclosure.

As shown in FIG. 5, terminal device 1 and terminal device 2 are terminal devices that do not support non-linear precoding, and therefore can be grouped into a linear precoding terminal device group. The terminal device 3 and the terminal device 4 are located close to each other, and the interference therebetween is relatively large; the terminal device 5 and the terminal device 6 are located close to each other, and the interference therebetween is relatively large; and the terminal device (3, 4) and the terminal device (5, 6) are far apart, and the interference therebetween is small. With reference to the above, in order to prevent the computational complexity from increasing, the terminal devices with larger interference thereamong are grouped into the same non-linear precoding terminal device group. For example, the terminal device 3 and the terminal device 4 can be grouped into the non-linear precoding terminal device group A, the terminal device 5 and the terminal device 6 can be grouped into a non-linear precoding terminal device group B.

According to this embodiment, the inter-terminal-device interference between terminal devices can be measured in different ways. In one implementation, absolute values can be used to measure interference between terminal devices. In this case, the intensity of interference channel between the terminal devices is directly considered as the inter-terminal-device interference. For example, the interference $IUI_{i \to j}$ by the terminal device i with the terminal device j can be expressed as:

$$IUI_{i \to j} = |H_{i,j}|$$

Where $|H_{i,j}|$ is the intensity of an interference channel of the terminal device i with the terminal device j.

In one implementation, a relative value can be used to measure the interference between terminal devices. In this case, the ratio of the intensity of interference channel between the terminal devices to the channel intensity of the terminal device itself can be used as the interference between the terminal devices. For example, the interference $IUI_{i \to j}$ by the terminal device i with the terminal device j can be expressed as:

$$IUI_{i \to j} = \frac{|H_{i,j}|}{|H_{j,j}|}$$

Among them, $|H_{i,j}|$ is the intensity of an interference channel of the terminal device i with the terminal device j, and $|H_{j,j}|$ is the channel intensity of the terminal device j. In the LTE system and the NR system, $|H_{i,j}|$ and $|H_{j,j}|$ can have different representations. In the LTE system, $\|H_{i,j}\|$ can be measured by the correlation between the channels of terminal device i and terminal device j, that is, $|H_{i,j}|=|h_i^H h_j|$, where $h_i$ and $h_j$ indicate the channels of terminal device i and terminal device j respectively, which can be obtained through channel estimation. In the same way, $|H_{j,j}|=\sqrt{|h_j^H h_j|}=|h_j|$. In the NR system that uses beamforming, $\|H_{i,j}\|$ can depend on both the channel and the beam, for example, $|H_{i,j}|=\sqrt{|f_i h_j|}$, where $f_i$ indicates the beam of the terminal device i. Similarly, $|H_{j,j}|=\sqrt{|f_j h_j|}$, where $f_j$ indicates the beam of terminal device j. In this case, $\|H_{i,j}\|$ and $\|H_{j,j}\|$ can be directly calculated through the feedback from the terminal device in the beam scanning and interference measurement process, and the feedback from the terminal device will be described with reference to other embodiments in detail below.

According to an implementation of this embodiment, the base station can group the terminal devices based on the following grouping algorithm:

First, terminal devices that do not have non-linear precoding capabilities should be grouped into a linear precoding terminal device group. Subsequently, among the remaining terminal devices, according to the interference between the terminal devices, terminal device pairs in which the interference therebetween the terminal devices therein is greater than a certain threshold are selected iteratively and divided into the same non-linear precoding terminal device group.

Specifically, the process of dividing the non-linear precoding terminal device group is as follows:

(1) A pair of terminal devices with the largest inter-terminal-device interference is selected from the non-linear precoding terminal devices which are not grouped, and is divided into one non-linear precoding terminal device group. Here considering ordered interference measure, that is, assuming that the selected terminal device pair is terminal device i and terminal device j, the interference between terminal device pair (i, j) is $$IUI_{i \to j} = \frac{H_{i,j}^2}{H_{j,j}^2}$$

where $IUI_{i \to j}$ represents the interference by the terminal device i with the terminal device j.

(2) The terminal devices that have relatively large interference with terminal devices in the newly constructed non-linear precoding terminal device group are iteratively grouped into the group. Assuming that the newly constructed non-linear precoding terminal device group is A, for an ungrouped terminal device k, if there is $$IUI_{i \to k} = \frac{H_{i,k}^2}{H_{k,k}^2} > \eta, \text{ or } IUI_{k \to i} = \frac{H_{k,i}^2}{H_{i,i}^2} > \eta,$$

where $i \in A$ and $\eta$ is an interference threshold, then the terminal device k will be added to the newly constructed non-linear precoding terminal device group A, that is, $A = A \cup \{k\}$. After this step, the interference between any terminal device in the non-linear precoding terminal device group A and any ungrouped terminal device is less than $\eta$.

(3) the above steps (1) and (2) are repeated, until the interference among the remaining terminal devices is less than $\eta$. According to one implementation, the remaining terminal devices after completion of step (3) can be divided into a linear precoding terminal device group composed of terminal devices that do not have non-linear precoding capabilities. According to another implementation, the remaining terminal devices after completion of step (3) can also form a non-linear precoding terminal device group by themselves.

The grouping of terminal devices has been described and a specific algorithm example for the grouping has been given hereinabove. It should be pointed out that the above-mentioned specific grouping algorithm is only intended to illustrate the grouping process by way of example. The terminal device grouping involved in this disclosure is not limited to this algorithm. Other grouping algorithms can also be implemented according to specific conditions, as long as the algorithm is based on non-linear precoding capability and channel state information.

As an example, when the terminal device group is constructed iteratively in the above step (2), one terminal device in the non-linear precoding terminal device group A can be selected as the reference terminal device, and as long as the interference between an ungrouped terminal device k and the reference terminal device is greater than the threshold, the terminal device k can be added to the non-linear precoding terminal device group A. As an alternative example, as long as the interference between an ungrouped terminal device k and any terminal device in the non-linear precoding terminal device group A is greater than the threshold, the terminal device k can be added to the non-linear precoding terminal device group A.

According to an implementation of the first embodiment of the present disclosure, in order to facilitate the implementation of the system, the grouping mode of terminal devices can be preset, and after the terminal device has been grouped according to the implementation of the above-mentioned embodiment, the terminal device groups will be further modified according to the predetermined grouping mode. The predetermined grouping mode may help the base station to perform subsequent processing, for example, calculating a precoding matrix used for communication of each group. The predetermined grouping mode may, for example, specify how many groups the terminal devices are to be divided into and how many terminal devices each group includes. It should be pointed out that the predetermined grouping mode may include multiple different grouping schemes. In an actual communication, the base station may select the most appropriate grouping scheme based on the non-linear precoding capabilities and channel state information reported by the terminal devices. For example, for a communication system including 8 terminal devices, the grouping mode can be pre-designed as shown in Table 1:

TABLE 1

| index | grouping mode |
|---|---|
| 1 | 8 linear precoding terminal devices |
| 2 | 6 linear precoding terminal devices + 2 nonlinear precoding terminal devices |
| 3 | 4 linear precoding terminal devices + 4 nonlinear precoding terminal devices |
| 4 | 2 linear precoding terminal devices + 6 nonlinear precoding terminal devices |
| 5 | 8 nonlinear precoding terminal devices |
| 6 | 4 linear precoding terminal devices + 2 nonlinear precoding terminal devices (group A) + 2 nonlinear precoding terminal devices (group B) |
| 7 | 2 linear precoding terminal devices + 4 nonlinear precoding terminal devices (group A) + 2 nonlinear precoding terminal devices (group B) |
| 8 | 2 linear precoding terminal devices + 3 nonlinear precoding terminal devices (group A) + 3 nonlinear precoding terminal devices (group B) |
| 9 | 2 linear precoding terminal devices + 2 nonlinear precoding terminal devices (group A) + 2 nonlinear precoding terminal devices (group B) + 2 nonlinear precoding terminal devices (group C) |
| 10 | 6 nonlinear precoding terminal devices (group A) + 2 nonlinear precoding terminal devices (group B) |
| 11 | 4 nonlinear precoding terminal devices (group A) + 4 nonlinear precoding terminal devices (group B) |
| 12 | 3 nonlinear precoding terminal devices (group A) + 3 nonlinear precoding terminal devices (group B) + 2 nonlinear precoding terminal devices (group C) |
| 13 | 4 nonlinear precoding terminal devices (group A) + 2 nonlinear precoding terminal devices (group B) + 2 nonlinear precoding terminal devices (group C) |
| 14 | 2 nonlinear precoding terminal devices (group A) + 2 nonlinear precoding terminal devices (group B) + 2 nonlinear precoding terminal devices (group C) + 2 nonlinear precoding terminal devices (group D) |

As shown in Table 1, for a system including 8 terminal devices, it can pre-design 14 different grouping schemes, each of which may include zero or one linear precoding terminal device group and zero to multiple nonlinear precoding terminal device group. When the terminal devices are grouped based on the nonlinear precoding capabilities and channel state information, the base station can refer to the grouping schemes specified in the grouping mode, and select the most suitable scheme. That is, the most suitable terminal device group can be constructed based on both the terminal device grouping obtained according to the above embodiment and the preset grouping schemes. In this case, the grouping operations described in the above embodiments can be seen as an unconstrained grouping operation, and the grouping operation with reference to the predetermined grouping schemes can be considered as a grouping operation under constraint.

Specifically, the terminal devices can be firstly grouped based on, for example, the unconstrained grouping method as described above, and then the grouping can be adjusted to the most one selected from predetermined grouping schemes (e.g., various grouping schemes listed in Table 1) as the final terminal device grouping. This operation can be considered as modification for the grouping results.

According to one embodiment, a restriction condition for this selection is that the number of devices in the linear precoding terminal device group does not increase after the modification, and therefore, the number of devices included in the linear precoding terminal device group in the selected most appropriate predetermined grouping scheme, that is, the number of devices included in the linear precoding terminal device group in the modified grouping scheme should be less than or equal to the number of devices included in the linear precoding terminal device group in the unconstrained terminal device grouping, that is, the terminal device grouping before modification.

In a case where more than one alternative grouping schemes are present under this restriction conditions, the most appropriate grouping scheme can be selected according to a variety of rules. According to an implementation, the most appropriate predetermined grouping scheme can be selected such that the number of terminal devices moved when the unconstrained grouping scheme is modified as the predetermined grouping scheme is minimum. According to another implementation, the most appropriate predetermined grouping scheme can be a grouping scheme of more than one selectable grouping schemes that results in the optimal communication performance. Of course, other selection rules can also be used, as long as the modified grouping scheme is best for communication applications.

According to one embodiment, in the modification operation, the terminal devices in the linear precoding terminal device group or nonlinear precoding terminal device group in the obtained unconstrained grouping can be adjusted/moved to one or more nonlinear precoding terminal device groups in the selected most appropriate predetermined grouping scheme based on a plurality of movement rules.

In a case of moving a terminal device in a linear precoding terminal device group, according to a rule, one or more terminal devices in the linear precoding terminal device group that support nonlinear precoding, that is, the terminal devices that be divided into the linear precoding terminal device group after the above described step (3), can be moved. According to another rule, it is possible to select a terminal device in the linear precoding terminal device group that supports nonlinear precoding and is maximally interfered by other terminal devices in the group to add it to a desired nonlinear precoding terminal device group.

It should be noted that movement of the terminal devices in the linear precoding terminal device group should consider moving the terminal devices that support the nonlinear precoding, while the terminal devices that do not support nonlinear precoding cannot move to the nonlinear precoding groups. As an example, if all terminal devices in the linear precoding group obtained according to the unconstrained grouping do not support nonlinear precoding, when a predetermined grouping scheme is selected for modification, the number of terminal devices included in the linear precoding group in the selected predetermined grouping scheme can be equal to or greater than the number of terminal devices in the linear precoding group obtained according to the unconstrained grouping.

In a case of moving a terminal device in a nonlinear precoding terminal device group, according to a rule, a terminal device in the nonlinear precoding terminal device group that is minimally interfered by other terminal devices in the group can be selected for being added from the nonlinear precoding terminal device group to a desired another nonlinear precoding terminal device group. Note that when the grouped terminal devices need to be adjusted, at least one of the above movement rules can be performed.

For example, it is assumed that after executing the unconstrained grouping algorithm, a linear precoding terminal device group including 3 terminal devices, a non-linear precoding terminal device group A including 3 terminal devices, and a non-linear precoding terminal device group B including 2 terminal devices are obtained, and the closest grouping scheme in Table 1 is 7 or 8. The base station can randomly select one of the grouping scheme 7 or 8 as the basis of modifying the groups. In the case where the grouping scheme 7 is selected as the basis of modification, since the linear precoding terminal device group of the grouping scheme 7 includes only two terminal devices, a terminal device that support nonlinear precoding can be taken from the linear precoding terminal device group before the modification to be placed in the nonlinear precoding terminal device group A. Note that when selecting a grouping mode, the terminal device that does not support nonlinear precoding cannot be adjusted to the nonlinear precoding terminal device group. Therefore, in the foregoing example, if after step (3) described above, there is no terminal device that supports nonlinear precoding to be divided into the linear precoding terminal device group, none of the grouping scheme 7 and the grouping scheme 8 is applicable, in this case, for example, the grouping scheme 6 can serve as the basis of modification so as to adjust a nonlinear precoding user to a linear group (for example, one of the nonlinear precoding terminal devices that is minimally interfered by 3 linear precoding terminal devices is selected).

The grouping of terminal devices has been described in detail. It should be noted that the sorting of terminal devices in a terminal device group also affects the performance of the communication system. In particular, for each nonlinear precoding terminal device group, the sorting of terminal device therein may affect the performance of the communication system. In fact, in order to cancel interference between the terminal devices in the same group in advance, an equivalent channel matrix for each linear precoding group should be set to a lower triangular matrix, so the sorting of terminal devices in the group will affect elements in the lower left part of the lower triangular matrix (for example, the number of non-zero elements of the lower left part), and in turn the sorting can affect, for example, the calculation performance of the precoding matrix. In order to improve the performance of the communication system, terminal devices in each nonlinear precoding terminal device group can be sorted in accordance with a certain sorting strategy.

According to an implementation, in each nonlinear precoding terminal device group, the terminal devices are randomly sorted. According to this random strategy, when sorting, the base station sorts the terminal devices randomly, without regard to any channel information, such as inter-terminal-device interference, equivalent noise.

According to yet another implementation, a "best-first" sorting strategy can be used. According to this sorting strategy, in each nonlinear precoding terminal device group, terminal devices are sorted in accordance with their channel qualities in communication (including noise conditions, etc.), wherein terminal devices are selected and placed at the end iteratively, and the selection criterion is that when a selected terminal device is served, the equivalent noise of the selected terminal device is minimal. Specifically, in a channel matrix for a terminal device group to be nonlinear precoded, terminal devices are sorted from the first row to the last row in order of their channel qualities from low to high. For example, the terminal device whose equivalent noise is smallest (the highest channel quality) is arranged in the last row of the nonlinear precoding matrix for the group, and so on.

For example, let the channel matrix for the gth nonlinear precoding terminal device group is $H_{NLPg}$, the sorting of terminal devices is equivalent to a process of sorting the rows of $H_{NLPg}$. The transmission model of a nonlinear precoding terminal device group can be expressed as follows, $$y'_{NLP} = GH_{NLP}F_{NLP}\hat{x}_{NLP} + Gn_{NLP}$$

Where $F_{NLP}$, G, B can be obtained by LU decomposition of $H_{NLPg}$, and their meaning are the same as that described above with reference to FIG. 1, $H_{NLP} G^{-1}BF_{NLP}^{H}$. The equivalent noise is $Gn_{NLP}$.

Specifically, the sorting based on "best-first" strategy can be performed in accordance with the following steps:
in step 1, select a terminal device so that the equivalent noise is minimized when the terminal device is served. Since there is only one terminal device currently, this step is equivalent to selecting a terminal device with the best channel quality. After selected, the terminal device will be placed at the end, i.e., the last row of $H_{NLPg}$.
in step 2, select a terminal device from the remaining terminal devices so that the equivalent noise of the terminal device is minimized when using the THP algorithm to serve the terminal device and previously selected terminal devices. Note that the previously selected terminal devices have been placed at the end according to its determined order.
Iterate the step 2, until all terminal devices are selected, that is, until all terminal devices are sorted.

The "random" and "best-first" are introduced above respectively. The "random" strategy itself has a small computation load, but it may result in deterioration of performance of the subsequent operation of the communication system; "best-first" strategy can improve the performance of the communication system, but the sorting based on "best-first" itself requires a larger calculation load. In view of this, in practice, for example, an appropriate sorting strategy can be selected based on the trade-off between the calculation load of the sorting and the calculation load of the precoding matrix. For example, random sorting is preferred in some cases. Note that the terminal devices in a terminal device group can also employ any other type of sorting strategy, as long as the strategy is capable of optimizing the performance of the communication system.

Hereinafter, an example of setting a precoding matrix for communication for each terminal device group by the precoding unit 3002 will be described with reference to the drawings. In the following description, generally, "H" represents the channel matrix, "F" represents the precoding matrix, "C" represents the complex space, the subscript "LP" represents linear precoding, subscript "NLP" means nonlinear precoding, "s" represents a modulated signal, and "r" represents a power normalization factor and "n" represents an additive noise vector. For convenience, the specific meaning of the above symbols will be partly omitted in the following description, and in such a case, these symbols represent the general meanings as described herein.

According to the first embodiment of the present disclosure, the precoding matrix for communication for each terminal device group is set according to the constraints for inter-group interference between the terminal device groups in the communication. The constraints for inter-group interference can be understood as a precondition for calculating the precoding matrix, that is, the provisions of the constraints for inter-group interference may be equivalent to that before the precoding matrix is set, pre-operations shall be performed so that the inter-group interferences between the terminal device groups meet the requirements of the constraints. Different inter-group interference constraints may result in different precoding matrices. Therefore, the precoding matrix calculation process will be discussed under the condition of different inter-group interference constraints.

As described above, the terminal devices can be divided into a linear precoding terminal device group and one or more nonlinear precoding terminal device groups. Accordingly, the inter-group interference constraints can be selected to include at least one of the constraint for inter-group interference by a nonlinear precoding terminal device group to the linear precoding terminal device group, the constraint for inter-group interference by the linear precoding terminal device group to a nonlinear precoding terminal device group, and the constraint for inter-group interference between respective nonlinear precoding terminal device groups in the case whether there exists a plurality of nonlinear precoding terminal device groups. According to an implementation of the present disclosure, the inter-group interference constraint may specify whether the interference between respective terminal device groups is zero. In other words, this specification of inter-group interference constraint may be equivalent to whether or not to perform a pre-operation such that the inter-group interference between the terminal device groups is zero before the precoding matrix is set.

Next, the specification of inter-group interference constraint and an example of setting the precoding matrix based on the inter-group interference constraint in a case where the terminal devices are grouped into a linear precoding group and a nonlinear precoding group will be described with reference to FIG. 6 and FIG. 7.

Setting for Inter-Group Interference Constraints

Assume the communication system includes K terminal devices, the number of linear precoding terminal devices and nonlinear precoding terminal devices are $K_{LP}$ and $K_{NLP}$ respectively, $K_{LP}+K_{NLP}=K$. According to the above introduction to the linear precoding, it can be obtained that the signal $y_{LP} \in C^{K_{LP} \times 1}$ received by the linear precoding terminal device group is $$y_{LP} = \frac{1}{\sqrt{r}} H_{LP} F_{LP} s_{LP} + n_{LP},$$

where $H_{LP} \in C^{K_{LP} \times K}$ indicates a channel matrix for the linear precoding terminal device groups, $F_{LP} \in C^{K \times K_{LP}}$ indicates a precoding matrix for the linear precoding terminal device groups, $s_{LP} \in C^{K_{LP} \times 1}$ indicates a modulated signal for the linear precoding terminal device group, r indicates a power normalization factor, and $n_{LP}$ indicates an additive noise vector.

Similarly, the signal $y'_{NLP} \in C^{K_{NLP} \times 1}$ received by the linear precoding terminal device group is $$y'_{NLP} = GH_{NLP}F_{NLP}\tilde{x}_{NLP} + Gn_{NLP},$$

where $H_{NLP} \in C^{K_{NLP} \times K}$ indicates channel matrices for the nonlinear precoding terminal device groups, $F_{NLP} \in C^{K \times K_{NLP}}$ indicates precoding matrices for the nonlinear precoding terminal device groups, $\tilde{x}_{NLP} = B^{-1}(s_{NLP} + d)$, $s_{NLP} \in C^{K_{NLP} \times 1}$ indicates modulated signals for the nonlinear precoding terminal device groups. Note that $F_{NLP}$, G, B can be obtained by LU decomposition of $H_{NLP}$, and d indicates offsets as mentioned above.

From the above models, the inter-group interferences for the linear precoding terminal device group and the nonlinear precoding terminal device group can be obtained as follows:

$$IUI_{LP \to NLP} = \frac{1}{\sqrt{r}} H_{NLP} F_{LP} s_{LP}$$

$$IUI_{NLP \to LP} = H_{LP} F_{NLP} \tilde{x}_{NLP}$$

Wherein, $IUI_{LP \to NLP}$ represents the inter-group interference by a linear precoding terminal device group to a nonlinear precoding terminal device group, $IUI_{NLP \to LP}$ represents the inter-group interference by the nonlinear precoding terminal device group to the linear precoding terminal device group, and will be used as described below.

Since the linear precoding terminal device does not support the modulus operation in the receiving end, serial interference cancellation cannot be applied, it is necessary to ensure that the interference by a nonlinear precoding terminal device group to the linear precoding terminal device group is zero, that is, $IUI_{LP \to NLP} = 0$. However, the interference by the linear precoding terminal device group to the nonlinear precoding terminal device group can be cancelled in advance by means of a specific algorithm, and therefore $IUI_{LP \to NLP} = 0$, or $IUI_{LP \to NLP} \neq 0$ are acceptable. In view of the above, settings can be made so that the constraints for inter-group interference are specified as:

The inter-group interference by a nonlinear precoding terminal device group to a linear precoding terminal device group is zero; and The inter-group interference by a linear precoding terminal device group to a nonlinear precoding terminal device group is zero or non-zero.

That is, for a case where the terminal devices can be divided into a linear precoding group and a nonlinear precoding group, the constraint for inter-group interference can be specified into two modes:

Mode 1: $IUI_{NLP \to LP} = 0$, and $IUI_{LP \to NLP} = 0$,

Mode 2: $IUI_{NLP \to LP} = 0$, and $IUI_{LP \to NLP} \neq 0$.

Next, the setting of precoding matrix in such two modes of inter-group interference constraints will be discussed separately.

Setting of Precoding Matrix Based on Inter-Group Interference Constraint Setting of Precoding Matrix in Mode 1:

In this scenario, the constraints for inter-group interference specify that the inter-group interference by a nonlinear precoding terminal device group to a linear precoding terminal device group is zero, and the inter-group interference by the linear precoding terminal device group to the nonlinear precoding terminal device group is zero. Based on the constraints for inter-group interference, a non-linear precoding matrix that used for communication for a non-linear precoding terminal device group is set to be orthogonal to a channel matrix that used for communication for a linear precoding terminal device group, and a linear precoding matrix that used for communication for the linear precoding terminal device group is set to be orthogonal to a channel matrix that used for communication for the nonlinear precoding terminal device group.

According to an implementation of the present embodiment, that a precoding matrix for a terminal device group is set to be orthogonal to a channel matrix for another terminal device group can be implemented by calculating/setting the precoding matrix for the terminal device group based on projection on a zero space of the channel matrix for the another terminal device group. For example, a projection matrix for a channel matrix for the terminal device group to the zero space of the channel matrix for the another terminal device group can be first calculated, then the projected channels from the channel matrix for the another terminal device group to the zero space are calculated based on the projection matrix, and finally the precoding matrix for the terminal device group is calculated based on the projected channels.

Specifically, under constraints that $IUI_{NLP \to LP} = 0$ and $IUI_{LP \to NLP} = 0$, the precoding matrices for the linear precoding terminal device group and for the nonlinear precoding terminal device group can be set in the following manner: For the linear precoding terminal device group, a projection matrix PNLP E $C^{K \times K}$ on the zero space of a channel matrix $H_{NLP} \in C^{K_{NLP} \times K}$ for the nonlinear precoding user group is first calculated, the calculation of the projection matrix can use, for example, a Gram-Schmidt orthogonalization algorithm, $P_{NLP}^{\perp}$ results in $H_{NLP}P_{NLP}^{\perp} = 0$. Subsequently, a channel matrix $H_{LP}$ for the linear precoded terminal device group is projected to the zero space to obtain projected channels $H'_{LP} = H_{LP}P_{NLP}^{\perp}$. Based on the projected channels, a precoding matrix for the projected channel is calculated as $F'_{LP} = (H'_{LP})^{\dagger} = (H_{LP}P_{NLP}^{\perp})^{\dagger}$. Finally, a precoding matrix for the linear precoding terminal device group $F_{LP} = P_{NLP}^{\perp}F'_{LP} = P_{NLP}^{\perp}(H_{LP}P_{NLP}^{\perp})^{\dagger}$ is obtained. It can be obtained that the interference $IUI_{LP \to NLP}$ by the linear precoding terminal device group to the nonlinear precoding terminal device group is $$IUI_{LP \to NLP} = \frac{1}{\sqrt{r}} H_{NLP} F_{LP} s_{LP} = \frac{1}{\sqrt{r}} H_{NLP} P_{NLP}^{\perp} (H_{LP} P_{NLP}^{\perp})^{\dagger} s_{LP}$$

Because $H_{NLP}P_{NLP}^{\perp} = 0$, $IUI_{LP \to NLP} = 0$.

For the nonlinear precoding terminal device group, similarly, a projection matrix $P_{LP}^{\perp} \in C^{K \times K}$ on the zero space of a channel matrix $H_{LP} \in C^{K_{LP} \times K}$ for the linear precoding user group is first calculated, wherein $H_{LP}P_{LP}^{\perp} = 0$. Subsequently, a channel matrix $H_{NLP}$ for the nonlinear precoding terminal device group is projected to the zero space to obtain projected channels $H'_{NLP} = H_{NLP}P_{LP}^{\perp}$, and LU decomposition is performed on the projected channels to obtain $H'_{NLP} = R$ $(F'_{NLP})^H = G^{-1}B(F'_{NLP})^H$. Finally, a precoding matrix for the nonlinear precoding terminal device group $F_{NLP} = P_{LP}^\perp F'_{NLP}$ is obtained. It can be obtained that the interference $IUI_{NLP \to LP}$ by the nonlinear precoding terminal device group to the linear precoding terminal device group is $$IUI_{NLP \to LP} = H_{LP}F_{NLP}\tilde{x}_{NLP} = H_{LP}P_{LP}^\perp F'_{NLP}\tilde{x}_{NLP}$$

Because $H_{LP}P_{LP}^\perp = 0$, $IUI_{NLP \to LP} = 0$.

Through the above method, the precoding matrices for the nonlinear precoding terminal device group and for the linear precoding terminal device group $F_{NLP}$ and $F_{LP}$ are orthogonal to channel matrices $H_{LP}$ and $H_{NLP}$ respectively, and thus the inter-group interference is zero. Note that in order to implement a precoding matrix and a particular channel matrix being orthogonal to each other, the above implementation employs a method of calculating the precoding matrix by projection on the zero space of the corresponding channel matrix, but this method is not limiting, and those skilled in the art can also use other ways to set the precoding matrix to make the precoding matrix be orthogonal to a particular channel matrix so as to meet the specification for the inter-group interference constraints.

Figure 6:
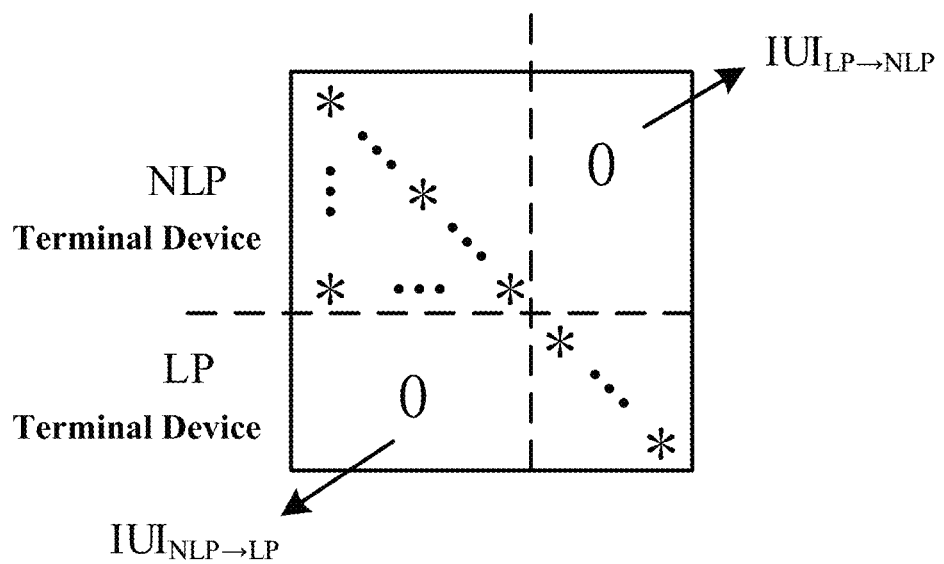
FIG. 6 schematically shows a structure of an equivalent channel matrix in a case where the inter-group interference by a linear precoding terminal device group to a nonlinear precoding terminal device group is zero, according to a first embodiment of the present disclosure.

FIG. 6 shows a structure of a precoded equivalent channel matrix, that is, a precoding matrix for all terminal devices, in a case where the inter-group interference by a linear precoding terminal device group to a nonlinear precoding terminal device group is zero, according to a first embodiment of the present disclosure. For example, an equivalent channel matrix can be defined using the following formula:

$$H^{eq} = \begin{bmatrix} H_{NLP} \\ H_{LP} \end{bmatrix} [F_{NLP} \quad F_{LP}]$$

In FIG. 6, "*" indicates non-zero values, so it can be seen that the equivalent channel matrix is set to a block diagonal structure, that is, meeting a constraint that $IUI_{NLP \to LP} = 0$ and $IUI_{LP \to NLP} = 0$. Furthermore, a precoding matrix for the linear precoding terminal device group, i.e., a block in the equivalent channel matrix used for linear precoding terminal devices, is set to a diagonal matrix, that is, after linear precoding, the linear precoding terminal devices are not interfered by any other terminal device.

Furthermore, as shown in FIG. 6, a precoding matrix for the nonlinear precoding terminal device group can be set such that a corresponding block in the equivalent channel matrix for the nonlinear precoding terminal devices is set to a lower triangle matrix, i.e., has a causal structure. The causal structure refers to a matrix structure in which a matrix element arranged later is only affected by matrix elements arranged previously, such as a lower triangular structure. Specifically, the diagonal elements in the block for nonlinear precoding terminal devices represents the i-th terminal device's own channel, and the elements other than the diagonal elements indicate the interference by other terminal devices to the terminal device i. As shown in FIG. 6, in the block for non-linear precoding terminal devices, the first terminal device (i.e., a terminal device represented by the first line) is not interfered by any other terminal device, the second terminal device is only interfered by the first terminal device (i.e., only $IUI_{1 \to 2}$ can be a non-zero value), the third terminal device can only be interfered by the first and second terminal devices (i.e., only $IUI_{1 \to 2}$, $IUI_{2 \to 3}$ can be a non-zero value), . . . , the ith terminal device can only be interfered by the terminal devices in front of it (i.e., only $IUI_{1-j \to i}$ can be non-zero value, where j<i). This causal structure makes it possible to easily serialize interference between terminal devices. Preferably, the THP algorithm can be employed to cancel inter-terminal devices interference.

In other words, the precoding matrix used for the communication for a non-linear precoding terminal device groups is set so that there is a causal structure among elements in the corresponding equivalent channel matrix for the plurality of n terminal devices in the non-linear precoding terminal device group have a causal structure, and the causal structure indicates that it is able to cancel the inter-terminal-device interference for a terminal device by cancelling the interference by one or more terminal devices before the terminal device to the terminal device.

Setting of Precoding Matrix in Mode 2:

In this scenario, the constraints for inter-group interference specify that the inter-group interference by a nonlinear precoding terminal device group to a linear precoding terminal device group is zero, and the inter-group interference by the linear precoding terminal device group to the non-linear precoding terminal device group is non-zero, and wherein the non-zero inter-group interference can be cancelled by a precoding algorithm, such as THP. Based on the constraints for inter-group interference, a non-linear precoding matrix that used for communication for a non-linear precoding terminal device group is set to be orthogonal to a channel matrix that used for communication for a linear precoding terminal device group, and a linear precoding matrix that used for communication for the linear precoding terminal device group is set without considering orthogonality to a channel matrix that used for communication for the nonlinear precoding terminal device group.

According to an implementation of the present embodiment, similar to that described with reference to mode 1, setting a precoding matrix for a terminal device group to be orthogonal to a channel matrix for another terminal device group can be implemented by projecting the precoding matrix for the terminal device group on a zero-space of the channel matrix for the other terminal device group.

Specifically, under constraints that $IUI_{NLP \to LP} = 0$ and $IUI_{LP \to NLP} \neq 0$, the precoding matrices for a linear precoding terminal device group and for a nonlinear precoding terminal device group can be set in the following manner:

For the linear precoding terminal device group, since it is not necessary to make $IUI_{LP \to NLP} = 0$, which is equivalent to no constraint for interference, the precoding matrix $F_{LP} = (H_{LP})^\dagger$ can be directly obtained by pseudo-inverse of the channel matrix, and the interference $IUI_{LP \to NLP}$ by the linear precoding terminal device group to the nonlinear precoding terminal device group is $$IUI_{LP \to NLP} = \frac{1}{\sqrt{r}} H_{NLP}F_{LP}s_{LP} = H_{inter}s_{LP}$$

wherein $$H_{inter} = \frac{1}{\sqrt{r}} H_{NLP}F_{LP} = \frac{1}{\sqrt{r}} H_{LNP}(H_{LP})^\dagger \in C^{K_{NLP} \times K_{LP}}$$

interference channel and is non-zero. In an implementation, $H_{inter}$ can be estimated based on beamformed reference signals, in such a case, a vector for beamforming the reference signals can be calculated by means of the precoding matrix, for example, the vector for beamforming the reference signals can be $$\frac{1}{\sqrt{r}} F_{LP}.$$

For the nonlinear precoding terminal device group, due to constraints that $IUI_{NLP \to LP}=0$, the precoding matrix for the nonlinear precoding terminal device group needs to be set so that the precoding matrix is orthogonal to the channel matrix for the linear precoding terminal device group, similar to mode 1, the orthogonal setting can be implemented by projecting the precoding matrix for the on a zero-space of the channel matrix for the linear terminal device group. Specifically, for example, a projection matrix $P_{LP}^\perp \in C^{K \times K}$ of the nonlinear terminal device group on the zero space of a channel matrix $H_{LP} \in C^{K_{LP} \times K}$ for the linear precoding user group is first calculated, wherein $H_{LP}P_{LP}^\perp=0$. Subsequently, a channel matrix $H_{NLP}$ for the nonlinear precoding terminal device group is projected to the zero space to obtain projected channels $H'_{NLP}=H_{NLP}P_{LP}^\perp$, and LU decomposition is performed on the projected channels to obtain $H'_{NLP}=R$ $(F'_{NLP})^H=G^{-1}B(F'_{NLP})^H$. Finally, a precoding matrix for the nonlinear precoding terminal device group $F_{NLP}=P_{LP}^\perp F'_{NLP}$ is obtained.

Figure 7:
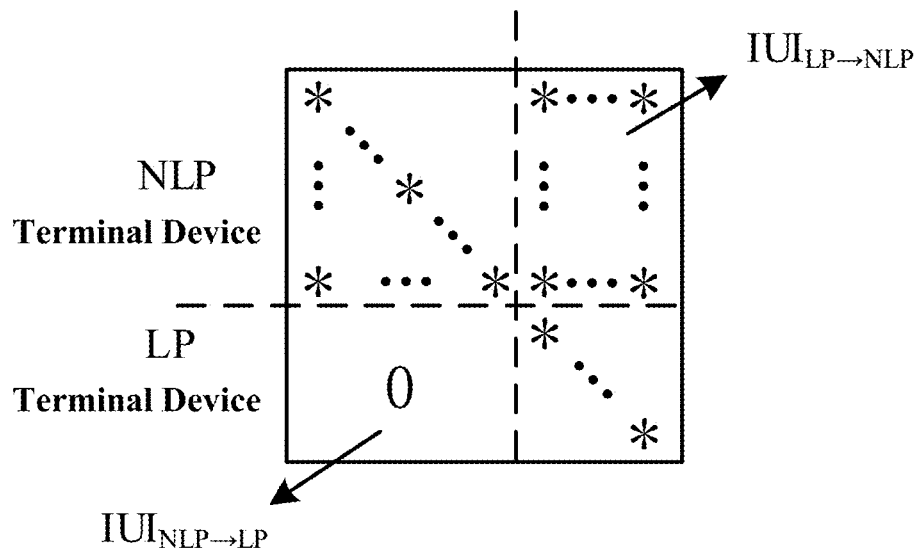
FIG. 7 schematically shows a structure of an equivalent channel matrix in a case where the inter-group interference by a linear precoding terminal device group to a nonlinear precoding terminal device group is non-zero, according to a first embodiment of the present disclosure.

FIG. 7 shows a structure of a precoded equivalent channel matrix, that is, a precoding matrix for all terminal devices, in a case where the inter-group interference by a linear precoding terminal device group to a nonlinear precoding terminal device group is non-zero, according to a first embodiment of the present disclosure. For example, the equivalent channel matrix can be defined using the following formula:

$$H^{eq} = \begin{bmatrix} H_{NLP} \\ H_{LP} \end{bmatrix} [F_{NLP} \quad F_{LP}]$$

In FIG. 7, "*" represents non-zero values, so it can be seen that the equivalent channel matrix set in the mode 2 of inter-group interference constraint is no longer a block diagonal structure, the non-zero values in the upper corner of the matrix reflects the interference of linear precoding terminal devices to nonlinear precoding terminal devices. Further, similar to mode 1 as described above with reference to FIG. 6, on the one hand, a precoding matrix for the linear precoding terminal device group, i.e., a block in the equivalent channel matrix for linear precoding terminal devices, is set to a diagonal matrix, that is, after linear precoding, the linear precoding terminal devices are not interfered by any other terminal device, on the other hand, a precoding matrix for the nonlinear precoding terminal device group can be set such that a block in the equivalent channel matrix for the nonlinear precoding terminal devices is set to a lower triangle matrix, i.e., has a causal structure, so that the interference by the terminal devices to the nonlinear precoding terminal devices can be cancelled serially.

In Mode 2 of inter-group interference constraints, for nonlinear precoding terminal devices, in addition to interference by other nonlinear precoding terminal devices from the same group, there also exists the interference from linear precoding terminal devices (i.e., represented as non-zero elements in the upper right corner as shown in FIG. 7). In fact, for nonlinear precoding terminal devices, the received signals after equalization and modulus operation can be expressed as follows.

$$y'_{NLP} = Gy_{NLP} =$$
$$GH_{NLP}F_{NLP}\tilde{x}_{NLP} + GH_{inter}s_{LP} + Gn_{NLP} = B\tilde{x}_{NLP} + GH_{inter}s_{LP} + Gn_{NLP}$$

Where the second term $GH_{inter}s_{LP}$ indicates the interference from the linear precoding terminal device group.

Therefore, when the serial interference cancellation is to be performed, in addition that the interference from the nonlinear precoding terminal devices needs to be cancelled (for example, the interference cancellation based on the causal structure as described above with reference to FIG. 6), it is also necessary to cancel the interference from the linear precoding terminal devices. Preferably, both kinds of interferences can be cancelled using the THP algorithm. Specifically, the signals after interference cancellation can be expressed as $$[\tilde{x}_{NLP}]_k = [s_{NLP}]_k + d_k - \sum_{l=1}^{k-1} b_{kl}[\tilde{x}_{NLP}]_l - \sum_{l=1}^{K_{LP}} g_k[H_{inter}]_{kl}[s_{LP}]_l, 1 \le k \le K_{NLP}$$

Wherein, "-" indicates the interference to be cancelled.
Selection of Modes of Inter-Group Interference Constraint Two modes of inter-group interference constraint and corresponding precoding matrix setting methods have been described above with reference to FIGS. 6 and 7. The modes are different from each other in term of sources incurring overhead.

Specifically, in Mode 1, i.e., $IUI_{NLP \to LP}=0$ and $IUI_{LP \to NLP}=0$, compared with Mode 2, since it is necessary to set a linear precoding matrix for the linear precoding terminal device group to be orthogonal to a channel matrix for the nonlinear precoding terminal device group in addition that a non-linear precoding matrix for a non-linear precoding terminal device group is orthogonal to a channel matrix for a linear precoding terminal device group, the operation of setting orthogonal matrices, such as the operation of projection on the zero space as described above, may cause energy loss and produce computational overload. But in Mode 1, since the interference from linear precoding terminal devices has been pre-cancelled at the terminal device side, there is no need to estimate instantaneous channel state information for the interference channels to perform an interference cancellation algorithm, and thus, the computational overhead and energy overhand for performing instantaneous interference channel estimation and performing interference cancellation algorithm can be saved.

In Mode 2, that is, $IUI_{NLP \to LP}=0$ and $IUI_{LP \to NLP} \ne 0$, since the precoding matrix for the linear precoding terminal device group is not required to be orthogonal to the channel matrix for the nonlinear precoding terminal device group, the energy loss and computational overhead loss caused by the operation of setting orthogonal matrices can be avoided. However, in order to cancel interference from the linear precoding user group, it is necessary to additionally acquire instantaneous channel state information of the interference channel and perform the corresponding interference cancellation algorithm, thereby certain energy and calculation overhead may be produced in this regard.

Considering respective advantages and disadvantages of such two modes, preferably, it is possible to determine whether the inter-group interference constraint is set to specify the inter-group interference by the linear precoding terminal device group to the nonlinear precoding terminal device group is zero, based on the channel state between the base station and the terminal devices. Furthermore, in a case where the channel state is relatively stationary and the signal-to-noise is relatively high, it is preferable to set the inter-group interference constraint according to Mode 1, that is, it is specified $IUI_{NLP \to LP}=0$ and $IUI_{LP \to NLP}=0$. For example, in a case where the channel state between the base station and each of terminal devices included in a nonlinear precoding terminal device group has a fluctuation less than a predetermined threshold in a predetermined period of time and/or a signal-to-noise ratio is higher than a predetermined threshold, the inter-group interference constraint is set to specify the inter-group interference by the linear precoding terminal device group to the nonlinear precoding terminal device group is zero.

Hereinabove the setting of the inter-group interference constraint and the corresponding calculation method of precoding matrix have been described with reference to an example in which one nonlinear precoding terminal device and one linear precoding terminal device group are included. In fact, as explained with reference to the grouping of terminal devices, in order to prevent an excessive number of terminal devices from being included in one and the same non-linear precoding terminal device group which may result in increased computational complexity, it is possible to only group the terminal devices with relatively large interference therebetween into the same non-linear precoding terminal device group. In this case, the communication system may include one linear precoding terminal device group and multiple non-linear precoding terminal device groups. In the following, the setting of the inter-group interference constraint and the setting of precoding matrix will be described based on a case in which one nonlinear precoding terminal device and a plurality of linear precoding terminal device groups are combined.

Figure 8:
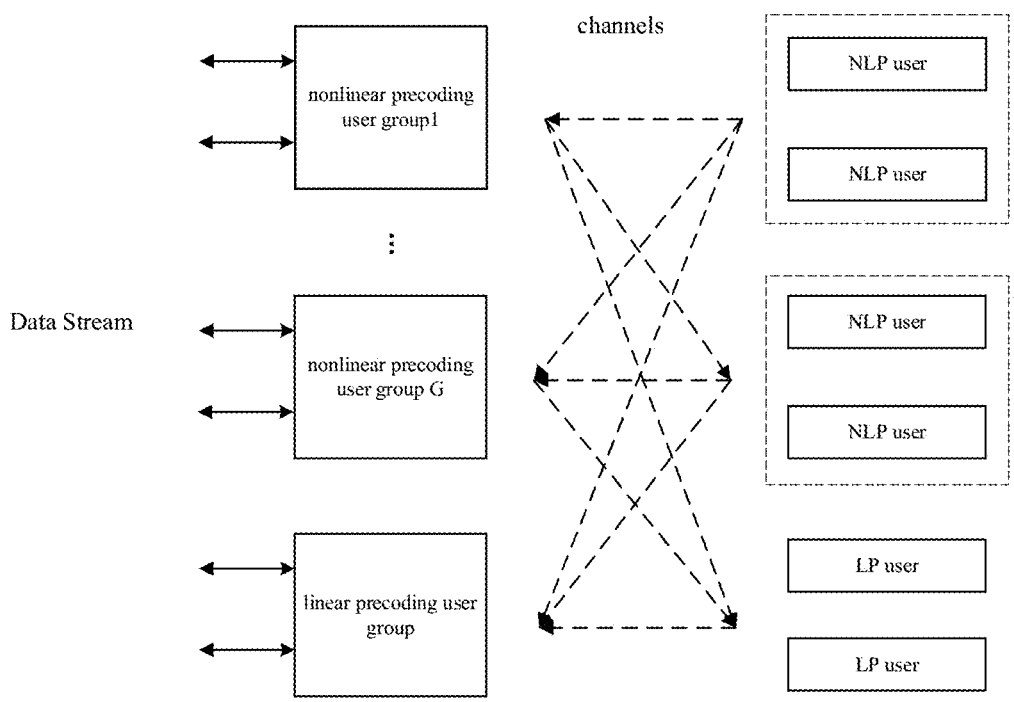
FIG. 8 schematically shows a model combining the linear and nonlinear precoding comprising a plurality of nonlinear precoding terminal device groups and one linear precoding terminal device group, according to a first embodiment of the present disclosure.

FIG. 8 shows a model combining the linear and nonlinear precoding comprising a plurality of nonlinear precoding terminal device groups and one linear precoding terminal device group, according to a first embodiment of the present disclosure. As shown in FIG. 8, the model includes one linear precoding terminal device group and G nonlinear precoding terminal device groups. Under such a joint model, the base station will calculate a precoding matrix for communication for the plurality of terminal device groups based on the specification of inter-group interference constraints accordingly.

Setting of Inter-Group Interference Constraints

As explained above, since the linear precoding terminal device does not support modulus operation at the receiving end and cannot apply serial interference cancellation, it is necessary to ensure that the interference by a non-linear precoding terminal device group to the linear precoding terminal device group is zero. That is, $IUI_{NLP \to LP}=0$. The interference $IUI_{LP \to NLP}$ by the linear precoding terminal device group to the nonlinear precoding terminal device group can be cancelled in advance by means of a certain algorithm, so $IUI_{LP \to NLP}=0$ or $IUI_{LP \to NLP} \neq 0$ is acceptable. In addition, the interference $IUI_{LP \to NLP}$ by a nonlinear precoding terminal device group to another nonlinear precoding terminal device group can also be eliminated in advance by means of a certain algorithm, so $IUI_{NLP \to NLP}=0$ or $IUI_{NLP \to NLP} \neq 0$ is also acceptable. In view of the above, the inter-group interference constraint can be set to specify:

In the communication, the inter-group interference by each nonlinear precoding terminal device group in the one or more nonlinear precoding terminal device groups to the linear precoding terminal device group is zero;

The inter-group interference by the linear precoding terminal device group to each of the one or more nonlinear precoding terminal device groups is zero or non-zero; and;

The inter-group interference between multiple non-linear precoding terminal device groups is zero or non-zero.

It can be seen that, compared with the case of including one linear precoding terminal device group and one nonlinear precoding terminal device group, in addition to the constraints for interference between the linear precoding terminal device group and each nonlinear precoding terminal device group, the constraints for interference between respective non-linear precoding terminal device groups shall also be considered.

Setting of Precoding Matrix Based on the Constraints for Inter-Group Interference Similar to the above, when the constraints for inter-group interference specify that the inter-group interference by a terminal device group to another terminal device group is zero, a precoding matrix that used for communication for the terminal device group is set to be orthogonal to a channel matrix that used for communication for the another terminal device group. In particular, when the constraints for inter-group interference specify the inter-group interference between multiple non-linear precoding terminal device groups is zero, a nonlinear precoding matrix that used for communication for a nonlinear precoding terminal device group in the multiple nonlinear precoding terminal device groups is orthogonal to a channel matrix that used for communication for another nonlinear precoding terminal device group in the multiple nonlinear precoding terminal device groups. The orthogonality among matrices can be implemented by projecting the precoding matrix of a terminal device group onto a zero space of the channel matrix of another terminal device group. The following will be discussed for the linear precoding terminal device group and each nonlinear precoding terminal device group.

For the linear precoding terminal device group, in the model of FIG. 8, two scenarios $IUI_{LP \to NLP_g}=0$ and $IUI_{LP \to NLP_g} \neq 0$ can be supported, wherein $IUI_{LP \to NLP_g}$ represents the interference by the linear precoding terminal device group to the g-th nonlinear precoding terminal device group. For each non-linear precoding terminal device group, $IUI_{LP \to NLP_g}$ can be flexibly constrained. For example, it can be constrained that the interference by the linear precoding terminal device group to a part of non-linear precoding terminal device groups is zero. In this case, the precoding matrix for the linear terminal device group can be projected onto a zero space of the channel matrix for a corresponding nonlinear terminal device group to implement the orthogonality between such two matrices.

Specifically, assume a projection matrix on the zero space of a channel matrix $H_{NLP_g} \in C^{K_{NLPg} \times K}$ for the gth nonlinear precoding terminal device group is $P_{NLP_g}^\perp \in C^{K \times K}$, which results in $H_{NLP_g} P_{NLP_g}^\perp = 0$. All projection matrices $P_{NLP_g}^\perp$ of nonlinear precoding terminal device groups under the constraint $IUI_{LP \to NLP_g}=0$ are multiplied, and the final projection matrix $P_{NLP}^\perp$ can be obtained. Taking four nonlinear precoding terminal device groups as an example, where group 1 and group 2 constrain $IUI_{LP \to NLP_1}=0$ and $IUI_{LP \to NLP_2}=0$, then it can be obtained $P_{NLP}^\perp = P_{NLP_1}^\perp P_{NLP_2}^\perp$. The precoding design process after obtaining projection matrix is similar to the aforementioned path, namely, a channel matrix $H_{LP}$ for the linear precoding terminal device group is projected to the zero space to obtain projected channels $H'_{LP} H_{LP}P_{NLP}^\perp$. Based on the projected channels, a precoding matrix for the projected channel is calculated as $F'_{LP} = (H'_{LP})^\dagger = (H_{LP}P_{NLP}^\perp)^\dagger$; finally, a precoding matrix for the linear precoding terminal device group $F_{LP} = P_{NLP}^\perp F'_{LP} = P_{NLP}^\perp (H_{LP}P_{NLP}^\perp)^\dagger$ is obtained.

In this case, the interference $IUI_{LP \to NLP_g}$ by the linear precoding terminal device group to the gth nonlinear precoding terminal device group can be obtained as $$IUI_{LP \to NLP_g} = \frac{1}{\sqrt{r}} H_{NLP_g} F_{LP} s_{LP} = \frac{1}{\sqrt{r}} H_{NLP_g} P_{NLP}^\perp (H_{LP}P_{NLP}^\perp)^\dagger s_{LP}$$

Wherein for a nonlinear precoding terminal device group g under the constraint $IUI_{LP \to NLP_g} = 0$, $P_{NLP}^\perp$ contains $P_{NLP_g}^\perp$ therein, therefore, $H_{NLP_g} P_{NLP}^\perp = 0$, it can be guaranteed that $IUI_{LP \to NLP_g} = 0$. For a nonlinear precoding terminal device groups g without the constraint $IUI_{LP \to NLP_g} = 0$, $IUI_{LP \to NLP_g} = H_{inter}^g s_{LP}$, and $$H_{inter}^g = \frac{1}{\sqrt{r}} H_{NLP_g} F_{LP} \in C^{K_{NLP_g} \times K_{LP}}$$

indicates the interference channel from the linear precoding terminal device group with respect to the gth nonlinear precoding terminal device group. According to an implementation, $H_{inter}^g$ can be estimated based on beamformed reference signals, in such a case, a vector for beamforming the reference signals can be calculated by means of the precoding matrix, the vector being independent from the serial number of the nonlinear precoding terminal device group, for example, the vector for beamforming the reference signals can be $$\frac{1}{\sqrt{r}} F_{LP}.$$

For the gth nonlinear precoding terminal device group, similarly, in the model of FIG. 8, two scenarios $IUI_{NLP \to NLP_g} = 0$ and $IUI_{NLP \to NLP_g} \neq 0$ can be supported, wherein $IUI_{NLP \to NLP_g}$ represents the interference by the kth nonlinear precoding terminal device group to the g-th nonlinear precoding terminal device group. For each non-linear precoding terminal device group, $IUI_{NLP \to NLP_g}$ can be flexibly constrained. For example, it can be constrained that the interference by a nonlinear precoding terminal device group to a part of other non-linear precoding terminal device groups is zero. In this case, the precoding matrix for the nonlinear terminal device group can be projected onto a zero space of the channel matrix for a corresponding nonlinear terminal device group to implement the orthogonality between such two matrices.

Further, in a case where there are multiple nonlinear precoding terminal device groups, and the inter-group interference between the multiple non-linear precoding terminal device groups is non-zero, the precoding matrix used for communication for the multiple nonlinear precoding terminal device groups whose inter-group interference is non-zero can be set so that there is a causal structure among the multiple nonlinear precoding terminal device groups, and the causal structure indicates that it is able to cancel the inter-group interference for a nonlinear precoding terminal device group by canceling the interference by one or more nonlinear precoding terminal device groups before the non-linear precoding terminal device group to the nonlinear precoding terminal device group. The causal structure among the non-linear precoding terminal device groups can be understood similarly with the causal structure among the terminal devices in the same group, and will be further described with reference to FIG. 9 hereinafter.

When a precoding matrix is set with respect to the g-th nonlinear precoding terminal device group based on the constraints for inter-group interference, first, consider the inter-group interference constrained to 0, that is, the inter-group interference for the linear precoding terminal device group and optionally the inter-group interference for other non-linear precoding terminal device groups. Specifically, all projection matrices on the zero space of channel matrix for corresponding terminal device groups with inter-group interference constrained to 0 are multiplied to obtain a projection matrix $P_g^\perp$ (herein, due to multiple NLP terminal device groups, the subscript LP/NLP is not utilized). Subsequently, a channel matrix $H_{NLP_g}$ for the gth nonlinear precoding terminal device group is projected to the zero space to obtain projected channels $H'_{NLP_g} = H_{NLP_g} P_g^\perp$, and the LU decomposition is performed on the channel matrix to obtain $H'_{NLP_g} = R_g (F'_{NLP_g})^H = G_g^{-1} B_g (F'_{NLP_g})^H$. Finally, a precoding matrix for the nonlinear precoding terminal device group $F_{LP} = F_{NLP_g} = P_g^\perp F'_{NLP_g}$ is obtained.

Based on the constraints for inter-group interference, the interferences from other terminal device groups (including linear and non-linear precoding terminal devices) that are constrained to 0 are cancelled in advance. In addition, for those non-linear precoding terminal device groups with $IUI_{NLP_k \to NLP_g} \neq 0$, the interference channel of a non-linear precoding terminal device group k to the non-linear precoding terminal device group g needs to be estimated. Similarly, it can be estimated by transmitting beamformed reference signals, the vector for beamforming the reference signals is $F_{NLP_k}$.

Figure 9:
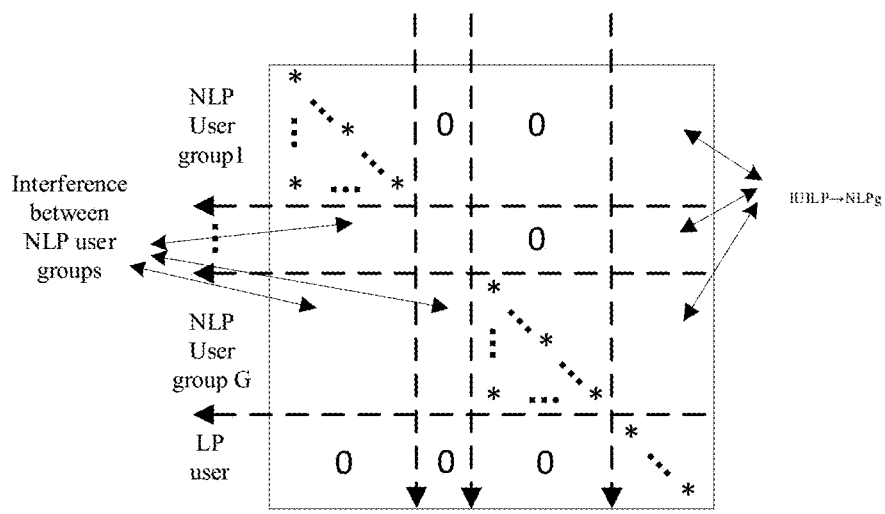
FIG. 9 schematically shows a structure of an equivalent channel matrix in a case of including a plurality of nonlinear precoding terminal device groups, according to a first embodiment of the present disclosure.

Similarly, a structure of a precoded equivalent channel matrix, that is, a precoding matrix for all terminal devices, is as shown in FIG. 9, the equivalent channel matrix can be defined as:

$$H^{eq} = \begin{bmatrix} H_{NLP_1} \\ \vdots \\ H_{NLP_G} \\ H_{LP} \end{bmatrix} [F_{NLP_1} \ \ldots \ F_{NLP_G} \ F_{LP}].$$

As shown in FIG. 9, a sub-matrix composed of nonlinear precoding terminal device groups is set to a lower triangular matrix, i.e., has a causal structure. Specifically, a diagonal element block in the sub-matrix represent the channels for the ith nonlinear precoding terminal device group per se, and the element blocks other than the angular element blocks presents the interferences by other nonlinear precoding terminal device groups for the nonlinear precoding terminal device group i. As shown in FIG. 9, in the sub-matrix, the first nonlinear precoding terminal device group (i.e., the nonlinear precoding terminal device group represented by the first row) is interfered by any other nonlinear precoding terminal device group, the second nonlinear precoding terminal device group can be interfered by only the first nonlinear precoding terminal device group (i.e., only $IUI_{NLP_1 \to NLP_2}$ can be non-zero value), the third nonlinear precoding terminal device group can be interfered by only the first and second nonlinear precoding terminal device groups (i.e., only $IUI_{NLP_1 \to NLP_3}$, $IUI_{NLP_2 \to NLP_3}$ are non-zero values), . . . , the ith nonlinear precoding terminal device group can be interfered by only nonlinear precoding terminal device groups arranged before it (i.e., only $IUI_{NLP_{1-j} \to NLP_i}$ can be non-zero values, wherein j<i). Such causal structure can facilitate to serial cancellation of inter-terminal-device interferences.

When performing the interference cancellation, a particular algorithm can be utilized to cancel various inter-group interferences. Preferably, for a non-linear precoding terminal device group, a Tomlinson-Harashima precoding (THP) algorithm can be utilized to cancel the following interferences in advance: interference between terminal devices in the non-linear precoding terminal device group, the inter-group interference by the linear precoding terminal device group to the nonlinear precoding terminal device group in a case where the inter-group interference by the linear precoding terminal device group to the nonlinear precoding terminal device group is non-zero, and the inter-group interference by another non-linear precoding terminal device group to the non-linear precoding terminal device group in a case where there are multiple non-linear precoding terminal device groups and the inter-group interference by another non-linear precoding terminal device group to the non-linear precoding terminal device group is non-zero.

Selection of Modes of Constraints for Inter-Group Interference

As explained above, a mode that inter-group interference can be constrained to zero in advance, and a mode that inter-group interference is not constrained and alternatively, an interference cancellation algorithm is employed to perform noise cancellation are different from each other in terms of overhead.

Preferably, it is possible to determine whether the inter-group interference constraint is set to specify the inter-group interference by a linear precoding terminal device group to a nonlinear precoding terminal device group is zero, based on the channel state between the base station and the terminal devices. The scheme that in a case where the channel state is relatively stationary and the signal-to-noise is relatively high, it is preferable to set $IUI_{NLP \to LP}=0$ and $IUI_{LP \to NLP}=0$ can be applied to the case including a plurality of nonlinear precoding terminal device groups.

In addition, the less constraints are, the more interference channels are to be estimated, resulting in an increase of channel estimation overhead. Therefore, a preferred option is to maintain interference between different nonlinear precoding terminal device groups be zero, and only the interference by the linear precoding terminal device group to the nonlinear precoding terminal device group is allowed, and the required overhead related to reference signals depends only on the size $K_{LP}$ of the linear precoding terminal device group.

The setting of constraints for inter-group interference and the setting of the precoding matrix under the model combining linear and nonlinear precoding comprising multiple non-linear precoding terminal device groups and one linear precoding terminal device group have been described above. Note that this joint model does not necessarily include the linear precoding terminal device group. For example, in a case where all terminal device groups support non-linear precoding, only multiple non-linear precoding terminal device groups may be included. The setting of constraints for inter-group interference and the setting of the precoding matrix in such a case are similar to that as described above, and only differ in that the constraints for interference between the linear precoding terminal device group and each of other terminal device group need not be considered separately.

Next, an exemplary operation flow 1000 of an electronic device (i.e., a base station) on the control device side of the first embodiment of the present disclosure will be described with reference to FIG. 10 in detail.

The operation flow 1000 starts at 51002. Subsequently, the base station receives the non-linear precoding capabilities of the terminal devices at S1004. As explained above, the non-linear precoding capability can be used as a basis for grouping the terminal devices. The non-linear precoding capability can indicate whether a terminal device supports non-linear precoding.

Subsequently, the base station receives the channel state information at S1006. As explained above, the channel state information can be used as a basis for grouping terminal devices. The channel state information may indicate the interference information of the terminal device, for example, may indicate the inter-terminal-device interference.

Next, in S1008, the base station groups the terminal devices based on the received nonlinear precoding capabilities and channel state information. For example, the base station can use the grouping algorithm described above to perform this step.

Subsequently, the operation flow 1000 may optionally include step S1010, in which the base station may further modify the grouping of the terminal devices according to a predetermined grouping mode.

Next, the operation flow 1000 may optionally include step S1012. In S1012, the base station may sort the terminal devices in each non-linear precoding terminal device group based on a predetermined sorting strategy. The determination of sorting strategy can be performed, for example, before the operation process 1000, or can also be performed at any time before the final determination of the grouping and the sorting of the terminal devices in a group.

Next, at S1014, the base station may notify the terminal device whether non-linear precoding or linear precoding is used in the communication for the terminal device. For example, the base station may perform such notification via a non-linear precoding indicator.

At S1016, the base station may determine constraints for inter-group interference between respective terminal device groups based on the channel state information.

Next, at S1018, based on the grouping and sorting results in S1008-S1012 and the constraints for inter-group interference determined at S1016, the base station sets a precoding matrix for communication for each terminal device group.

Subsequently, at S1020, the base station transmits a modulus threshold indicator to the terminal devices using nonlinear precoding, where the modulus threshold indicator indicates the modulus threshold when performing a modulus operation. For example, the modulus threshold indicator is a n-bit indicator representing $2^n$ types of thresholds, where n is an integer greater than or equal to 1. Specifically, the modulus operation at the receiving end of the terminal device can be expressed as $\tilde{x}=x+k\cdot\tau$, where k is an integer, $\tau$ is a threshold, x means a received signal, $\tilde{x}$ means the signal after the modulus operation, $$-\frac{\tau}{2} \le \tilde{x} \le \frac{\tau}{2}.$$

The magnitude of the threshold is related to the modulation mode when the modulus operation is performed, that is, for different modulation modes, the same modulus threshold indicator may indicate different thresholds. In addition, for the same modulation mode, different thresholds can also be specified, and the base station can notify the terminal device of the threshold to be specifically adopted by means of the modulus threshold indicator.

Finally, at S1022, the base station may use a corresponding precoding matrix and a corresponding algorithm to precode the signal to be sent, and send the precoded signal to the terminal device. For the terminal devices in the non-linear terminal device group, in this step, interference from other terminal device users in the same group and/or interference from other terminal device groups can be cancelled in advance. The operation flow 1000 of the base station according to the first embodiment ends at S1024.

The above operation flow is merely illustrative of the operation of the base station according to the first embodiment of the present disclosure, and the illustrated operations may be performed by the control device according to the present disclosure in a different order or in parallel. For example, the transmission operations of S1040, S1020, and S1022 can be performed at the same time. For example, the setting of constraints for inter-group interference in S1016 may be performed before the previous steps, or even before the operation flow 1000 starts.

Structure and Operation of the Terminal Device According to the First Embodiment An exemplary structure and an exemplary operation of the base station according to the first embodiment of the present disclosure are described in detail above. Next, an exemplary structure and an exemplary operational flow of the terminal device according to the present disclosure will be described with reference to FIGS. 11 to 12.

A conceptual structure of an electronic device 110 for a terminal device/user equipment according to embodiments of the present disclosure is first described with reference to FIG. 11. For example, the terminal device can be realized as a mobile terminal (such as a smartphone, a tablet personal computer (PC), a notebook PC, a portable game terminal, a portable/encrypted dongle-type mobile router, and a digital camera apparatus) or an in-vehicle terminal (such as a car navigation device). The terminal device may also be realized as a terminal (also referred to as a machine type communication (MTC) terminal) that performs machine-to-machine (M2M) communication. In addition, the terminal device may be a wireless communication module (such as an integrated circuit module including a single die) mounted on each of the above terminals. The terminal device can also be realized as smart electric meter, smart appliance, or geolocation capability object (GCO) in a cognitive radio system, Citizens Broadband Radio Service Device (CBSD).

Figure 11:
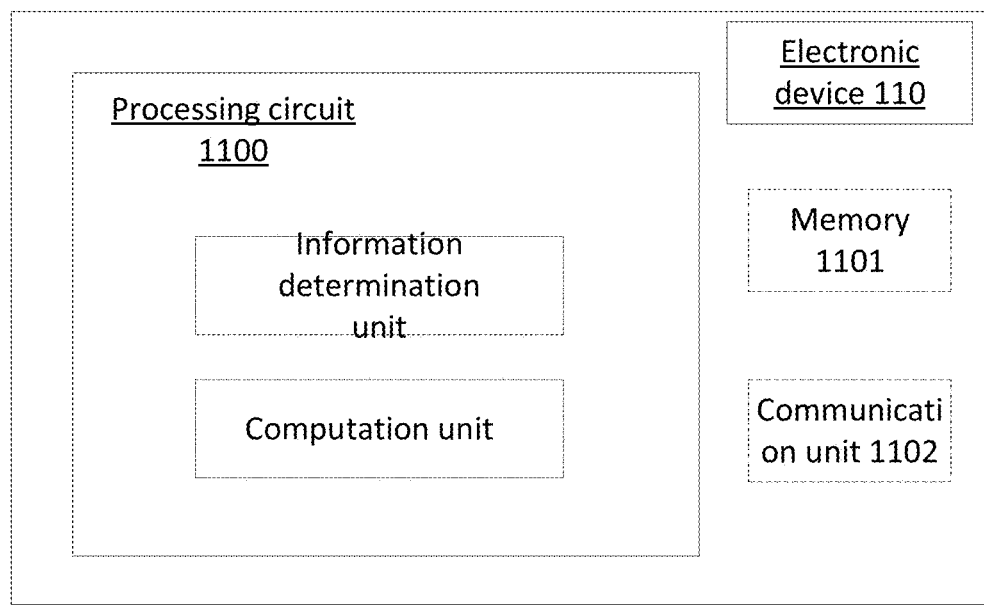
FIG. 11 schematically shows a conceptual configuration of an electronic device on the terminal device side, according to a first embodiment of the present disclosure.

As shown in FIG. 11, the electronic device 110 can include a processing circuit 1100. The processing circuit 110 can be configured to transmit information on nonlinear precoding capability of the terminal device and channel state information to a control device of the wireless communication system, and receive from the control device a nonlinear precoding indicator indicating whether nonlinear precoding or linear precoding is employed in communication for the terminal device, wherein the terminal device is classified into one linear precoding terminal device group or one of one or more nonlinear precoding terminal device groups based on nonlinear precoding capability and channel state information of the terminal device. Wherein, the grouping of the terminal devices and the setting of the precoding matrix can be performed as described above, which will not be described in detail herein.

The processing circuit 1100 may be in the form of a general-purpose processor, or may be a dedicated processing circuit, such as an ASIC. For example, the processing circuit 1100 can be configured by a circuit (hardware) or a central processing device such as a central processing unit (CPU). In addition, the processing circuit 1100 may carry a program (software) for operating the circuit (hardware) or the central processing device. The program can be stored in a memory (such as arranged in the memory 1101) or an external storage medium connected from the outside, and downloaded via a network (such as the Internet). According to some embodiments, the processing circuit can include various units to implement the embodiments according to the present disclosure. For example, the processing circuit of the electronic device can include various units to implement various operations performed on the terminal device side described herein.

Further, the processing circuit 1100 may also be implemented to include one or more other components in the electronic device 110, or the processing circuit 1100 may be implemented as the electronic device 110 itself. In an actual implementation, the processing circuit 1100 may be implemented as a chip (such as an integrated circuit module including a single wafer), a hardware component, or a complete product.

Furthermore, optionally, the electronic device 110 may further include a memory 1101 and a communication unit 1102 shown by dotted lines in the figure. In addition, the electronic device 110 may further include other components not shown, such as a radio frequency link, a baseband processing unit, a network interface, a processor, a controller, and the like. The processing circuit 1100 may be associated with the memory 1101 and/or the communication unit 1102. For example, the processing circuit 1100 may be directly or indirectly (for example, other components may be disposed therebetween) connected to the memory 1101 for data access. Also for example, the processing circuit 1100 may be directly or indirectly connected to the communication unit 1102 to transmit radio signals via the communication unit 1102 and receive radio signals via the communication unit 1102.

The memory 1101 may store various kinds of information generated by the processing circuit 1100 (for example, information about composite data packet, information about the determined parameters, etc.), programs and data used for operation by the electronic device 110, data to be transmitted via the communication unit 1102, and so on. The memory 1101 is drawn with a dashed line because it can also be located inside the processing circuit 1100 or even outside the electronic device 110. The memory 1101 may be a volatile memory and/or a non-volatile memory, for example, the memory 1101 may include, but not limited to, random access memory (RAM), dynamic random access memory (DRAM), static random access memory (SRAM), read-only memory (ROM), and flash memory.

The communication unit 1102 may be configured to communicate with a terminal device under the control of the processing circuit 1100. In one example, the communication unit 1102 may be implemented as a transmitter or a transceiver, including communication components such as an antenna array and/or a radio frequency link, etc. In one implementation, the communication unit 1102 may receive the nonlinear precoding capability indicator, channel state information of the terminal devices and precoded signals, etc. from the base station. In one implementation, the communication unit 1102 may also transmit the nonlinear precoding capability indicator, channel state information, and so on.

Although the processing circuit 1100 is separated from the communication unit 1102 as shown in FIG. 11, the processing circuit 1100 can also be implemented as including the communication unit 1102.

In one implementation, the processing circuit 1100 can include an information determination unit. The information determination unit can, for example, determine information that needs to be feedback to the base station and information received from the base station. For example, the information determination unit can determine the nonlinear precoding capability of the terminal device, that is, whether nonlinear precoding is supported. According to an embodiment of the present disclosure, information about the nonlinear precoding capability of the terminal device can include a nonlinear precoding capability indicator. For example, the nonlinear precoding capability indicator can have a length of 1 bit, and indicate that the terminal device supports nonlinear precoding when its value is 1, and indicates that the terminal device does not support nonlinear precoding when its value is 0. In a specific embodiment, the information determination unit indicates whether the non-linear precoding is supported by means of a parameter included in the UE Capability in the technical specification TS38.306 of the 5th generation communication protocol 3GPP New Radio. For example, the information determination unit can include the indicator of supporting the nonlinear precoding in an information element of the UE Capability, such as FeatureSetDownLink Information Element (IE).

The information determination unit can also determine channel state information, such as channel quality and interference between terminal devices. As described above, the determined channel state information can assist the base station in grouping the terminal devices and setting the precoding matrix. In one implementation of the present disclosure, the information determined by the information determination unit may not be the channel state information itself, but can be other information/parameters which can be utilized by the control device/base station side to calculate the channel state information, and the other information/parameter will be provided to the control device/base station side.

Further, the information determination unit can also determine whether to use nonlinear precoding or linear precoding in communication based on a nonlinear precoding indicator transmitted by the base station. In an implementation of the first embodiment, the nonlinear precoding indicator can have a length of 1 bit, and indicate the nonlinear precoding when its value is 1, and indicates the linear precoding when its value is 0. In one implementation of the first embodiment, the base station can notify only terminal devices that support nonlinear precoding whether the nonlinear precoding or linear precoding is to be utilized in this communication, in this case, when the linear precoding indicator is not received, a terminal device that does not support nonlinear precoding can determine that the linear precoding is employed in communication for the terminal device.

Further, in a case where nonlinear precoding is determined to be employed, the information determination unit may determine the modulus threshold when the modulus operation is performed according to a modulus threshold indicator. For example, the information determination unit can determine the threshold to be used based on the modulus threshold indicator in accordance with the engagement with the base station. For example, for different modulation modes, the same modulus threshold indicator may indicate different thresholds. In addition, for the same modulation mode, a specific threshold specified for this communication can be determined by means of the modulus threshold indicator. In another implementation of the present disclosure, the modulus threshold indicator may be preset on the terminal device side.

In a specific example, the physical layer defined in the technical specification of the 5th generation communication protocol 3GPP New Radio is employed to schedule information, such as downlink control information DCI, to carry the nonlinear precoding indicator and/or the modulus threshold indicator to indicate whether the current downlink transmission supports non-linear precoding and/or the modulus threshold for the current downlink transmission, so as to provide sufficient dynamic flexibility for downlink scheduling. For example, the information determination unit may obtain the DCI from the base station and interpret the non-linear precoding indicator and/or the modulus threshold indicator contained therein, so as to provide it to the calculation unit for performing the following calculation and decoding. In another specific example, MAC signaling or RRC signaling defined in the technical specifications of the 5th generation communication protocol 3GPP New Radio, such as MAC control element/RRC reconfiguration message, is used to carry the non-linear precoding indicator and/or the modulus threshold indicator, so as to indicate whether the following several transmissions support non-linear precoding and/or the modulus threshold for the following several transmissions semi-dynamically/statically. The processing circuit 1100 receives and read the non-linear precoding indicator and/or modulus threshold indicator from the base station, and continues to use the non-linear precoding indicator and/or modulus threshold indicator for receipt and decoding for the downlink transmission, until MAC signaling or RRC signaling indicating a new nonlinear precoding indicator and/or modulus threshold indicator are received.

Processing circuit 1100 can also optionally include a calculation unit. For example, in a case where the terminal device supports nonlinear precoding, the calculation unit can perform a modulus operation based on the threshold determined by the information determination unit.

It should be noted that each of the above units is only a logical module classified according to the specific function it implements, instead of limiting its specific implementation manner, for example, it can be implemented in software, hardware, or a combination of software and hardware. In actual implementation, the foregoing units may be implemented as independent physical entities, or may be implemented by a single entity (for example, a processor (CPU or DSP, etc.), an integrated circuit, etc.). Furthermore, that the above units are indicated by dotted lines in the figure means such units need not to exist actually, while the operations/functions implemented by the units can be implemented by the processing circuit itself.

Figure 12:
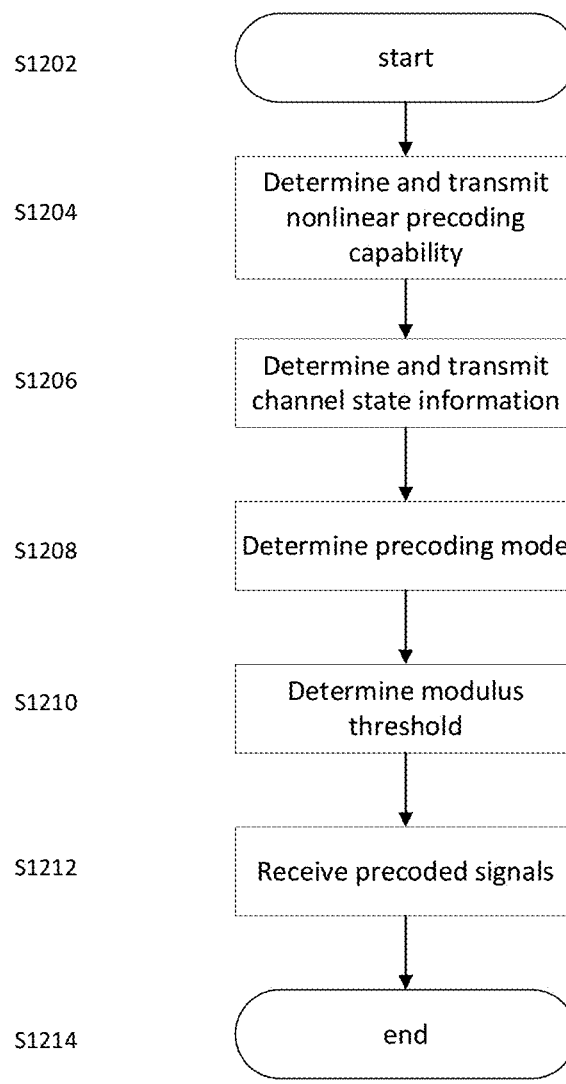
FIG. 12 schematically shows a conceptual operational flow of the terminal device according to the first embodiment of the present disclosure.

Next, a conceptual operational flow 1200 of a terminal device according to a first embodiment of the present disclosure will be described with reference to FIG. 12.

The operation flow 1200 starts at S1202. Subsequently, the terminal device determines and transmits the non-linear precoding capability of the terminal device to the base station at S1204. As explained above, the non-linear precoding capability can be used as a basis for grouping terminal devices.

Subsequently, the terminal device determines and transmits channel state information to the base station at S1206. As explained above, the channel state information can be used as a basis for grouping terminal devices. The channel state information may indicate the interference information of the terminal device, for example, may indicate the interference between the terminal devices.

Next, in S1208, the terminal device determines whether non-linear precoding or linear precoding is used in the communication for the terminal device. For example, the terminal device may receive a non-linear precoding indicator from the base station.

Subsequently, at S1210, in the case of performing non-linear precoding, the terminal device may receive the modulus threshold indicator and determine the modulus threshold to be used in this communication.

Finally, at S1212, the terminal device receives the precoded signal, and in the case of performing non-linear precoding, can use the determined modulus threshold to perform the modulus operation. The conceptual operation flow 1200 of the terminal device according to the first embodiment ends at S1214.

The above operation flow is merely illustrative of the operation of the terminal device according to the first embodiment of the present disclosure, and the illustrated operations may be performed by the terminal device according to the present disclosure in a different order or in parallel. For example, the terminal device may transmit the channel state information first, and then transmit the non-linear precoding capability information.

Interaction Flow Between the Base Station and the Terminal Device According to the First Embodiment The schematic configuration and operation of the base station and the terminal device are described above with reference to the drawings. Next, the interaction flow between the base station and the terminal device according to the first embodiment of the present disclosure will be described with reference to FIG. 13.

Figure 13:
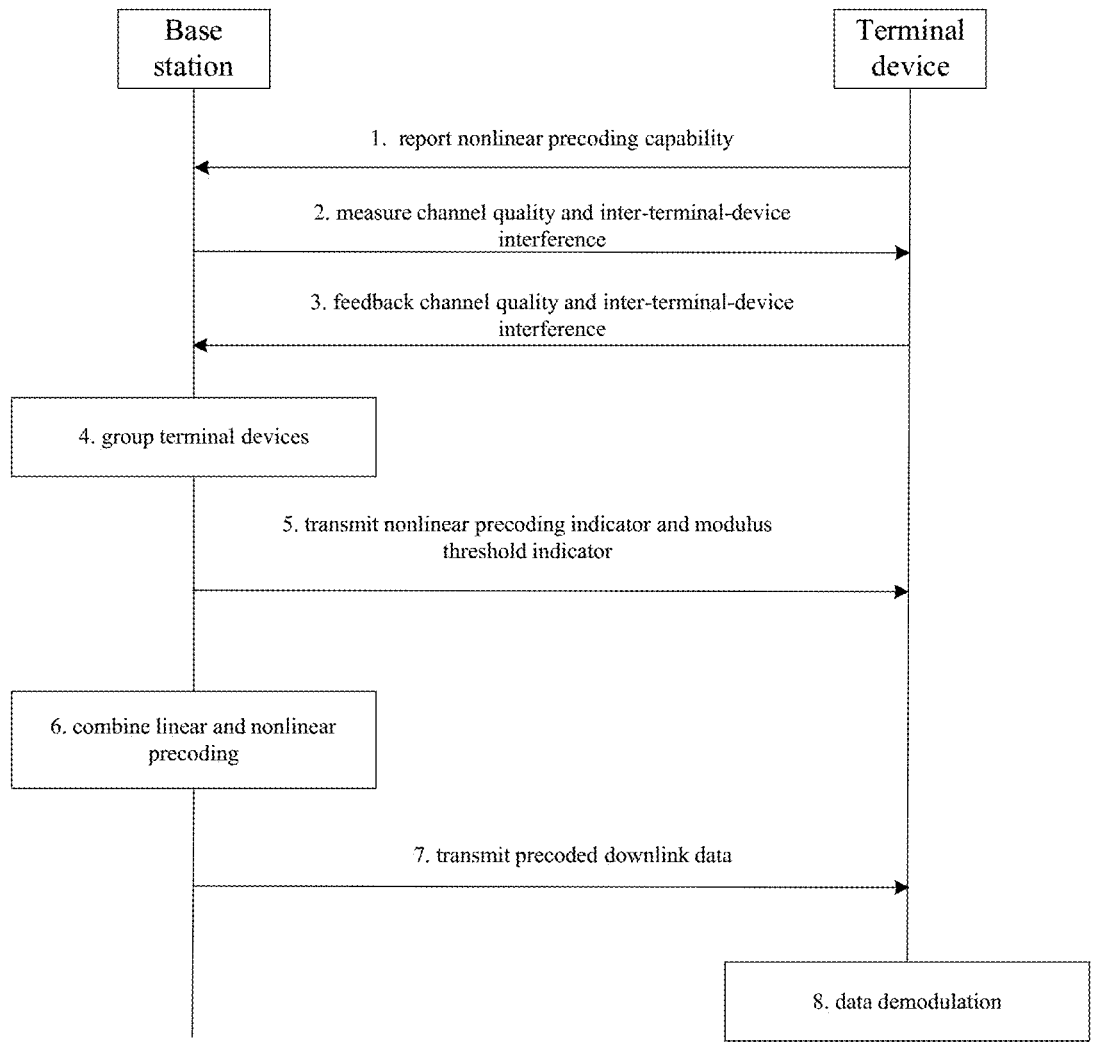
FIG. 13 schematically shows an interaction flow between the control device and the terminal device according to a first embodiment of the present disclosure.

As shown in FIG. 13, the terminal device first transmits information indicating the non-linear precoding capability to the base station ("1"). Note that the terminal device may report its nonlinear precoding capability periodically, or report its nonlinear precoding capability in response to a request from the base station.

After the base station receives the information, the base station can transmit reference signals to the terminal device to measure the channel state information ("2"). The channel state information can reflect the channel quality, for example, indicate the interference of the terminal device. It should be noted that this measurement operation can also be performed periodically, or performed before receipt of the information indicating the non-linear precoding capability of the interrupt device.

Subsequently, the terminal device feeds back the channel state information to the base station ("3"). For example, the terminal device can feed back the interference information of the terminal device to the base station. The interference information may indicate interference between terminal devices, for example. As described above, the channel state information fed back by the terminal device can be used by the base station to group the terminal devices. It should be noted that since the channel state information is used to further group terminal devices that support non-linear precoding as described above, in this step, only terminal devices that support non-linear precoding can feed back the channel state information. In an implementation of this embodiment, the terminal device may only feedback relevant information for determining the channel status, and the base station may determine the channel state information on the base station side after receiving the information.

In one implementation, the base station may only transmit reference signals to a terminal device supporting non-linear precoding to request measurement of channel state information corresponding to the terminal device, and only the terminal device supporting non-linear precoding can feed back the channel state information or the relevant information used to determine the channel state information.

In an implementation of the present disclosure, the above-mentioned operations ("1") may also be omitted, and only the above-mentioned operations ("2") and ("3") are performed. Specifically, the base station may send reference signals to all terminal devices to request measurement of channel state information corresponding to the terminal devices, and only terminal devices that support nonlinear precoding can feed back the channel state information or relevant information for determining the channel state information. In this way, after receiving the feedback information, the base station can directly recognize the corresponding terminal device as a terminal device supporting nonlinear precoding, and a terminal device that does not receive the feedback information can be recognized as a terminal device supporting linear precoding.

Subsequently, the base station can perform the grouping based on the received nonlinear precoding capability and channel state information ("4"). As described above, the base station can perform grouping modification and intra-group sorting of non-linear precoding terminal devices as required.

Next, the base station may transmit the non-linear precoding indicator to the terminal device, and transmit the modulus threshold indicator to the non-linear precoding terminal device ("5"). It should be noted that such two indicators can be transmitted to the terminal device together in the same message, or can be transmitted to the terminal device as two pieces of information separately. After receiving the corresponding indicator, for example, the nonlinear precoding terminal device may determine the modulus threshold to be used. In an implementation of the present disclosure, the base station may only transmit the non-linear precoding indicator and the modulus threshold indicator to the terminal device that supports non-linear precoding.

Subsequently, the base station can perform joint linear and non-linear precoding ("6"). For example, the base station may determine the inter-group interference constraint, set a precoding matrix based on the inter-group interference constraint, and use the determined precoding matrix to precode the signal.

Next, the base station can transmit the precoded signal to the terminal device ("7"), and the terminal device can demodulate accordingly ("8"). For example, in the case of non-linear precoding, the terminal device may perform a modulus operation based on the determined modulo threshold during demodulation.

In addition, it should be pointed out that although not explicitly shown in the signaling diagram, during the non-linear precoding period, serial interference cancellation is required, and in the interference cancellation step, the base station needs to obtain specific channel state information (such as, instantaneous channel state information (instantaneous CSI)). For this purpose, before performing the precoding operation, the base station additionally needs to acquire the specific channel state information through the feedback from the terminal device. In the first embodiment according to the present disclosure, such channel state information can be obtained by any method known in the art.
Performance Analysis The specific implementation according to the first embodiment of the present disclosure has been described above with reference to the accompanying drawings. As explained above, compared with a traditional linear precoding algorithm, the scheme combining linear and nonlinear precoding according to the first embodiment of the present disclosure can effectively improve the performance of users suffering from relatively strong interferences, and compared with a traditional nonlinear precoding algorithm, the scheme combing linear and nonlinear precoding according to the first embodiment of the present disclosure can effectively reduce the algorithm complexity.

Figure 14:
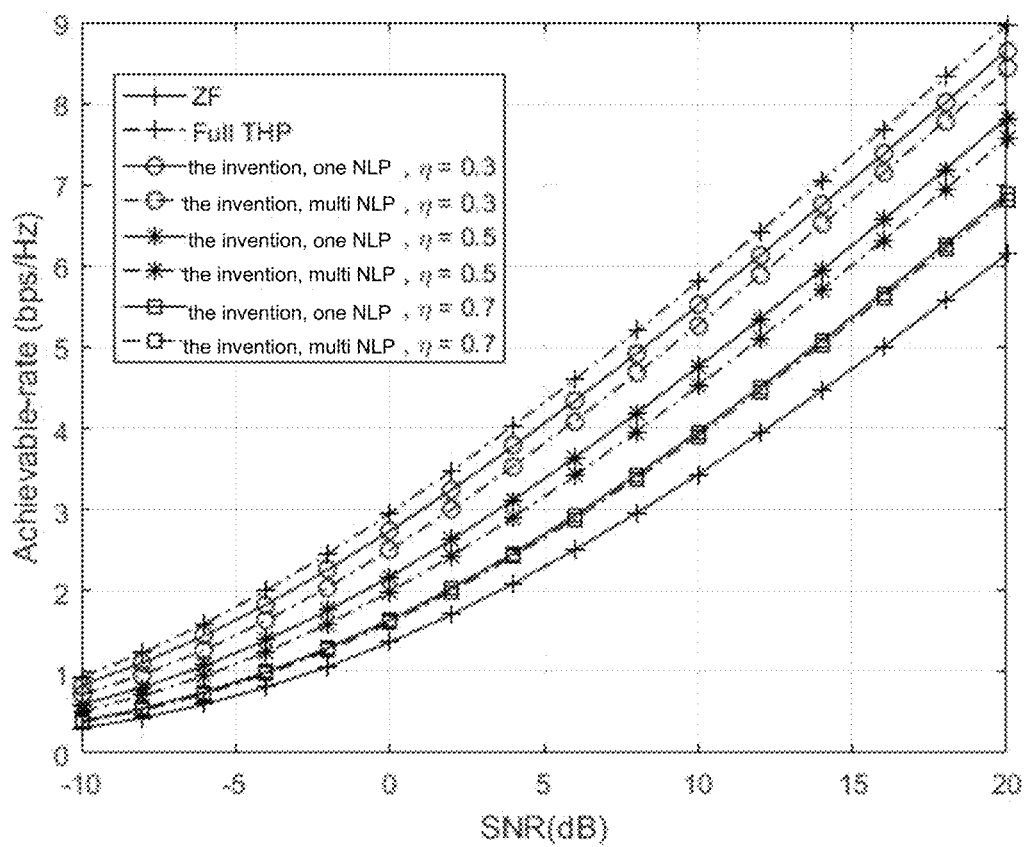
FIG. 14 schematically shows the average reachable rate of the terminal device in a case where the inter-group interference by a linear precoding terminal device group to a nonlinear precoding terminal device group is zero, according to a first embodiment of the present disclosure.
Figure 15:
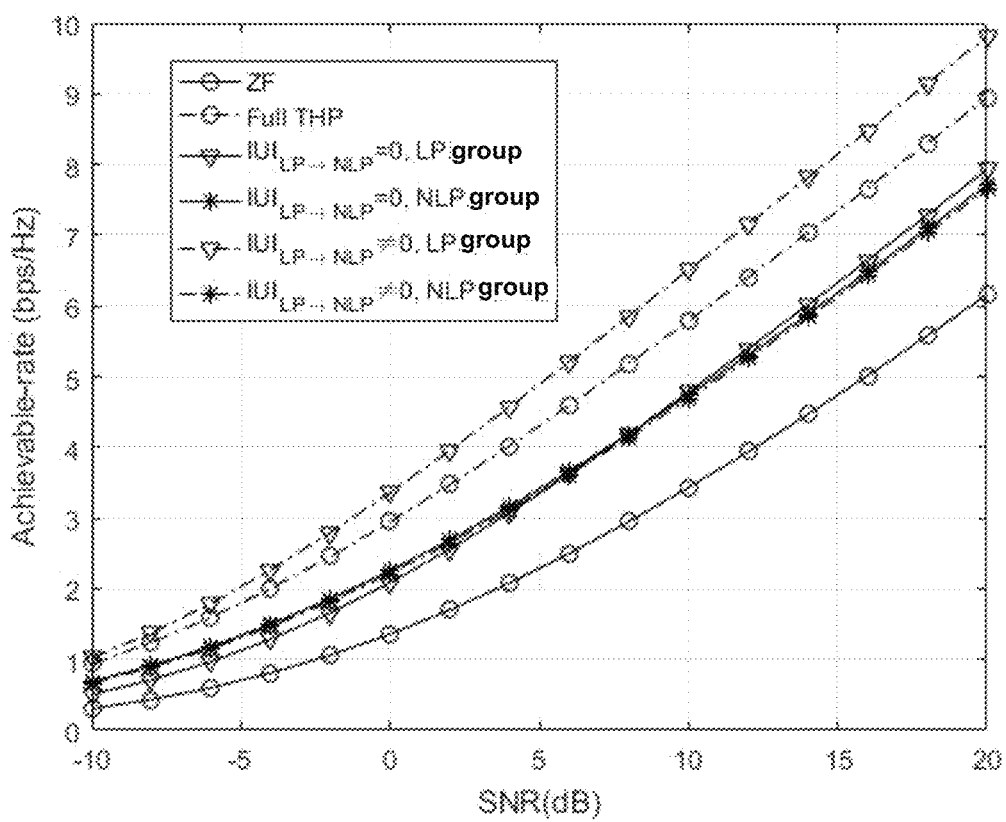
FIG. 15 schematically shows the average reachable rate of the terminal device in a case where the inter-group interference by a linear precoding terminal device group to a nonlinear precoding terminal device group is non-zero, according to a first embodiment of the present disclosure.

Next, with reference to FIGS. 14 and 15, comparison between performances of different grouping situations under the same interference constraint and comparison between performances under different interference constraints will be further described.

In FIGS. 14, 15, the same simulation conditions are employed: a base station is configured with 8 radio links, a linear array of 16 antennas, and serving 8 users with single antenna simultaneously. The channel contains 6 paths, the angle spread is 15 degrees, 16QAM modulation is utilized, users are randomly distribution, and it is assumed that the channel state information is known.

FIG. 14 schematically shows the average reachable rate of the terminal device in a case where the inter-group interference by a linear precoding terminal device group to a nonlinear precoding terminal device group is zero, according to a first embodiment of the present disclosure.

As shown in FIG. 14, the scheme according to the first embodiment of the present disclosure can significantly improve the user rate as compared to a conventional ZF linear precoding technique. Further, on the one hand, as the interference threshold increases, the number of nonlinear precoding users is increased, and the algorithm complexity is increased, but the user rate is improved. On the other hand, under the same threshold condition, the performance of a scheme including multiple nonlinear precoding user groups is slightly lower than that of a scheme including one nonlinear precoding user group, but the algorithm complexity is lower.

FIG. 15 schematically shows the average reachable rate of the terminal device in a case where the inter-group interference by a linear precoding terminal device group to a nonlinear precoding terminal device group is non-zero, according to a first embodiment of the present disclosure.

As shown in FIG. 15, compared to a case of $IUI_{LP \to NLP}=0$, in a case that $IUI_{LP \to NLP} \neq 0$, the performance of a linear precoding user group markedly improve while the performance of the nonlinear user groups is almost unchanged. But that case that $IUI_{LP \to NLP} \neq 0$ requires to estimate instantaneous CSI of the interference channel, and thus a larger pilot overhead is required, which will be described in the second embodiment.

In the above, a first embodiment according to the present disclosure has been described in detail, in the first embodiment, the base station groups a plurality of terminal devices of the wireless communication system into a linear precoding terminal device group and one or more nonlinear precoding terminal devices groups based on nonlinear precoding capability of each of a multiple terminal devices and channel state information, and sets a nonlinear precoding matrix combining linear precoding and nonlinear precoding based on the grouping results. The combined precoding according to the first embodiment can effectively improve the performance of a user suffering strong interference and reduce the calculation complexity.

Next, a second embodiment according to the present disclosure will be explained.

When a non-linear precoding, such as the interference cancellation step in THP, is performed, since it is more sensitive to the accuracy of channel state information, instantaneous channel state information should be estimated frequently, so that the overhead for channel estimation is high when the nonlinear precoding is applied in communication. For example, a large pilot overhead will be caused when the number of antennas is large. If the traditional scheme is adopted, assuming that the base station transmits K data streams through M antenna ports and serves K users at the same time and assuming M=K, each nonlinear precoding user needs to estimate and feedback a K-dimensional channel vector, and the estimation overhead is relatively large. Therefore, there is a need for a solution to reduce the overhead of channel estimation for non-linear precoding.

The second embodiment of the present disclosure proposes a two-stage channel estimation method to estimate channel state information, especially instantaneous channel state information, so as to advantageously reduce the overhead of estimating the instantaneous channel state. In particular, in the two-stage channel estimation method, the dimension of the equivalent channels estimated in the second stage is lower than that of the original channels, so the estimation overhead can be reduced.

In an implementation of the present disclosure, a plurality of terminal devices in the communication system to which the second embodiment is applied may include terminal devices that support or do not support non-linear precoding. In the communication system of the second embodiment, multiple terminal devices may not be grouped. For example, only terminal devices that do not support non-linear precoding may operate as a group of linear precoding terminal devices, and all the terminal devices that support non-linear precoding may operate as a group of non-linear precoding terminal devices. In another implementation according to the present disclosure, as described in the first embodiment, multiple terminal devices may also be grouped into one linear precoding terminal device group and more than one non-linear precoding terminal device groups.

Next, a detailed description will be made with reference to FIGS. 16-18.
Base Station Configuration and Operation The conceptual structure of the control device/base station according to the second embodiment of the present disclosure will be explained below with reference to FIG. 16. The specific example of the control device/base station can be as described above.

Figure 16:
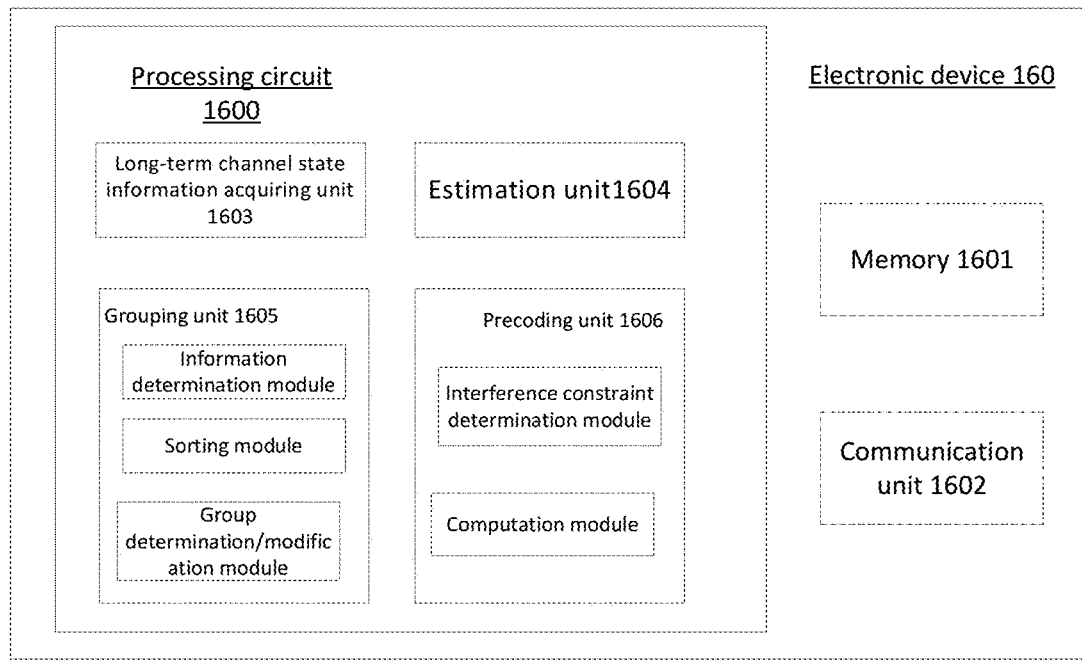
FIG. 16 schematically shows a conceptual configuration of an electronic device on a control device side, according to a second embodiment of the present disclosure.

As shown in FIG. 16, the electronic device 160 may include a processing circuit 1600. The processing circuit 1600 may be configured to acquire long-term channel state information; and estimate, based on the long-term channel state information, instantaneous channel state information and/or interference channel for one or more non-linear precoding terminal device groups in the system.

The processing circuit 1600 may be in the form of a general-purpose processor, or may be a dedicated processing circuit, such as an ASIC. For example, the processing circuit 1600 can be configured by a circuit (hardware) or a central processing device such as a central processing unit (CPU). In addition, the processing circuit 1600 may carry a program (software) for operating the circuit (hardware) or the central processing device. The program can be stored in a memory (such as arranged in the memory 1601) or an external storage medium connected from the outside, and downloaded via a network (such as the Internet).

According to some embodiments, the processing circuit of the electronic device can include various units to implement the embodiments according to the present disclosure. For example, the processing circuit of the electronic device can include various units to implement various operations performed on the control device side described herein.

In one implementation, the processing circuit 1600 may include a long-term channel state information acquiring unit 1603. The long-term channel state information acquiring unit may, for example, transmit reference signals to the terminal device via a communication unit and estimate the long-term channel state information based on feedback from the terminal device. The acquired long-term channel state information can be used, for example, to calculate a precoding matrix for a linear precoding terminal device group, and can be used for instantaneous channel state information and/or interference channel for the one or more non-linear precoding terminal device groups. The processing circuit 1600 may further include an estimation unit 1604. The estimation unit may estimate, based on the long-term channel state information, instantaneous channel state information and/or interference channel for the one or more non-linear precoding terminal device groups.

In addition, optionally, the processing circuit 1600 may further include a grouping unit 1605, a precoding unit 1606, a memory 1601, and a communication unit 1602 shown in dotted lines in the figure. The configuration and functions of these units are similar to those of the first embodiment, and the description will not be repeated here. For example, the grouping unit may include an information determination module, a sorting module, and a grouping determination/modification module; the precoding unit may include an interference constraint determination module and a calculation module.

Further, the processing circuit 1600 may also include an interface circuit (not shown) for interface connection among respective units.

It should be noted that each of the above units only belongs to a logical module classified according to the specific function it implements, instead of limiting its specific implementation manner, for example, it can be implemented in software, hardware, or a combination of software and hardware. In an actual implementation, the foregoing units may be implemented as independent physical entities, or may be implemented by a single entity (for example, a processor (CPU or DSP, etc.), an integrated circuit, etc.). Furthermore, that the foregoing units are indicated by dotted lines in the figure indicates that the foregoing units/modules/sub-units may not actually exist, and the operation/functionality they achieve can be implemented by the processing circuit itself.

When estimating the instantaneous channel state information and/or the interference channel, the estimation unit 1604 may operate jointly with the precoding unit 1606 and the communication unit 1602 that are also included in the processing circuit 1600.

According to one implementation, first, the precoding unit 1606 may calculate a corresponding long-term precoding matrix for each nonlinear precoding terminal device group in the one or more non-linear precoding terminal device groups based on the acquired long-term channel state information, and subsequently, can, for example, transmit reference signals precoded with a corresponding long time precoding matrices to the one or more non-linear precoding terminal device groups and receive the corresponding feedbacks via the communication unit 1602, and finally, the estimation unit 1604 can estimate, based on the feedbacks, instantaneous channel state information and/or interference channel for each nonlinear precoding terminal device group in the one or more non-linear precoding terminal device groups.

The instantaneous channel state information of each non-linear precoding terminal device group may refer to the instantaneous channel state information of respective terminal devices in the group. The interference channel may include inter-group interference for the nonlinear precoding terminal device group. As described in the first embodiment, the inter-group interference for a non-linear precoding group can originate from the linear precoding group, and if there is more than one non-linear precoding group, it can also originate from other nonlinear precoding groups, therefore, the estimated interference channel may include the interference channel by the linear precoding terminal device group to the non-linear precoding terminal device group and/or the interference channel between the nonlinear precoding terminal device groups.

Hereinafter, a conceptual operation flow 1700 of the electronic device on the control device side according to the second embodiment of the present disclosure will be explained with reference to FIG. 17. In the specific example for describing the flow, similar symbols to the first embodiment are used.

The operation flow 1700 starts at S1702. Subsequently, at S1704, the base station can obtain long-term channel state information. For example, the base station can transmit reference signals to the terminal device and estimate the long-term channel state information based on the feedback from the terminal device.

Next, at S1706, the base station may calculate a long-term precoding matrix based on the long-term channel state information. For the linear precoding terminal device group, the long-term precoding matrix is equivalent to the precoding matrix, that is, in this step, the base station can calculate the precoding matrix for the linear precoding terminal device group and a corresponding long-term precoding matrix for each of one or more non-linear precoding terminal device groups based on the long-term channel state information.

Subsequently, at step S1708, the base station may transmit one or more non-linear precoding terminal device groups reference signals precoded by using corresponding long-term precoding matrices and perform estimation based on the feedback. For example, the base station may estimate the instantaneous channel state information and/or interference channel for each of the one or more nonlinear precoding terminal device groups based on the feedback from the terminal devices, where the instantaneous channel state information and/or the interference channels can be used to calculate the precoding matrix for communication for each non-linear precoding terminal device group. The interference channels may include the interference channel by the linear precoding terminal device group to a nonlinear precoding terminal device group and/or the interference channel between the nonlinear precoding terminal device groups.

Finally, at step S1710, the operation flow of the base station according to the second embodiment ends.

In fact, after having estimated the instantaneous channel state information, the base station may further perform precoding, for example, THP precoding. The operation of precoding is similar to that in the first embodiment, and the description will not be repeated here.

The above operational flow is merely illustrative of the operation of the base station according to the second embodiment of the present disclosure, and the operation can be performed by the control device according to the present disclosure in a different order or in parallel.

Hereinafter the operation (S1706) of calculating the long-term precoding matrix and the estimation operation (S1708) according to the present embodiment are described in detail with reference to an example in which one nonlinear precoding terminal device and one linear precoding terminal device group are included.

In the operation of calculating the long-term precoding matrix, the base station may transmit reference signals (CSI-RS) to estimate the long-term channel state information for the linear precoding terminal device group and the nonlinear precoding terminal device group. According to a specific implementation, the long-term channel state information can correspond to the long-term channel matrix, the long-term channel matrix for the linear precoding terminal device group can be expressed as $H_{LP}^{LT}$, and the long-term channel matrix for the nonlinear precoding terminal device group can be expressed as $H_{NLP}^{LT}$. Based on the long-term channel state information, the projection matrices $P_{LP}^{\perp}$ and $P_{NLP}^{\perp}$ onto the zero spaces of respective channel matrices can be calculated.

For the linear precoding terminal device group, based on the long-term channel state information, the precoding matrix $F_{LP}$ for the linear precoding user group can be directly obtained, for example:

In a case of $IUI_{LP \to NLP}=0$, $F_{LP}=P_{NLP}^{\perp}(H_{LP}^{LT}P_{NLP}^{\perp})^{\dagger}$; and In a case of $IUI_{LP \to NLP} \neq 0$, $F_{LP}=(H_{LP}^{LT})^{\dagger}$.

It should be noted that the precoding matrix $F_{LP}$ for the linear precoding user group only depends on the long-term channel state information.

For the non-linear precoding terminal device group, in order to satisfy a condition that the inter-group interference for the linear precoding terminal device group is zero as described above, similar to the first embodiment, a method of causing a long-term precoding matrix for the non-linear precoding terminal device group to be orthogonal to a channel matrix for the linear precoding terminal device group can be employed. For example, the projected channel $H_{NLP}^{LT'}=H_{NLP}^{LT}P_{LP}^{\perp}$ can be first calculated based on the long-term channel state information, here the dimension of the projected channel is $K_{NLP} \times K$. Subsequently, the LU decomposition is performed on the projected channel $H_{NLP}^{LT'}$ to obtain the long-term precoding matrix for the non-linear precoding terminal device group $F_{NLP}^{LT'}$, wherein $H_{NLP}^{LT'}=R^{LT}(F_{NLP}^{LT'})^{H}=(G^{LT})^{-1}B^{LT}(F_{NLP}^{LT'})^{H}$.

In the estimation operation, the base station transmits the precoded reference signals to estimate the instantaneous channel state information of the equivalent channels. Wherein, precoding the reference signals to be transmitted by means of the previously determined long-term precoding matrix, and transmitting the precoded references signals to the linear precoding terminal device group. It should be pointed out that the precoded reference signals can also be transmitted to the linear precoding terminal device group, and in this case, the linear precoding terminal device group can discard or ignore the signals without any response or processing.

Specifically, by means of the long-term precoding matrix, the dimension of the channel matrix can be reduced to $K_{NLP} \times K_{NLP}$, that is, $H''_{NLP}=H''_{NLP}F_{NLP}^{LT'}=H_{NLP}$ $(P_{LP}^{\perp}F_{NLP}^{LT'})$. Thus, by using the long-term precoding matrix, the dimension of the channel matrix can be reduced, which can effectively reduce computational complexity.

According to a specific implementation, when the instantaneous channel $H''_{NLP}$ is estimated by transmitting precoded reference signals (Precoded CSI-RS), the precoding matrix for precoding the reference signals CSI-RS can be $P_{LP}^{\perp}F_{NLP}^{LT'}$. In the case of $IUI_{LP \to NLP} \neq 0$, the instantaneous channel state information of the interference channel needs to be estimated, and the estimation method is similar. Since the interference channel is $$H_{inter} = \frac{1}{\sqrt{r}} H_{NLP} F_{LP} \in C^{K_{NLP} \times K_{LP}},$$

the precoding matrix for precoding the reference signals CSI-RS is $$\frac{1}{\sqrt{r}} F_{LP}.$$

In other words, the reference signals transmitted by the base station to the non-linear precoding terminal device group for measuring the instantaneous channel is processed based on the channel state of the linear precoding terminal device group sharing the transmission time and frequency resources in advance.

Hereinabove there describes the specific operation of estimating the instantaneous channel state information and the interference channel in a two-step manner in a case where the terminal devices are grouped into a linear precoding terminal device group and a nonlinear precoded terminal device group by example.

It is to be pointed out that this two-step estimation method is not limited to the above terminal device group. For example, in a case where the communication system does not include the linear precoding terminal devices and the nonlinear precoded terminal devices are not grouped, the above two-step estimation method may be utilized, in such a case, since there does not exist interference between the terminal device groups, so the method can be utilize to only estimate the instantaneous channel state information.

According to an implementation of the present disclosure, this two-step estimation method can also be used to group the nonlinear terminal devices. The nonlinear terminal devices can be divided into one or more groups as in the first embodiment of the present disclosure, and this case can be similar to one embodiment of combining the first embodiment and the second embodiment of the present disclosure. In this case, the operation of this embodiment can be performed as in the combination of operations on FIGS. 14 and 17.

Specifically, for a plurality of terminal devices, as step S404-408, the plurality of terminal devices can be first grouped into a linear precoding terminal device group and more than one nonlinear precoding terminal device group, and in particular, in a case where the communication system does not include any linear precoding terminal device, only the nonlinear precoding terminal devices can be group; then reference signals are transmitted to estimate the long-time channel state information for more than one nonlinear precoding terminal device groups and, if appropriate, a linear precoding terminal device group, thereby a long-term encoding matrix can be determined, as in step S1704-S1706, the determined long-term encoding matrix for the linear precoding terminal device group is namely the linear precoding matrix for the linear precoding terminal device group; the reference signals can be pre-coded by means of the determined long-time encoding matrix, and the precoded reference signals can be transmitted to more than one nonlinear precoding terminal device groups, to estimate the instantaneous channel state information and/or interference channel of the nonlinear precoding terminal device groups, as in step S1708. Thereby, a nonlinear precoding matrix for signal transmission for more than one nonlinear precoding terminal device groups can be determined based on the estimated information. Therefore, the precoding matrices for one linear precoding terminal device group and more than one nonlinear precoding terminal device groups can be obtained.

In particular, in a case where the communication system includes a plurality of nonlinear precoding terminal device groups and there exists inter-group interference between the nonlinear precoding terminal device groups, interference channels between the nonlinear precoding terminal device groups is also required to be estimated. The estimation can also be performed as the estimation operation in the second embodiment described above. That is, reference signals precoded by using the long-time precoding matrix are transmitted to the nonlinear precoding terminal devices, and then the estimation is performed based on the feedback from the terminal devices, and the description will not be expanded here.

In a case where multiple terminal device groups (for example, one linear precoding terminal device group and one or more nonlinear precoding terminal device groups, or multiple nonlinear precoding terminal device groups) and according to the constraints for inter-group interference, there at least exists that the inter-group interference by a non-linear precoding terminal device group to another non-linear precoding terminal device group is set to zero or the inter-group interference by a linear precoding terminal device group to a non-linear precoding terminal device group is set to zero, this two-step estimation method can especially reduce the dimension of the channel matrix, thereby reducing the computational complexity.

Configuration and Operation of the Terminal Device

Next, a conceptual structure of an electronic device on the terminal device side according to the second embodiment of the present disclosure will be described below.

Figure 18:
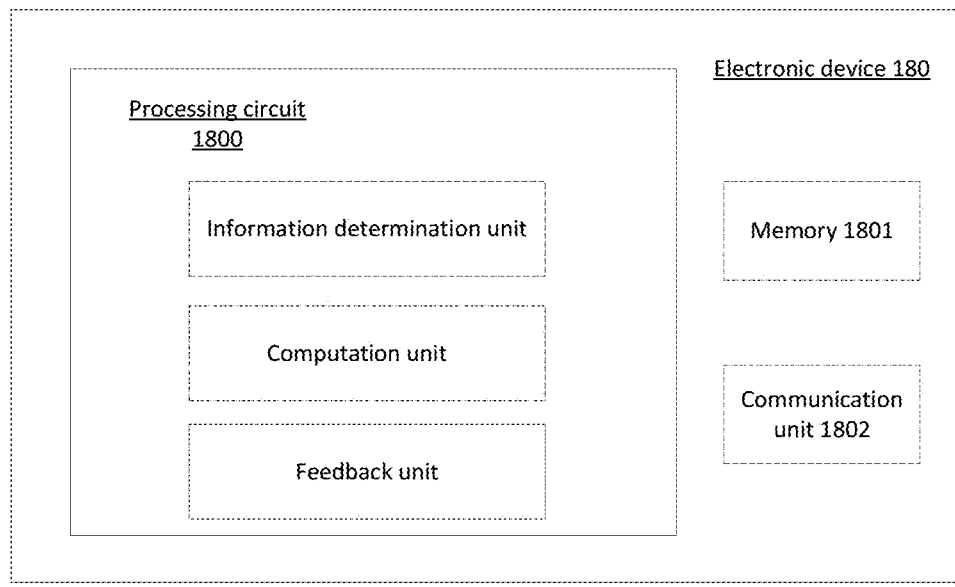
FIG. 18 schematically shows a conceptual structure of an electronic device on a terminal device side according to a second embodiment of the present disclosure.

As shown in FIG. 18, the structural configuration of the electronic device 180 on the terminal device side is basically the same as that of the first embodiment. The difference is that the processing circuit 1800 of the electronic device 180 may also include a feedback unit. For example, the feedback unit may cooperate with the communication unit to feedback the signal received from the base station. For example, in a case of receiving the reference signals transmitted by the base station via the communication unit, the feedback unit may generate and transmit corresponding feedback via the communication unit, so that the base station can obtain the long-term channel state information. As another example, in a case of receiving the reference signals pre-coded by using a long-term precoding matrix transmitted by the base station via the communication unit, the feedback unit may generate and transmit corresponding feedback via the communication unit, so that the base station can estimate the instantaneous channel state information.

The operations of other units in the terminal device 180 are similar to those of the first embodiment, and their description will not be repeated here.

Figure 19:
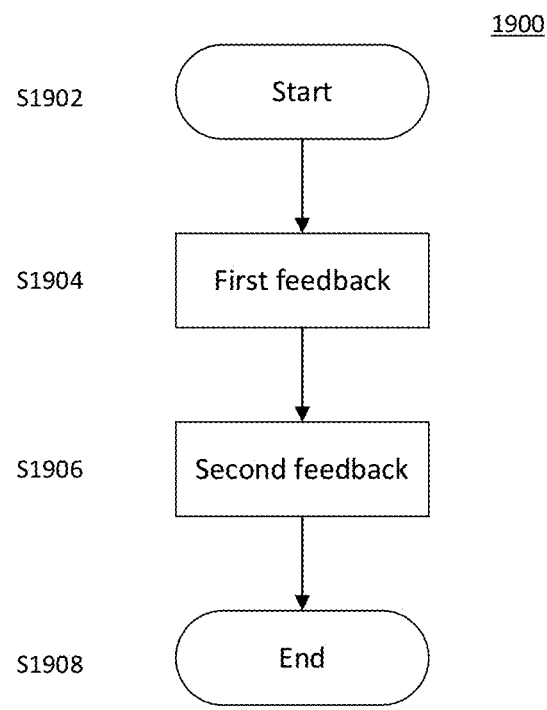
FIG. 19 schematically shows a conceptual operational flow of an electronic device on a terminal device side, according to the second embodiment of the present disclosure.

Hereinafter, a conceptual operation flow 1900 of the electronic device on the terminal device side according to the second embodiment of the present disclosure will be explained with reference to FIG. 19.

The process starts at S1902.

The terminal device receives the reference signals from the base station and performs the first feedback at S1904. The first feedback may belong to a kind of feedback for the long-term channel state information.

Subsequently, in a case that the terminal devices are grouped into non-linear precoding terminal device groups (or, in a case when there is no grouping, the non-linear precoding is to be used in the communication), at S1906, the terminal device receives the precoded reference signals from the base station and performs the second feedback. Wherein, the reference signals are pre-coded by using a long-term precoding matrix calculated based on the first feedback.

Finally, at step S1908, the operation flow of the terminal device according to the second embodiment ends. In fact, after transmitting the second feedback, the terminal device can receive the precoded signals from the base station and decode the received signals according to a corresponding method.

It should be noted that the operation flow 1900 is intended to highlight a specific operation of the terminal device according to the second embodiment of the present disclosure, and the operation flow 1900 may optionally include other steps. Preferably, in a case that the terminal devices are grouped based on the channel state information in the communication system as described in the first embodiment, the terminal device may transmit the channel state information for grouping to the base station. For example, the terminal device may respond to the beam scanning performed by the base station to feedback the reference signal received power (RSRP) and interference information to the base station, so that the base station can group the terminal devices based thereon.

Hereinafter, an interaction flow between a base station and a terminal device according to an embodiment of the present disclosure will be explained with reference to FIG. 20.

Figure 20:
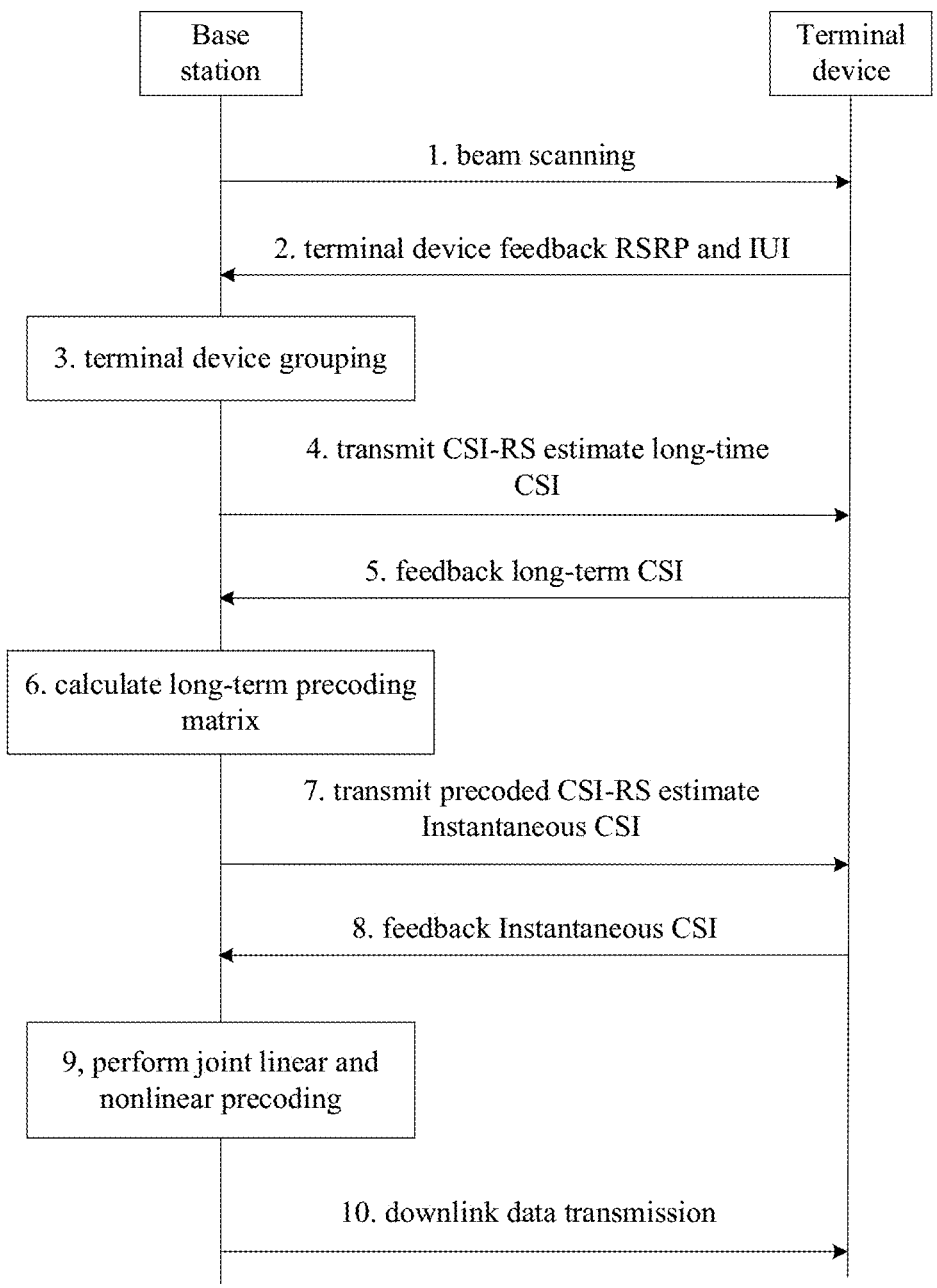
FIG. 20 schematically shows the interaction flow of a base station and a terminal device according to the second embodiment of the present disclosure.

As shown in FIG. 20, the base station may first perform beam scanning to obtain information related to the terminal device, for example, the channel state information used to group the terminal devices.

In response to beam scanning, the terminal device can feed back corresponding channel state information for grouping. For example, the terminal device may feedback reference signal received power (RSRP) and interference information to the base station. Preferably, the interference information may indicate interference between terminal devices.

After receiving the channel state information for grouping fed back by the terminal device, the base station may group the terminal devices. Preferably, the base station can group the terminal devices by using the method according to the first embodiment. Alternatively, the base station may use other methods to group the terminal devices, or the base station may not group the terminal devices.

Subsequently, the base station may send reference signals (CSI-RS) to the terminal device in order to estimate the long-term channel state information (i.e., long-term CSI). As explained above, the long-term channel state information can be used to calculate a linear precoding matrix for a linear precoding terminal device group, and the long-term channel state information can also be used to estimate instantaneous channel state information.

After receiving the reference signals transmitted by the base station, the terminal device can feed back with respect to this, that is, the terminal device can feed back the long-term CSI.

Subsequently, the base station may calculate the long-term precoding matrix based on the received long-term CSI. For example, the long-term precoding matrix may include a linear precoding matrix for a linear precoding terminal device group, and a long-term precoding matrix for a nonlinear precoding terminal device group.

Next, for a non-linear precoding terminal device group, the base station can use the calculated long-term precoding matrix to precode the reference signals and transmit the precoded reference signals to the terminal devices in order to estimate instantaneous channel state information.

The terminal device that has received the precoded reference signals can feed back with respect to this, that is, feedback the instantaneous channel state information.

Subsequently, the base station can use the feedback instantaneous channel information to calculate a precoding matrix for the nonlinear precoding terminal devices, and, in a case of joint linear and nonlinear precoding, perform joint precoding.

Finally, the base station can transmit the precoded signals to the terminal devices, that is, perform downlink data transmission to the terminal devices.

Implementation of Exemplary Embodiments of the Present Disclosure

According to embodiments of the present disclosure, various implementations of the concepts of the present disclosure can be conceived, including, but not limited to:

Exemplary embodiment 1. An electronic device on a control device side for a wireless communication system, comprising:
  a processing circuit configured to:
    group a plurality of terminal devices of the wireless communication system into one linear precoding terminal device group and one or more nonlinear precoding terminal device groups based on respective nonlinear precoding capabilities and channel state information of the plurality of terminal devices;
    notify each terminal device whether nonlinear precoding or linear precoding is to be employed in communication for the terminal device by means of a nonlinear precoding indicator based on the grouping.

Exemplary embodiment 2. The electronic device of Exemplary embodiment 1, wherein the processing circuit is further configured to:
  set a precoding matrix for communication for each terminal device group based on the grouping of the plurality of terminal devices.

Exemplary embodiment 3. The electronic device of Exemplary embodiment 2,
  wherein, the non-linear precoding indicator has a length of 1 bit, and the non-linear precoding indicator having a value of 1 indicates non-linear precoding, and the non-linear precoding indicator having a value of 0 indicates linear precoding.

Exemplary embodiment 4. The electronic device of any one of Exemplary embodiments 1-3,
  wherein, the non-linear precoding capability of a terminal device indicates whether the terminal device supports non-linear precoding.

Exemplary embodiment 5. The electronic device of Exemplary embodiment 4,
  wherein, the non-linear precoding capability of a terminal device is represented by a non-linear precoding capability indicator from the terminal device with a length of 1 bit, and
  wherein, the non-linear precoding capability indicator having a value of 1 indicates that the terminal device supports non-linear precoding, and the non-linear precoding capability indicator having a value of 0 indicates that the terminal device does not support non-linear precoding.

Exemplary embodiment 6. The electronic device of any one of Exemplary embodiments 1-5, wherein, the processing circuit is further configured to group terminal devices among the plurality of terminal devices that do not support nonlinear precoding into the linear precoding terminal device group.

Exemplary embodiment 7. The electronic device of any one of Exemplary embodiments 1-6,
  wherein, in each non-linear precoding terminal device group, terminal devices are randomly sorted.

Exemplary embodiment 8. The electronic device of any one of Exemplary embodiments 1-6,
  wherein, in each non-linear precoding terminal device group, terminal devices are sorted according to noise conditions of respective terminal devices in communication.

Exemplary embodiment 9. The electronic device of any one of Exemplary embodiments 1-8,
  wherein, the channel state information indicates interference information for the terminal device, and
  wherein, the processing circuit is further configured to group terminal devices among the plurality of terminal devices that support non-linear precoding into one or more non-linear precoding terminal device groups based on the interference information of respective terminal devices.

Exemplary embodiment 10. The electronic device of Exemplary embodiment 9,
  wherein the interference information indicates inter-terminal-device interference, and
  wherein, for the terminal devices among the multiple terminal devices that support non-linear precoding, the terminal devices whose inter-terminal-device interference exceeds a predetermined threshold are grouped into the same non-linear precoding terminal device group.

Exemplary embodiment 11. The electronic device of any one of Exemplary embodiments 1-10, wherein the processing circuit is further configured to further modify the terminal device grouping according to a predetermined grouping configuration.

Exemplary embodiment 12. The electronic device of Exemplary embodiment 11,
  wherein, the terminal device grouping is modified such that the number of terminal devices in the linear precoding terminal device group in the terminal device grouping after the modification is less than or equal to the number of terminal devices in the linear precoding terminal device group in the terminal device grouping before the modification.

Exemplary embodiment 13. The electronic device of Exemplary embodiment 11,
  wherein, the modification implements at least one of the following:
  select a terminal device in the linear precoding terminal device group that is most interfered by other terminal devices in the group to add to a desired nonlinear precoding terminal device group from the linear precoding terminal device group; or select a terminal device in a non-linear precoding terminal device group that is least interfered by other terminal devices in the group to add to a desired other terminal device group from the non-linear precoding terminal device group.

Exemplary embodiment 14. The electronic device of any one of Exemplary embodiments 2-13,
wherein, the precoding matrix used for the communication for each terminal device group is set based on inter-group interference constraint between the terminal device groups in the communication.

Exemplary embodiment 15. The electronic device of Exemplary embodiment 14,
wherein, the inter-group interference constraint specifies that in the communication, the interference by each of the one or more non-linear precoding terminal device groups to the linear precoding terminal device group is zero.

Exemplary embodiment 16. The electronic device of Exemplary embodiment 15,
wherein, the non-linear precoding matrix that used for communication for each of the one or more non-linear precoding terminal device groups is set to be orthogonal to a channel matrix that used for communication for the linear precoding terminal device group.

Exemplary embodiment 17. The electronic device of Exemplary embodiment 14,
wherein, the inter-group interference constraint specifies that in the communication, the interference by the linear precoding terminal device group to each of the one or more non-linear precoding terminal device groups is zero.

Exemplary embodiment 18. The electronic device of Exemplary embodiment 17,
wherein, the linear precoding matrix that used for communication for the linear precoding terminal device group is set to be orthogonal to the non-linear precoding matrix that used for communication for each of the one or more non-linear precoding terminal device groups.

Exemplary embodiment 19. The electronic device of Exemplary embodiment 14,
wherein, the inter-group interference constraint specifies that in the communication, the interference by the linear precoding terminal device group to each of the one or more non-linear precoding terminal device groups is non-zero.

Exemplary embodiment 20. The electronic device of Exemplary embodiment 14,
wherein the processing circuit is further configured to determine, based on the channel status between the electronic device and the plurality of terminal devices, whether to set the inter-group interference constraint to specify that the inter-group interference by the linear precoding terminal device group to each non-linear precoding terminal device groups is zero.

Exemplary embodiment 21. The electronic device of Exemplary embodiment 20,
wherein the processing circuit is further configured to, in a case that the channel status between the electronic device and each of the plurality of terminal devices has a fluctuation smaller than a predetermined threshold and/or a signal-to-noise ratio higher than a predetermined threshold, determine the inter-group interference by the linear precoding terminal device group to each non-linear precoding terminal device groups to be zero.

Exemplary embodiment 22. The electronic device of Exemplary embodiment 14,
wherein, the inter-group interference constraint specifies that when there are multiple non-linear precoding terminal device groups, the inter-group interference among the multiple non-linear precoding terminal device groups is zero.

Exemplary embodiment 23. The electronic device of Exemplary embodiment 22,
wherein, a non-linear precoding matrix used for the communication for the plurality of non-linear precoding terminal device groups is orthogonal to channel matrices for the communication for other non-linear precoding terminal device groups in the plurality of non-linear precoding terminal device groups.

Exemplary embodiment 24. The electronic device of Exemplary embodiment 14,
wherein, the inter-group interference constraint specifies that when there are multiple non-linear precoding terminal device groups, the inter-group interference among the multiple non-linear precoding terminal device groups is non-zero.

Exemplary embodiment 25. The electronic device of any one of Exemplary embodiments 2-14,
wherein, a precoding matrix used for the communication for a non-linear precoding terminal device group is set so that there is a causal structure among multiple terminal devices in the non-linear precoding terminal device group, and the causal structure indicates that it is able to cancel the inter-device interference for a terminal device by canceling the interference by one or more terminal devices before the terminal device to the terminal device.

Exemplary embodiment 26. The electronic device of Exemplary embodiment 25,
wherein, the precoding matrix is set so that in a case that the inter-group interference constraint specifies that when there are multiple non-linear precoding terminal device groups, the inter-group interference among the multiple non-linear precoding terminal device groups is non-zero, the precoding matrices used for the communication for the non-linear precoding terminal device groups are set so that there is a causal structure among the plurality of non-linear precoding terminal device groups, and the causal structure indicates that it is able to cancel the inter-group interference for a nonlinear precoding terminal device group by canceling the interference by one or more nonlinear precoding terminal device groups before the nonlinear precoding terminal device group to the nonlinear precoding terminal device group.

Exemplary embodiment 27. The electronic device of Exemplary embodiment 26, wherein the processing circuit is further configured to, for a non-linear precoding terminal device group, cancel the following interferences in advance through a Tomlinson-Harashima precoding (THP) algorithm:

interference between terminal devices in the non-linear precoding terminal device group;

the inter-group interference by the linear precoding terminal device group to the nonlinear precoding terminal device group, in a case that the inter-group interference by the linear precoding terminal device group to the nonlinear precoding terminal device group is non-zero; as well as the inter-group interference by another non-linear precoding terminal device group to the non-linear precoding terminal device group, in a case that there are multiple non-linear precoding terminal device groups, and the inter-group interference by another non-linear precoding terminal device group to the non-linear precoding terminal device group is non-zero.

Exemplary embodiment 28. The electronic device of any one of Exemplary embodiments 1-27, wherein the processing circuit is further configured to transmit a modulus threshold indicator to a terminal device that adopts nonlinear precoding, where the modulus threshold indicator indicates a modulus threshold when performing a modulus operation.

Exemplary embodiment 29. The electronic device of Exemplary embodiment 28,
wherein the modulus threshold indicator is an n-bit indicator representing $2^n$ types of thresholds, where n is an integer greater than or equal to 1.

Exemplary embodiment 30. The electronic device of any one of Exemplary embodiments 1-29, wherein the processing circuit is further configured to:
transmit reference signals to the plurality of terminal devices, and estimate long-term channel state information based on feedbacks from the plurality of terminal devices;
calculate a precoding matrix for communication for the linear precoding terminal device group and a corresponding long-term precoding matrix for communication for each nonlinear precoding terminal device group in the one or more non-linear precoding terminal device groups based on the long-term channel state information;
transmit, to the one or more non-linear precoding terminal device groups, reference signals precoded with corresponding long time precoding matrices, and estimate, based on feedbacks, instantaneous channel state information and/or interference channel for each nonlinear precoding terminal device group in the one or more non-linear precoding terminal device groups so as to calculate a precoding matrix for communication for each non-linear precoding terminal device group.

Exemplary embodiment 31. The electronic device of Exemplary embodiment 30,
wherein the interference channel includes the interference channel between the linear precoding terminal device group and the nonlinear precoding terminal device groups and/or the interference channel between the nonlinear precoding terminal device groups.

Exemplary embodiment 32. A method for a control device side of a wireless communication system, comprising:
grouping a plurality of terminal devices of the wireless communication system into one linear precoding terminal device group and one or more nonlinear precoding terminal device groups based on respective nonlinear precoding capabilities and channel state information of the plurality of terminal devices;
notifying each terminal device whether nonlinear precoding or linear precoding is employed in communication for the terminal device based on the grouping.

Exemplary embodiment 33. An electronic device on a terminal device side for a wireless communication system, comprising:
a processing circuit configured to:
transmit information on nonlinear precoding capability of the terminal device and channel state information to a control device of the wireless communication system; and
receive from the control device nonlinear precoding indicator indicating whether nonlinear precoding or linear precoding is employed in communication for the terminal device;
wherein the terminal devices are grouped into one linear precoding terminal device group and one or more nonlinear precoding terminal device groups based on nonlinear precoding capabilities and channel state information of the terminal devices.

Exemplary embodiment 34. The electronic device of Exemplary embodiment 33,
wherein, the non-linear precoding capability of a terminal device indicates whether the terminal device supports non-linear precoding.

Exemplary embodiment 35. The electronic device of Exemplary embodiment 34,
wherein, the non-linear precoding capability is represented by a non-linear precoding capability indicator with a length of 1 bit, and the non-linear precoding capability indicator having a value of 1 indicates that the terminal device supports non-linear precoding, and the non-linear precoding capability indicator having a value of 0 indicates that the terminal device supports linear precoding.

Exemplary embodiment 36. The electronic device of Exemplary embodiment 33,
wherein, the processing circuit is further configured to receive a signal pre-coded by using a pre-coding matrix from the control device, wherein the pre-coding matrix is set based on the grouping.

Exemplary embodiment 37. The electronic device of Exemplary embodiment 33,
wherein, the non-linear precoding indicator has a length of 1 bit, and the non-linear precoding indicator having a value of 1 indicates non-linear precoding, and the non-linear precoding indicator having a value of 0 indicates linear precoding.

Exemplary embodiment 38. The electronic device of Exemplary embodiment 37,
wherein, in a case of non-linear precoding, the electronic device receives a modulus threshold indicator, the modulus threshold indicator indicating a modulus threshold when performing a modulus operation, and the electronic device performs the modulus operation based on the modulus threshold at the receiving end.

Exemplary embodiment 39. The electronic device of Exemplary embodiment 38,
wherein the modulus threshold indicator is an n-bit indicator representing $2^n$ types of thresholds, where n is an integer greater than or equal to 1.

Exemplary embodiment 40. The electronic device of any one of Exemplary embodiments 33-39,
wherein the terminal device, when not supports the non-linear precoding, is assigned to the linear precoding terminal device group.

Exemplary embodiment 41. The electronic device of any one of Exemplary embodiments 33-40,
wherein, the channel state information indicates interference information for the terminal device, and
wherein, the terminal device, when supports the non-linear precoding, is assigned to one of the one or more non-linear precoding terminal device groups based on the interference information of the terminal device.

Exemplary embodiment 42. The electronic device of Exemplary embodiment 40,
wherein the interference information indicates interference between terminal devices, and wherein, in a case that the interference between the terminal device and another terminal device in the communication system supporting the non-linear precoding has a magnitude exceeding a predetermined threshold, the terminal device and the another terminal device are grouped into the same non-linear precoding terminal device group.

Exemplary embodiment 43. The electronic device of Exemplary embodiment 33,
wherein, the precoding matrix used for the communication for each terminal device group is set based on inter-group interference constraint between the terminal device groups.

Exemplary embodiment 44. The electronic device of Exemplary embodiment 43,
wherein, the inter-group interference constraint specifies that the interference by each of the one or more non-linear precoding terminal device groups to the linear precoding terminal device group is zero.

Exemplary embodiment 45. The electronic device of Exemplary embodiment 43,
wherein, the inter-group interference constraint specifies that the interference by the linear precoding terminal device group to each of the one or more non-linear precoding terminal device groups is zero or non-zero.

Exemplary embodiment 46. The electronic device of Exemplary embodiment 43,
wherein, the inter-group interference constraint specifies that when there are multiple non-linear precoding terminal device groups, the inter-group interference among the multiple non-linear precoding terminal device groups is zero or non-zero.

Exemplary embodiment 47. The electronic device of Exemplary embodiment 33, wherein the processing circuit is further configured to:
receive reference signals from the control device of the wireless communication system, and perform a first feedback; and
in the case where the terminal device is assigned to a non-linear precoding terminal device group, receive from the control device reference signals precoded by the control device using a long-term precoding matrix calculated based on the first feedback, and perform a second feedback.

Exemplary embodiment 48. The electronic device of Exemplary embodiment 47,
wherein the second feedback is used to estimate instantaneous channel state information and/or interference channels so that the control device of the wireless system calculates the precoding matrix used for communication for the non-linear precoding terminal device group.

Exemplary embodiment 49. A method for a terminal device side of a wireless communication system, comprising:
transmitting information on nonlinear precoding capability of the terminal device and channel state information to a control device of the wireless communication system; and
receiving from the control device nonlinear precoding indicator indicating whether nonlinear precoding or linear precoding is employed in communication for the terminal device;
wherein the terminal devices are grouped into one linear precoding terminal device group and one or more nonlinear precoding terminal device groups based on nonlinear precoding capabilities and channel state information of the terminal devices.

Exemplary embodiment 50. A device at control device side of a wireless communication system, wherein the wireless communication system comprises the control device, and a plurality of terminal devices which are grouped into one linear precoding terminal device group and one or more nonlinear precoding terminal device groups, the device comprising:
acquisition unit for acquiring long-term channel state information; and
estimation unit for estimating, based on the long-term channel state information, instantaneous channel state information and/or interference channel for the one or more non-linear precoding terminal device groups.

Exemplary embodiment 51. The device of Exemplary embodiment 50,
wherein, the acquisition unit is configured to transmit reference signals to the terminal device and estimate the long-term channel state information based on the feedback from the terminal device.

Exemplary embodiment 52. The device of Exemplary embodiment 50 or 51, wherein, the estimation unit is configured to:
calculate a precoding matrix for the linear precoding terminal device group and a corresponding long-term precoding matrix for each nonlinear precoding terminal device group in the one or more non-linear precoding terminal device groups based on the long-term channel state information;
transmit, to the one or more non-linear precoding terminal device groups, reference signals precoded with a corresponding long time precoding matrices, and estimate, based on feedbacks, instantaneous channel state information and/or interference channel for each nonlinear precoding terminal device group in the one or more non-linear precoding terminal device groups so as to calculate a precoding matrix for communication for each non-linear precoding terminal device group.

Exemplary embodiment 53. The device of Exemplary embodiment 52,
wherein the interference channel includes the interference channel between the linear precoding terminal device group and the nonlinear precoding terminal device groups and/or the interference channel between the nonlinear precoding terminal device groups.

Exemplary embodiment 54. A method for control device side of a wireless communication system, wherein the wireless communication system comprises the control device, and a plurality of terminal devices which are grouped into one linear precoding terminal device group and one or more nonlinear precoding terminal device groups, the method comprising:
acquisition step for acquiring long-term channel state information; and
estimation step of estimating, based on the long-term channel state information, instantaneous channel state information and/or interference channel for the one or more non-linear precoding terminal device groups.

Exemplary embodiment 55. The method of Exemplary embodiment 54,
wherein, the acquisition step comprises transmitting reference signals to the terminal device and estimating the long-term channel state information based on the feedback from the terminal device.

Exemplary embodiment 56. The method of Exemplary embodiment 54 or 55, wherein, the estimation step comprises:
  calculating a precoding matrix for the linear precoding terminal device group and a corresponding long-term precoding matrix for each nonlinear precoding terminal device group in the one or more non-linear precoding terminal device groups based on the long-term channel state information;
  transmitting, to the one or more non-linear precoding terminal device groups, reference signals precoded with a corresponding long time precoding matrices, and estimate, based on feedbacks, instantaneous channel state information and/or interference channel for each nonlinear precoding terminal device group in the one or more non-linear precoding terminal device groups so as to calculate a precoding matrix for communication for each non-linear precoding terminal device group.

Exemplary embodiment 57. The method of Exemplary embodiment 56,
  wherein the interference channel includes the interference channel between the linear precoding terminal device group and the nonlinear precoding terminal device groups and/or the interference channel between the nonlinear precoding terminal device groups.

Exemplary embodiment 58. A non-transient computer readable storage medium storing executable instructions which, when executed, implement the method of any of Exemplary embodiments 32, 49, 54-47.

Exemplary embodiment 59. A device, comprising:
a processor, and
a storage device storing executable instructions which, when executed, implement the method of any of Exemplary embodiments 32, 49, 54-47.

It should be noted that the application examples described above are merely exemplary. The embodiments of the present disclosure can also be executed in any other suitable manner in the above application examples, and the advantageous effects obtained by the embodiments of the present disclosure still can be achieved. Moreover, the embodiments of the present disclosure can also be applied to other similar application examples, and the advantageous effects obtained by the embodiments of the present disclosure can still be achieved.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory card, a memory stick, and the like.

Figure 21:
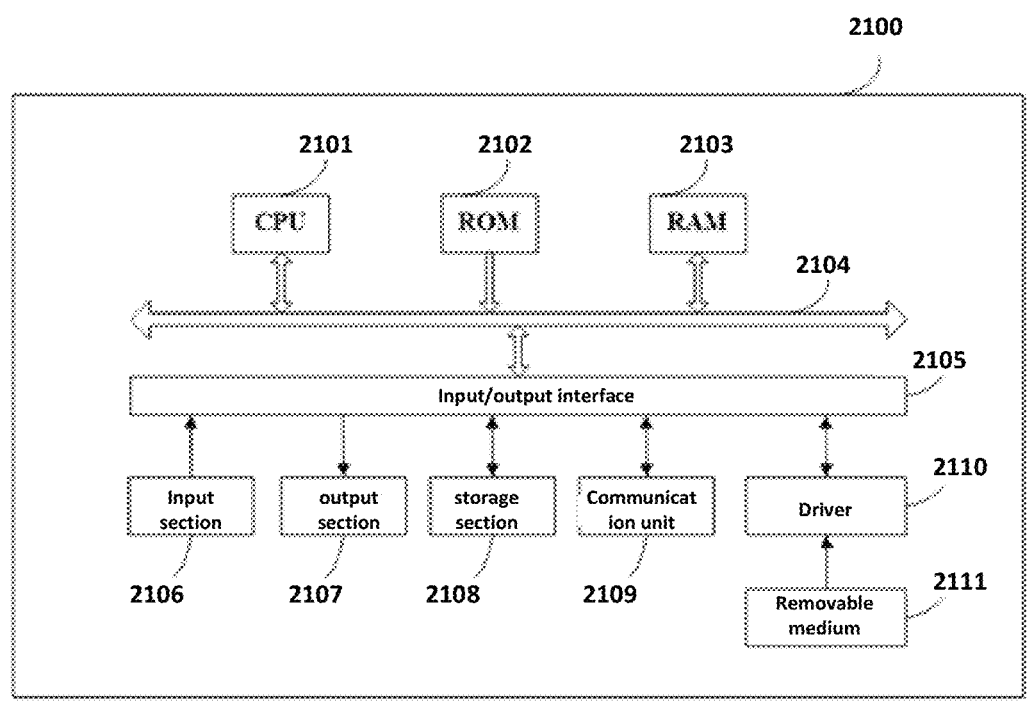
FIG. 21 is a block diagram of an exemplary structure of a personal computer as an information processing device that can be employed in an embodiment of the present disclosure.

In addition, it should be understood that the processes and devices described above may also be implemented by software and/or firmware. When implemented by software and/or firmware, a program constituting the software is installed from a storage medium or a network to a computer having a dedicated hardware structure, such as a general-purpose personal computer 2100 shown in FIG. 21, and the computer can perform a variety of functions by installing various programs thereon. FIG. 21 is a block diagram showing an example structure of a personal computer as an information processing apparatus that can be adopted in an embodiment of the present disclosure. In one example, the personal computer may correspond to the above-described exemplary terminal device according to the present disclosure.

In FIG. 21, a central processing unit (CPU) 2101 performs various processes according to a program stored in a read only memory (ROM) 2102 or a program loaded from a storage section 2108 to a random-access memory (RAM) 2103. In the RAM 2103, data required when the CPU 2101 executes various processes and the like is also stored as necessary.

The CPU 2101, the ROM 2102, and the RAM 2103 are connected to each other via a bus 2104. An input/output interface 2105 is also connected to the bus 2104.

The following components are connected to the input/output interface 2105: an input section 2106 including a keyboard, a mouse, etc.; an output section 2107 including a display, such as a cathode ray tube (CRT), a liquid crystal display (LCD), etc., and a speaker, etc.; a storage section 2108 including hard disks, etc.; and communication section 2109 including network interface cards such as LAN cards, modems, etc. The communication section 2109 performs communication processing via a network such as the Internet.

A driver 2110 is also connected to the input/output interface 2105 as needed. A removable medium 2111 such as a magnetic disk, an optical disk, a magneto-optical disk, a semiconductor memory, etc. is installed on the drive 2110 as needed, so that a computer program read out therefrom can be installed into the storage section 2108 as needed.

In a case where the above-mentioned processes are realized by a software, the programs constituting the software are installed from a network such as the Internet or a storage medium such as a removable medium 2111.

Those skilled in the art should understand that such a storage medium is not limited to the removable medium 2111 shown in FIG. 21 in which the program is stored and which is distributed separately from the device to provide the program to the user. Examples of the removable medium 2111 include a magnetic disk (including a floppy disk (registered trademark)), an optical disk (including a CD-ROM and a digital versatile disk (DVD)), and a magneto-optical disk (including a mini disk (MD) (registered trademark))) and semiconductor memory. Alternatively, the storage medium may be the ROM 2102, a hard disk included in the storage portion 2108, and the like, in which programs are stored and which are distributed to users along with the device containing them.

The technology of the present disclosure can be applied to various products.

Figure 4:
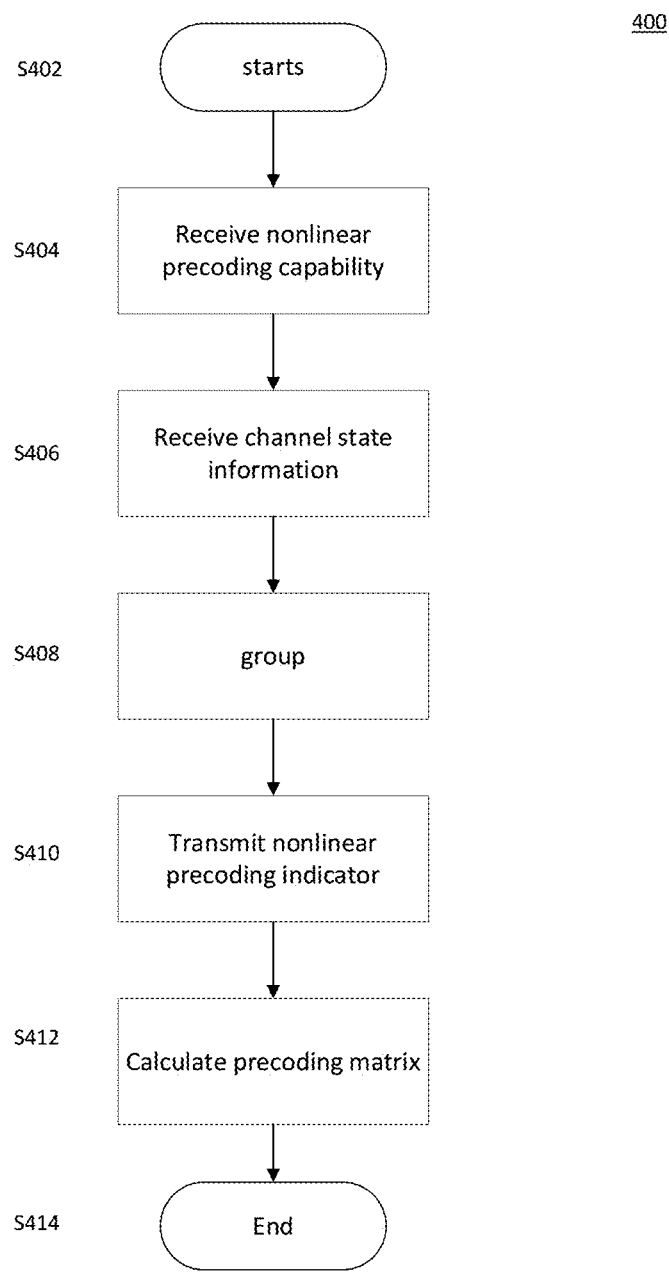
FIG. 4 schematically shows a conceptual operational process of an electronic device on the control device side of the first embodiment of the present disclosure.
Figure 10:
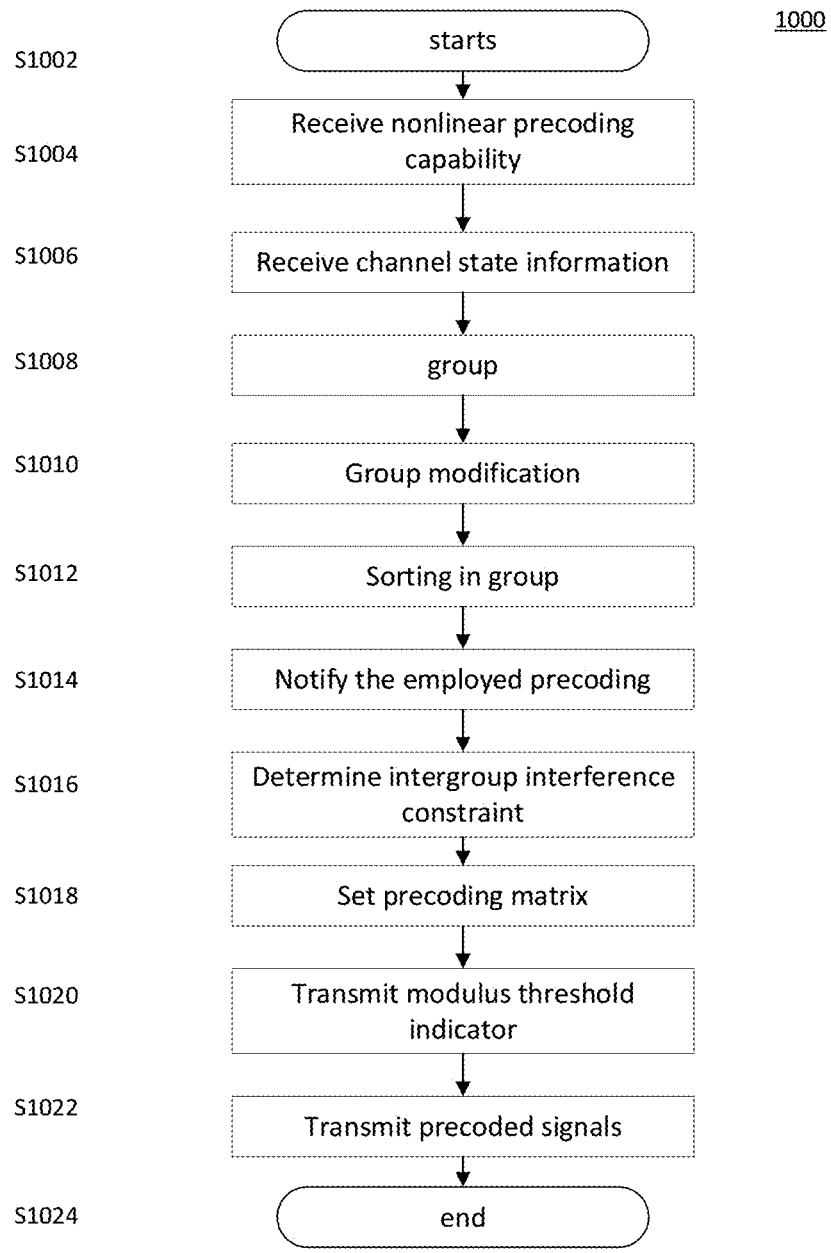
FIG. 10 schematically shows the operational flow of the electronic device on the control device side, according to a first embodiment of the present disclosure.
Figure 17:
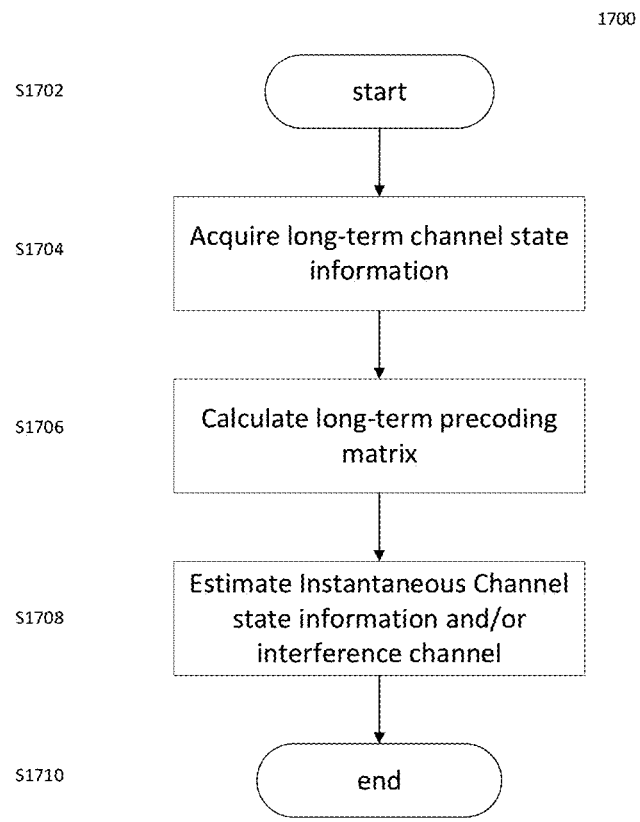
FIG. 17 schematically shows a conceptual operational flow of an electronic device on the control device side and a terminal device, according to the second embodiment of the present disclosure.

For example, the electronic devices 30 and 160 according to embodiments of the present disclosure can be implemented a variety of control devices/base stations, or be included in a variety of control devices/base stations, and the method as shown in FIG. 4 and/or FIG. 10 and/or FIG. 17 can be implemented by a variety of control devices/base stations. For example, the electronic devices 110 and 180 according to embodiments of the present disclosure can be implemented as a variety of terminal devices/user equipment or be included in a variety of terminal devices/user equipment, and the method as shown in FIG. 12 and/or FIG. 19 can be implemented by a variety of terminal devices/user equipment.

For example, the base stations mentioned in this disclosure can be implemented as any type of evolved Node B (gNB), such as macro gNB and small gNB. A small gNB may be a gNB covering a cell smaller than a macro cell, such as a pico gNB, a micro gNB, and a home (femto) gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at a place different from the main body. In addition, various types of terminals described below can work as base stations by temporarily or semi-persistently performing base station functions.

For example, the terminal device mentioned in this disclosure is also referred to as user equipment in some examples, and can be implemented as a mobile terminal such as a smart phone, a tablet personal computer (PC), a notebook PC, a portable gaming terminal, a portable/dongle Mobile routers and digital cameras, or vehicle terminals such as car navigation equipment. User equipment can also be implemented as a terminal that performs machine-to-machine (M) communication, also called as a machine type communication (MTC) terminal. In addition, the user equipment may be a wireless communication module mounted on each of the terminals described above, such as an integrated circuit module including a single chip.

Examples according to the present disclosure will be described below with reference to FIGS. 22 to 25.

[Example of Base Station]

It should be understood that the term "base station" in this disclosure has the full breadth of its usual meaning and includes at least a wireless communication station that is used as part of a wireless communication system or radio system for facilitating communication. Examples of base stations may be, for example but not limited to, the following: maybe one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE, eNB, etc that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios.

First Example

Figure 22:
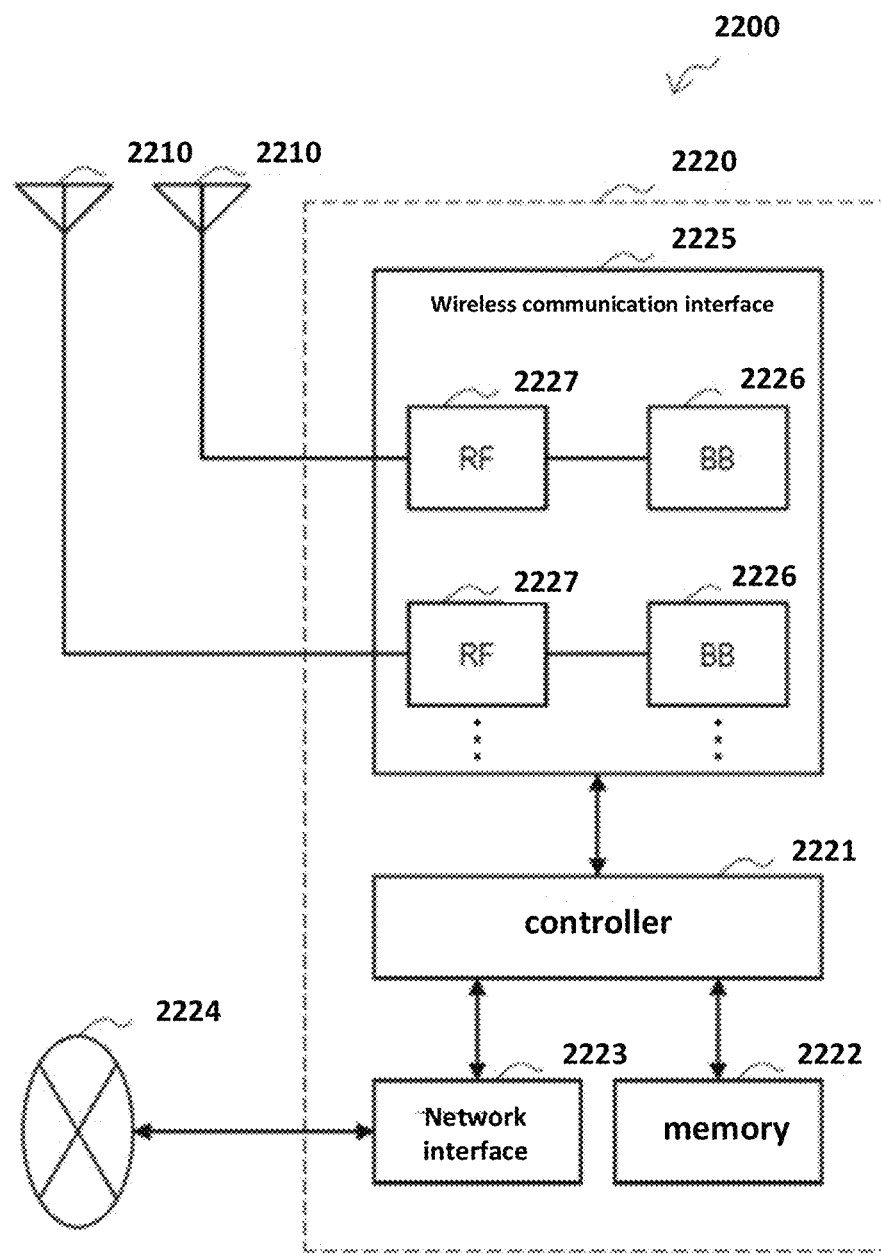
FIG. 22 is a block diagram showing a first example of a schematic configuration of a gNB to which the technology of the present disclosure can be applied.

FIG. 22 is a block diagram showing a first example of a schematic configuration of a gNB to which the technology of the present disclosure can be applied. The gNB 2200 includes a plurality of antennas 2210 and a base station device 2220. The base station device 2220 and each antenna 2210 may be connected to each other via an RF cable. In an implementation manner, the gNB 2200 (or the base station device 2220) herein may correspond to the above-mentioned electronic devices 300A, 1300A, and/or 1500B.

Each of the antennas 2210 includes a single or multiple antenna elements, such as multiple antenna elements included in a multiple-input multiple-output (MIMO) antenna, and is used for the base station device 2220 to transmit and receive wireless signals. As shown in FIG. 22, the gNB 2200 may include a plurality of antennas 2210. For example, multiple antennas 2210 may be compatible with multiple frequency bands used by gNB 2200.

The base station device 2220 includes a controller 2221, a memory 2222, a network interface 2223, and a wireless communication interface 2225.

The controller 2221 may be, for example, a CPU or a DSP, and operates various functions of the base station device 2220 at a higher layer. For example, the controller 2221 generates data groups based on data in signals processed by the wireless communication interface 2225, and passes the generated groups via the network interface 2223. The controller 2221 may bundle data from multiple baseband processors to generate bundled groups, and pass the generated bundled groups. The controller 2221 may have logical functions that perform controls such as radio resource control, radio bearer control, mobility management, admission control, and scheduling. The controls can be performed in conjunction with a nearby gNB or core network node. The memory 2222 includes a RAM and a ROM, and stores a program executed by the controller 2221 and various types of control data such as a terminal list, transmission power data, and scheduling data.

The network interface 2223 is a communication interface for connecting the base station device 2220 to the core network 2224. The controller 2221 may communicate with a core network node or another gNB via the network interface 2223. In this case, the gNB 2200 and the core network node or other gNBs may be connected to each other through a logical interface such as an S1 interface and an X2 interface. The network interface 2223 may also be a wired communication interface or a wireless communication interface for a wireless backhaul line. If the network interface 2223 is a wireless communication interface, compared with the frequency band used by the wireless communication interface 2225, the network interface 2223 can use a higher frequency band for wireless communication.

The wireless communication interface 2225 supports any cellular communication scheme such as Long Term Evolution (LTE) and LTE-Advanced, and provides a wireless connection to a terminal located in a cell of the gNB 2200 via an antenna 2210. The wireless communication interface 2225 may generally include, for example, a baseband (BB) processor 2226 and an RF circuit 2227. The BB processor 2226 may perform, for example, encoding/decoding, modulation/demodulation, and multiplexing/demultiplexing, and execute various types of signal processing in layers such as L1, Medium Access Control (MAC), Radio Link Control (RLC), and Group Data Convergence Protocol (PDCP). As an alternative of the controller 2221, the BB processor 2226 may have a part or all of the above-mentioned logical functions. The BB processor 2226 may be a memory storing a communication control program, or a module including a processor and related circuits configured to execute the program. Updating the program can change the function of the BB processor 2226. The module may be a card or a blade inserted into a slot of the base station device 2220. Alternatively, the module may be a chip mounted on a card or a blade. Meanwhile, the RF circuit 2227 may include, for example, a mixer, a filter, and an amplifier, and transmits and receives a wireless signal via the antenna 2210. Although FIG. 22 illustrates an example in which one RF circuit 2227 is connected to one antenna 2210, the present disclosure is not limited to this illustration, but one RF circuit 2227 may be connected to multiple antennas 2210 at the same time.

As shown in FIG. 22, the wireless communication interface 2225 may include a plurality of BB processors 2226. For example, the plurality of BB processors 2226 may be compatible with multiple frequency bands used by gNB 2200. As shown in FIG. 22, the wireless communication interface 2225 may include a plurality of RF circuits 2227. For example, the plurality of RF circuits 2227 may be compatible with multiple antenna elements. Although FIG. 22 shows an example in which the wireless communication interface 2225 includes a plurality of BB processors 2226 and a plurality of RF circuits 2227, the wireless communication interface 2225 may also include a single BB processor 2226 or a single RF circuit 2227.

Second Example

Figure 23:
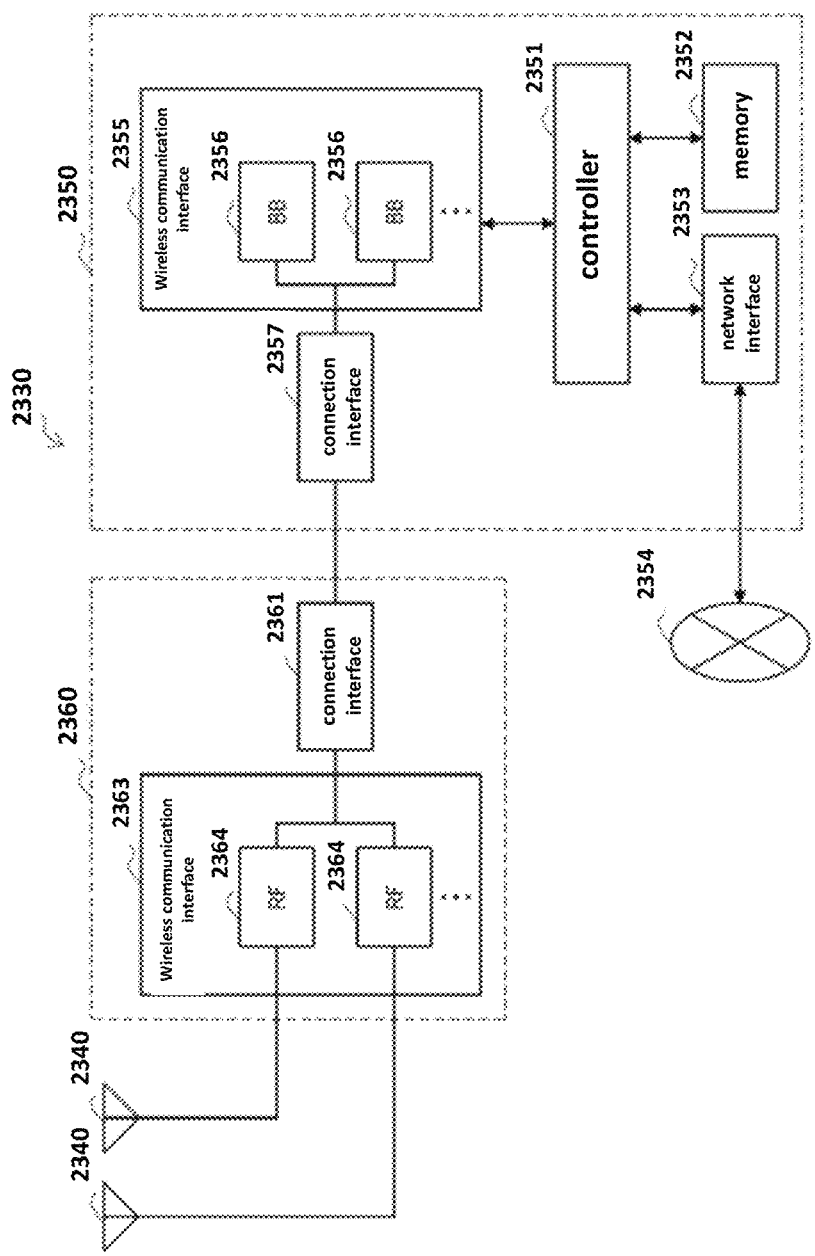
FIG. 23 is a block diagram showing a second example of a schematic configuration of a gNB to which the technology of the present disclosure can be applied.

FIG. 23 is a block diagram showing a second example of a schematic configuration of a gNB to which the technology of the present disclosure can be applied. The gNB 2330 includes multiple antennas 2340, base station equipment 2350, and RRH 2360. The RRH 2360 and each antenna 2340 may be connected to each other via an RF cable. The base station equipment 2350 and the RRH 2360 may be connected to each other via a high-speed line such as a fiber optic cable. In an implementation manner, the gNB 2330 (or the base station device 2350) herein may correspond to the foregoing electronic devices 300A, 1300A, and/or 1500B.

Each of the antennas 2340 includes a single or multiple antenna elements (such as multiple antenna elements included in a MIMO antenna) and is used for RRH 2360 to transmit and receive wireless signals. As shown in FIG. 23, the gNB 2330 may include multiple antennas 2340. For example, multiple antennas 2340 may be compatible with multiple frequency bands used by gNB 2330.

The base station device 2350 includes a controller 2351, a memory 2352, a network interface 2353, a wireless communication interface 2355, and a connection interface 2357. The controller 2351, the memory 2352, and the network interface 2353 are the same as the controller 2221, the memory 2222, and the network interface 2223 described with reference to FIG. 22.

The wireless communication interface 2355 supports any cellular communication scheme such as LTE and LTE-Advanced, and provides wireless communication to a terminal located in a sector corresponding to the RRH 2360 via the RRH 2360 and the antenna 2340. The wireless communication interface 2355 may typically include, for example, a BB processor 2356. The BB processor 2356 is the same as the BB processor 2226 described with reference to FIG. 22 except that the BB processor 2356 is connected to the RF circuit 2364 of the RRH 2360 via the connection interface 2357. As shown in FIG. 23, the wireless communication interface 2355 may include a plurality of BB processors 2356. For example, multiple BB processors 2356 may be compatible with multiple frequency bands used by gNB 2330. Although FIG. 23 shows an example in which the wireless communication interface 2355 includes a plurality of BB processors 2356, the wireless communication interface 2355 may also include a single BB processor 2356.

The connection interface 2357 is an interface for connecting the base station device 2350 (wireless communication interface 2355) to the RRH 2360. The connection interface 2357 may also be a communication module for communication in the above-mentioned high-speed line connecting the base station device 2350 (wireless communication interface 2355) to the RRH 2360.

The RRH 2360 includes a connection interface 2361 and a wireless communication interface 2363.

The connection interface 2361 is an interface for connecting the RRH 2360 (wireless communication interface 2363) to the base station device 2350. The connection interface 2361 may also be a communication module for communication in the above-mentioned high-speed line.

The wireless communication interface 2363 transmits and receives wireless signals via the antenna 2340. The wireless communication interface 2363 may generally include, for example, an RF circuit 2364. The RF circuit 2364 may include, for example, a mixer, a filter, and an amplifier, and transmits and receives wireless signals via the antenna 2340. Although FIG. 23 illustrates an example in which one RF circuit 2364 is connected to one antenna 2340, the present disclosure is not limited to this illustration, but one RF circuit 2364 may be connected to multiple antennas 2340 at the same time.

As shown in FIG. 23, the wireless communication interface 2363 may include a plurality of RF circuits 2364. For example, the plurality of RF circuits 2364 may support multiple antenna elements. Although FIG. 23 shows an example in which the wireless communication interface 2363 includes a plurality of RF circuits 2364, the wireless communication interface 2363 may include a single RF circuit 2364.

[Example of User Equipment]

First Example

Figure 24:
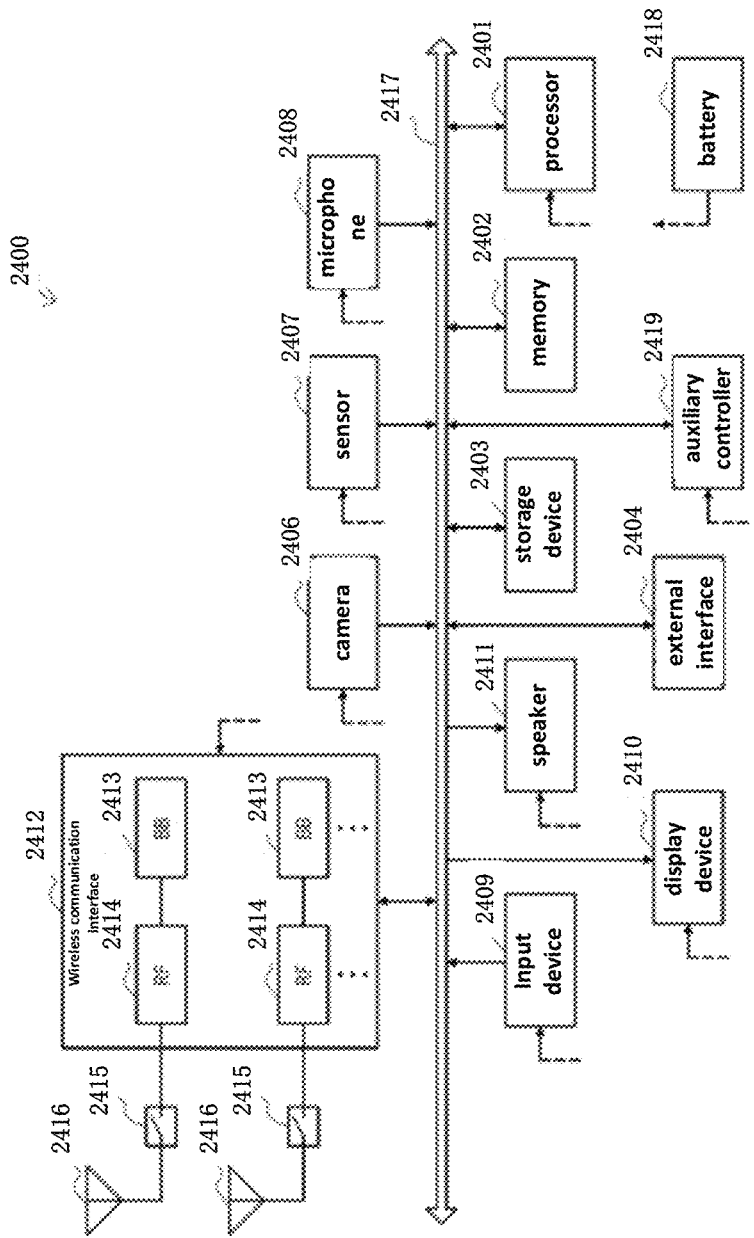
FIG. 24 is a block diagram showing an example of a schematic configuration of a smartphone to which the technology of the present disclosure can be applied.

FIG. 24 is a block diagram showing an example of a schematic configuration of a smartphone 2400 to which the technology of the present disclosure can be applied. The smartphone 2400 includes a processor 2401, a memory 2402, a storage device 2403, an external connection interface 2404, a camera device 2406, a sensor 2407, a microphone 2408, an input device 2409, a display device 2410, a speaker 2411, a wireless communication interface 2412, one or more antenna switches 2415, one or more antennas 2416, a bus 2417, a battery 2418, and an auxiliary controller 2419. In an implementation manner, the smart phone 2400 (or the processor 2401) herein may correspond to the foregoing terminal device 300B and/or 1500A.

The processor 2401 may be, for example, a CPU or a system on chip (SoC), and controls functions of an application layer and another layer of the smartphone 2400. The memory 2402 includes a RAM and a ROM, and stores data and programs executed by the processor 2401. The storage device 2403 may include a storage medium such as a semiconductor memory and a hard disk. The external connection interface 2404 is an interface for connecting external devices such as a memory card and a universal serial bus (USB) device to the smartphone 2400.

The camera device 2406 includes an image sensor such as a charge-coupled device (CCD) and a complementary metal oxide semiconductor (CMOS), and generates a captured image. The sensor 2407 may include a set of sensors such as a measurement sensor, a gyroscope sensor, a geomagnetic sensor, and an acceleration sensor. The microphone 2408 converts a sound input to the smartphone 2400 into an audio signal. The input device 2409 includes, for example, a touch sensor, a keypad, a keyboard, a button, or a switch configured to detect a touch on the screen of the display device 2410, and receives an operation or information input from a user. The display device 2410 includes a screen such as a liquid crystal display (LCD) and an organic light emitting diode (OLED) display, and displays an output image of the smartphone 2400. The speaker 2411 converts an audio signal output from the smartphone 2400 into a sound.

The wireless communication interface 2412 supports any cellular communication scheme such as LTE and LTE- Advanced, and performs wireless communication. The wireless communication interface 2412 may generally include, for example, a BB processor 2413 and an RF circuit 2414. The BB processor 2413 may perform, for example, encoding/decoding, modulation/demodulation, and multiplexing/demultiplexing, and perform various types of signal processing for wireless communication. Meanwhile, the RF circuit 2414 may include, for example, a mixer, a filter, and an amplifier, and transmits and receives wireless signals via the antenna 2416. The wireless communication interface 2412 may be a chip module on which a BB processor 2413 and an RF circuit 2414 are integrated. As shown in FIG. 24, the wireless communication interface 2412 may include multiple BB processors 2413 and multiple RF circuits 2414. Although FIG. 24 illustrates an example in which the wireless communication interface 2412 includes a plurality of BB processors 2413 and a plurality of RF circuits 2414, the wireless communication interface 2412 may also include a single BB processor 2413 or a single RF circuit 2414.

In addition, in addition to the cellular communication scheme, the wireless communication interface 2412 may support other types of wireless communication scheme, such as a short-range wireless communication scheme, a near field communication scheme, and a wireless local area network (LAN) scheme. In this case, the wireless communication interface 2412 may include a BB processor 2413 and an RF circuit 2414 for each wireless communication scheme.

Each of the antenna switches 2415 switches a connection destination of the antenna 2416 between a plurality of circuits included in the wireless communication interface 2412 (for example, circuits for different wireless communication schemes).

Each of the antennas 2416 includes a single or multiple antenna elements, such as multiple antenna elements included in a MIMO antenna, and is used for the wireless communication interface 2412 to transmit and receive wireless signals. As shown in FIG. 24, the smartphone 2400 may include a plurality of antennas 2416. Although FIG. 24 illustrates an example in which the smart phone 2400 includes a plurality of antennas 2416, the smart phone 2400 may also include a single antenna 2416.

In addition, the smartphone 2400 may include an antenna 2416 for each wireless communication scheme. In this case, the antenna switch 2415 may be omitted from the configuration of the smartphone 2400.

The bus 2417 connects the processor 2401, the memory 2402, the storage device 2403, the external connection interface 2404, the camera device 2406, the sensor 2407, the microphone 2408, the input device 2409, the display device 2410, the speaker 2411, the wireless communication interface 2412, and the auxiliary controller 2419 to each other. The battery 2418 supplies power to each block of the smartphone 2400 shown in FIG. 24 via a feeder, and the feeder is partially shown as a dotted line in the figure. The auxiliary controller 2419 operates the minimum necessary functions of the smartphone 2400 in the sleep mode, for example.

Second Example

Figure 25:
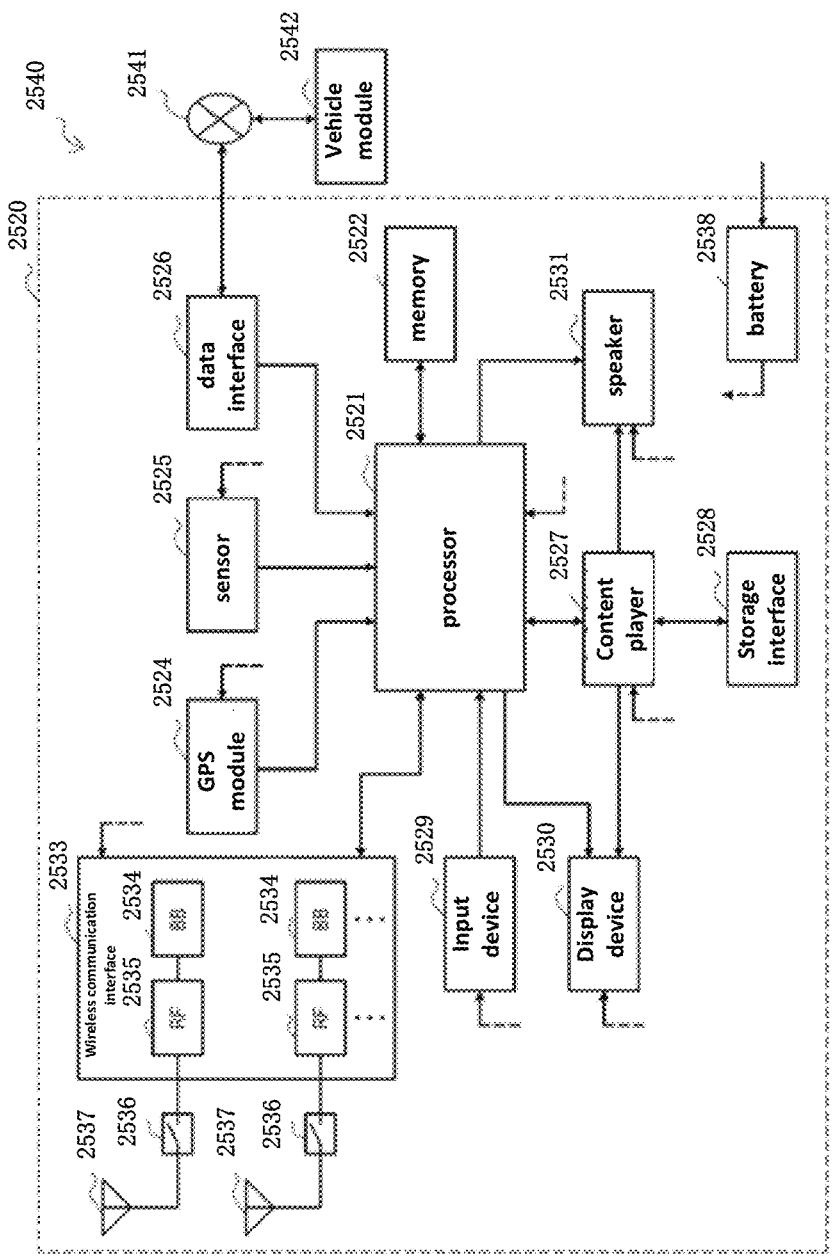
FIG. 25 is a block diagram showing an example of a schematic configuration of a car navigation device to which the technology of the present disclosure can be applied.

FIG. 25 is a block diagram showing an example of a schematic configuration of a car navigation device 2520 to which the technology of the present disclosure can be applied. The car navigation device 2520 includes a processor 2521, a memory 2522, a global positioning system (GPS) module 2524, a sensor 2525, a data interface 2526, a content player 2527, a storage medium interface 2528, an input device 2529, a display device 2530, a speaker 2531, and a wireless communication interface 2533, one or more antenna switches 2536, one or more antennas 2537, and a battery 2538. In an implementation manner, the car navigation device 2520 (or the processor 2521) herein may correspond to the terminal device 300B and/or 1500A described above.

The processor 2521 may be, for example, a CPU or a SoC, and controls navigation functions and other functions of the car navigation device 2520. The memory 2522 includes a RAM and a ROM, and stores data and programs executed by the processor 2521.

The GPS module 2524 uses a GPS signal received from a GPS satellite to measure the position (such as latitude, longitude, and altitude) of the car navigation device 2520. The sensor 2525 may include a set of sensors such as a gyroscope sensor, a geomagnetic sensor, and an air pressure sensor. The data interface 2526 is connected to, for example, an in-vehicle network 2541 via a terminal not shown, and acquires data (such as vehicle speed data) generated by the vehicle.

The content player 2527 reproduces content stored in a storage medium such as a CD and a DVD, which is inserted into the storage medium interface 2528. The input device 2529 includes, for example, a touch sensor, a button, or a switch configured to detect a touch on the screen of the display device 2530, and receives an operation or information input from a user. The display device 2530 includes a screen such as an LCD or OLED display, and displays an image of a navigation function or reproduced content. The speaker 2531 outputs the sound of the navigation function or the reproduced content.

The wireless communication interface 2533 supports any cellular communication scheme such as LTE and LTE-Advanced, and performs wireless communication. The wireless communication interface 2533 may generally include, for example, a BB processor 2534 and an RF circuit 2535. The BB processor 2534 may perform, for example, encoding/decoding, modulation/demodulation, and multiplexing/demultiplexing, and perform various types of signal processing for wireless communication. Meanwhile, the RF circuit 2535 may include, for example, a mixer, a filter, and an amplifier, and transmit and receive wireless signals via the antenna 2537. The wireless communication interface 2533 may also be a chip module on which a BB processor 2534 and an RF circuit 2535 are integrated. As shown in FIG. 25, the wireless communication interface 2533 may include a plurality of BB processors 2534 and a plurality of RF circuits 2535. Although FIG. 25 shows an example in which the wireless communication interface 2533 includes a plurality of BB processors 2534 and a plurality of RF circuits 2535, the wireless communication interface 2533 may also include a single BB processor 2534 or a single RF circuit 2535.

In addition, in addition to the cellular communication scheme, the wireless communication interface 2533 may support other types of wireless communication scheme, such as a short-range wireless communication scheme, a near field communication scheme, and a wireless LAN scheme. In this case, the wireless communication interface 2533 may include a BB processor 2534 and an RF circuit 2535 for each wireless communication scheme.

Each of the antenna switches 2536 switches the connection destination of the antenna 2537 between a plurality of circuits included in the wireless communication interface 2533, such as circuits for different wireless communication schemes.

Each of the antennas 2537 includes a single or multiple antenna element, such as multiple antenna elements included in a MIMO antenna, and is used for the wireless communication interface 2533 to transmit and receive wireless signals. As shown in FIG. 25, the car navigation device 2520 may include a plurality of antennas 2537. Although FIG. 25 shows an example in which the car navigation device 2520 includes a plurality of antennas 2537, the car navigation device 2520 may also include a single antenna 2537.

In addition, the car navigation device 2520 may include an antenna 2537 for each wireless communication scheme. In this case, the antenna switch 2536 may be omitted from the configuration of the car navigation device 2520.

The battery 2538 supplies power to each block of the car navigation device 2520 shown in FIG. 25 via a feeder, and the feeder is partially shown as a dotted line in the figure. The battery 2538 accumulates power provided from the vehicle.

The technology of the present disclosure may also be implemented as a vehicle on-board system (or vehicle) 2540 including one or more of a car navigation device 2520, an in-vehicle network 2541, and a vehicle module 2542. The vehicle module 2542 generates vehicle data such as vehicle speed, engine speed, and failure information, and outputs the generated data to the in-vehicle network 2541.

The exemplary embodiments of the present disclosure have been described above with reference to the accompanying drawings, but the present disclosure is of course not limited to the above examples. A person skilled in the art may find various alternations and modifications within the scope of the appended claims, and it should be understood that they will naturally fall in the technical scope of the present disclosure.

For example, a plurality of functions included in one unit in the above embodiments may be implemented by separate devices. Alternatively, multiple functions implemented by multiple units in the above embodiments may be implemented by separate devices, respectively. In addition, one of the above functions may be implemented by multiple units. Needless to say, such configurations are included in the technical scope of the present disclosure.

In this specification, the steps described in the flowchart include not only processes performed in time series in the described order, but also processes performed in parallel or individually instead of having to be performed in time series. Further, even in the steps processed in a time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Furthermore, the terms "including", "comprising", or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence "including a . . . " do not exclude the existence of other identical elements in the process, method, article, or equipment including the elements.

What is claimed is:

1. A control device for a wireless communication network, comprises
   at least one processor; and
   at least one memory including computer program code, where the at least one memory and the computer program code are configured, with the at least one processor, to cause the control device to at least:
   communicate with a first group of terminal devices which are near to the control device with non-linear precoding scheme; and
   communicate with a second group of terminal devices which are far away from the control device with linear precoding scheme,
   wherein, the at least one memory and the computer program code are configured, with the at least one processor, to cause the control device to at least:
   configure each terminal device in the first group of terminal devices to measure a first reference signal and feedback a first channel state report between the terminal device and the network based on the measurement of the first reference signal; and
   in response to a demand of data transmission, configure a terminal device in the first group of terminal devices to measure a second reference signal which is processed based on the first channel state and feedback a second channel state report between the terminal device and the network based on the measurement of the second reference signal.

2. The control device according to claim 1, wherein, the at least one memory and the computer program code are configured, with the at least one processor, to cause the control device to at least:
   conduct non-linear precoding on a data signal of the terminal device in the first group of terminal devices according to the second channel state.

3. The control device according to claim 1, wherein, the at least one memory and the computer program code are configured, with the at least one processor, to cause the control device to at least:
   configure a terminal device in the second group of terminal devices to measure the first reference signal and feedback a first channel state report between the terminal device and the network based on the measurement of the first reference signal; and
   conduct linear precoding on a data signal of the terminal device in the second group of terminal devices according to the first channel state.

4. The control device according to claim 1, wherein, the first channel state report reflects long-term channel state and the second channel state report reflects instantaneous channel state.

5. The control device according to claim 4, wherein, the long-term channel state is presented with a first number of dimensions less than a second number of dimensions of the instantaneous channel state.

6. The control device according to claim 1, wherein, the at least one memory and the computer program code are configured, with the at least one processor, to cause the control device to at least:
   precode the second reference signal based on the first channel state report.

7. The control device according to claim 1, wherein, the control device is implemented as a base station.

8. A control method for a control device in a wireless communication network, the method comprising;

communicating with a first group of terminal devices which are near to the control device with non-linear precoding scheme; and communicating with a second group of terminal devices which are far away from the control device with linear precoding scheme, wherein the method further comprises:

configuring each terminal device in the first group of terminal devices to measure a first reference signal and feedback a first channel state report between the terminal device and the network based on the measurement of the first reference signal; and in response to a demand of data transmission, configuring a terminal device in the first group of terminal devices to measure a second reference signal which is processed based on the first channel state and feedback a second channel state report between the terminal device and the network based on the measurement of the second reference signal.

9. The method according to claim 8, further comprise:

conducting non-linear precoding on a data signal of the terminal device in the first group of terminal devices according to the second channel state.

10. The method according to claim 8, further comprises:

configuring a terminal device in the second group of terminal devices to measure the first reference signal and feedback a first channel state report between the terminal device and the network based on the measurement of the first reference signal; and conducting linear precoding on a data signal of the terminal device in the second group of terminal devices according to the first channel state.

11. The method according to claim 8, wherein, the first channel state report reflects long-term channel state and the second channel state report reflects instantaneous channel state.

12. The method according to claim 11, wherein, the long-term channel state is presented with a first number of dimensions less than a second number of dimensions of the instantaneous channel state.

13. The method according to claim 8, further comprises precoding the second reference signal based on the first channel state report.

14. A non-transitory computer product containing instructions for causing a control device in a wireless communication network to perform a method, the method comprising:

communicating with a first group of terminal devices which are near to the control device with non-linear precoding scheme; and communicating with a second group of terminal devices which are far away from the control device with linear precoding scheme, wherein the method further comprises:

configuring each terminal device in the first group of terminal devices to measure a first reference signal and feedback a first channel state report between the terminal device and the network based on the measurement of the first reference signal; and in response to a demand of data transmission, configuring a terminal device in the first group of terminal devices to measure a second reference signal which is processed based on the first channel state and feedback a second channel state report between the terminal device and the network based on the measurement of the second reference signal.

* * * * *